United States Patent [19]
Berstein et al.
[11] Patent Number: 4,482,964
[45] Date of Patent: Nov. 13, 1984

[54] FLUID REGISTER SYSTEM

[75] Inventors: Patricio Berstein, Thornhill; Walter R. Stephens, Islington, both of Canada

[73] Assignee: Exxon Research and Engineering Co., Florham Park, N.J.

[21] Appl. No.: 573,105

[22] Filed: Jan. 23, 1984

Related U.S. Application Data

[63] Continuation of Ser. No. 283,102, Jul. 13, 1081, , and a continuation-in-part of Ser. No. 128,647, Mar. 10, 1980, Pat. No. 4,313,168.

[51] Int. Cl.[3] .......................... G06F 15/42; B67D 5/00

[52] U.S. Cl. .................................... 364/465; 364/510; 222/30

[58] Field of Search ........................ 364/465, 571, 510; 377/21; 222/30

[56] References Cited

U.S. PATENT DOCUMENTS

| | | | |
|---|---|---|---|
| 3,814,148 | 6/1974 | Wostl | 364/465 X |
| 3,822,377 | 7/1974 | Beck | 364/571 X |
| 4,084,248 | 4/1978 | Scott | 364/571 |
| 4,107,777 | 8/1978 | Pearson et al. | 364/465 |
| 4,192,005 | 3/1980 | Kurtz | 364/571 |
| 4,238,825 | 12/1980 | Gerry | 364/571 X |
| 4,303,984 | 12/1981 | Houvig | 364/571 |
| 4,313,168 | 1/1982 | Stephens et al. | 364/465 |
| 4,331,262 | 5/1982 | Synder | 364/571 X |

*Primary Examiner*—Edward J. Wise
*Attorney, Agent, or Firm*—Robert S. Salzman; Paul E. Purwin

[57] ABSTRACT

A system and data network for a fluid register system used for the delivery of fluid commodities to customers at various delivery sites features a portable data capsule containing pricing information; an electrical fluid delivery volume measurement device; and a vehicular mounted calculator for retrieving the pricing data from said data capsule and calculating a billing amount for each fluid delivery with respect to a fluid delivery volume measurement.

40 Claims, 8 Drawing Figures

SOFTWARE STATE DIAGRAM

FLUID REGISTER SYSTEM

RELATED APPLICATIONS

This is a continuation of application Ser. No. 283,102 filed July 13, 1981, and a continuation-in-part of the previously filed U.S. application Ser. No. 128,647; filed Mar. 10, 1980now Pat. No. 4,313,168 and a continuation of Ser. No. 283,102, filed July 13, 1981now abandoned; and assigned to the current assignee.

FIELD OF THE INVENTION

This invention pertains to a fluid register system for the delivery of fluid commodities, and more particularly to an improved method, system and data network for the delivery of fluid commodities to customers at various delivery sites.

BACKGROUND OF THE INVENTION

In the delivery of fluid commodities such as fuel oils and home heating oils, etc., the present methods and systems for accurately recording deliveries, and for processing the delivery data at the home office are not entirely satisfactory. Much of the truck data gathered from the delivery of fuel oils is in the form of trip tickets and summary reports, which presently require manual handling. This manual handling is time-consuming and expensive.

In recent times, several electronic fluid register systems have appeared in the marketplace such as the new electronic Lockheed 840 System made by Lockheed Electronics, Plainfield, N.J., and the MIC-COM 6500 system, made by Midwest Computer Register Corporation, Hampton, Iowa, etc. The essential change in these fluid registers is that the mechanical computation and register functions have been converted to an electronic method and do not reflect any significant expansion of operating capability. Sales information is still produced on printed paper for subsequent manual handling and entry into office located data processing centres.

The present invention seeks to overcome many of the data handling drawbacks of the prior delivery systems, while presenting new and useful improvements to the art of fluid delivery data handling. The subject invention contemplates the use of a new delivery method, fuel sensing and calibration system, and data network for displaying, printing, and permanently recording every fluid commodity transaction for each delivery vehicle, including the loading of bulk quantities of fluid. The invention features a portable data capsule which feeds pricing data to a delivery calculator and which records the billing data for each delivery.

DISCUSSION OF THE PRIOR ART

The present invention briefly comprises a new method wherein on-site deliveries of a fluid commodity are made under the influence of a unique data control network and a novel electronic delivery volume sensing system. The method features, among others, the novel steps of entering and retrieving pricing data from a portable storage medium which is placed in communication with a calculator mounted on a delivery vehicle. The calculator receives electronic signals corresponding to the sensed or measured volume of the delivered commodity, and converts the volume measurement into a billing amount in response to the retrieved pricing information obtained from the portable storage medium. the billing amount for each delivery is recorded in the portable storage medium.

At the end of the delivery run, or on a daily basis, the portable storage medium is removable from communication with the calculator for deposit with a central office computer or other record-keeping facility.

A complete print-out of the entire day's transactions including loading and delivery information and data can be obtained from the portable storage medium by requesting the calculator for a compilation or summary report.

In the prior art of meter reading, the use of a portable computer has been suggested for recording customer utility meter data. The portable computer is carried by a company meter reader to the various customer sites. The portable computer is preprogrammed with the customer's previous utility meter reading. A bill may be calculated by subtracting the previous meter reading from a current meter reading keyed into the computer by the company meter reader at the customer site.

The computer may be programmed to print a bill of the utility charges, which bill is left at the customer location. The updated meter reading for each customer is recorded in a portable tape cassette, which is deposited at a central depository at the end of the day.

The above meter reading system is the subject of a U.S. Patent to B. E. Etter, entitled: METHOD AND MEANS OF ASSIMILATING UTILITY METER DATA, Pat. No. 4,133,034; issued Jan. 2, 1979. Like the above-described meter reading system of Etter, the present fuel commodity delivery system of the invention features a portable memory for recording the entire daily transactions. Unlike the utility meter system, however, the inventive portable memory contains pricing data and information on each fluid commodity and delivery zone, which information is retrievable and fed into a portable calculator fixedly carried in the cab of each delivery truck.

Unlike the above meter reading sytem, the fluid commodity delivery system of the invention features a direct sensing of the commodity being dispensed, and a direct control of the dispensed commodity at the delivery site by the calculator being operated by the deliveryman. In addition, the electronic calculator of the invention has the addvantage of being fixedly mounted upon or within the delivery vehicle, such that the expensive calculator or computer equipment is less capable of being lost, stolen or tampered with by unauthorized personnel.

In a patent to J. E. Zuhasz, entitled: MONITORING AND RECORDING SYSTEM FOR VEHICLES: U.S. Pat. No. 4,067,061; issued Jan. 3, 1978, a system is disclosed which monitors the vehicular operation of a heavy duty truck. Such a monitoring system features a portable recording medium that stores data, such as: mileage, fuel consumption, fuel purchased, etc.

Like the Juhasz system, the portable storage medium of the invention can be used to provide a print-out of the day's operating transactions.

Unlike the Juhasz system, however, the recording medium of the invention contains prior pricing information. The recording medium of Juhasz is not intended to record deliveries and is not, therefore, interfaced with a calculator for computing delivery billing amounts.

BRIEF SUMMARY OF THE INVENTION

The invention particularly relates to on-site deliveries of fluid commodities such as petroleum products, fuel oils, home heating oils, gasoline, etc., but is not meant to be limited to specific commodities. It is contemplated that the teachings and inventive novelties expressed herein can be equally applied to deliveries for milk, comestibles, chemicals, propane and other liquids and/or gases, etc.

The invention features a portable data capsule comprising a non-volatile memory, which data capsule is fed information, including a general price format corresponding to deliveries of different fluid commodities to several different delivery zones. Price structures are dependent upon delivery zone and in some cases upon quantity discounts. In addition, the data capsule also contains billing codes corresponding to particular unit prices at particular delivery locations.

Each billing code is an address for retrieving a particular unit price stored in the data capsule. The corresponding unit price (dollars per gallon or liter of fluid) associated with each billing code is retrieved from the capsule in order to calculate a billing amount for each delivery.

Each day, a data capsule and billing tickets are provided to each delivery truck operator from a central data station. Each billing ticket specifies the customer to be serviced for that day, the fluids to be delivered to each customer, and the corresponding billing codes. Each delivery truck carries an electronic calculator device which may be a microprocessor. The electronic calculator device will be able to retrieve from each capsule the pricing data corresponding to each customer. The pricing data is obtained by entering the customer's corresponding billing code into the calculator via the calculator's keyboard, which billing code is obtained from the customer's ticket. At the beginning of each day's run, the truck operator will enter information into the calculator concerning any remaining inventory loaded into the truck from a previous day. The operator also will enter information regarding fluids which he currently loads at the depot.

During the delivery run, the operator inserts each customer ticket into a printer associated with the calculator. Next, he enters appropriate customer information into the calculator device including the proper billing code, and makes the fluid delivery. The calculator receives electronic signals from a volume sensing or measuring device, and retrieves a unit price from the data capsule. The calculator uses this information to calculate a billing amount for the delivered fluid commodity. This billing amount is recorded on a customer portion of the customer ticket, which customer portion is left with the customer, and serves as a bill. The billing amount is also recorded on a deliveryman's portion of the customer ticket, and serves as his receipt of the transaction.

During the day's run, additional information concerning loadings are entered into the calculator device.

All the information which is entered into the calculator is recorded in the data capsule memory. At the end of the day's run, the operator can retrieve all the stored data by requesting a compilation print-out from the calculator device. The compilation report will contain a complete summary of all the transactions of the day, including totals of each fluid loaded and delivered and the total dollar amount of the deliveries.

After each day's run, the data capsule and receipts are returned to the central data station for accounting and other purposes.

The method of the invention is generally for obtaining data relating to fluid commodity deliveries. The method comprises the steps of entering pricing data into a portable storage medium and placing the storage medium into communication with a calculator device. A volume amount is obtained for the delivery of each fluid commodity to each customer at a delivery site. The volume amounts are each fed to the calculator device, and the pricing data corresponding to each particular delivery is retrieved from the storage medium. From this data and information, a bill amount for each delivery is calculated.

The fluid commodity delivery system of this invention is generally comprised of a fluid flow sensor for providing a number of electrical signals in response to a fluid flow of the commodity being delivered, and a converting and calibrating means. The converting means communicates with the flow sensor and converts the received signals to a visual representation of the delivered fluid commodity volume. The calibration means electrically communicates between the fluid flow sensor and the converter means and stores and supplies calibration coefficients for adjusting the visual representation to reflect a true delivered volume of the fluid commodity.

The invention also generally features a data network for accounting for the fluid deliveries. The data network comprises a portable memory capsule; a first data station for entering and retrieving data and information from the portable memory capsule; and a second portable data station being movably carried to each delivery site by the delivery vehicle. The portable data station enters and retrieves data and information from the portable memory capsule.

It is an object of this invention to provide an improved method, system, and data network for the delivery of fluid commodities;

it is another object of the invention to provide a fluid commodity delivery method, system, and data network utilizing a unique portable memory capsule containing a pricing format including unit prices for different commodities delivered to different zones;

it is a further object of this invention to provide a delivery system having a novel means for calibrating and measuring fluid volumes of delivered commodities to various customer sites;

it is still a further object of the invention to provide a new method, system and data network for the delivery of fluid commodities which is more reliable and which improves the processing and handling of fluid delivery data.

These and other objects of this invention will become more apparent and will be better understood with reference to the following detailed description taken in conjunction with the accompanying drawings.

DETAILED DESCRIPTION OF THE INVENTION

The invention is for a method, system and data network for the delivery of fluid commodities to customers located at various delivery sites. The method, system and data network utilize a unique data capture capsule, which contains a prerecorded pricing format for computing a billing amount for each fluid delivery. The data capsule is a portable memory storage unit which is obtained from a central data station by each delivery operator at the beginning of each day's delivery run. The data capsule supplies the pricing data for each delivery, and also records each delivery transaction, including the loading of bulk amounts of fluid into the delivery truck at a loading depot. At the end of each delivery run or day's transactions, the data capsule provides for the print-out of a summary or compilation report of all the transactions of the day. The capsule is returned to the central data station to update each customer's file contained in a master computer.

Figures 1, 1A, 2:
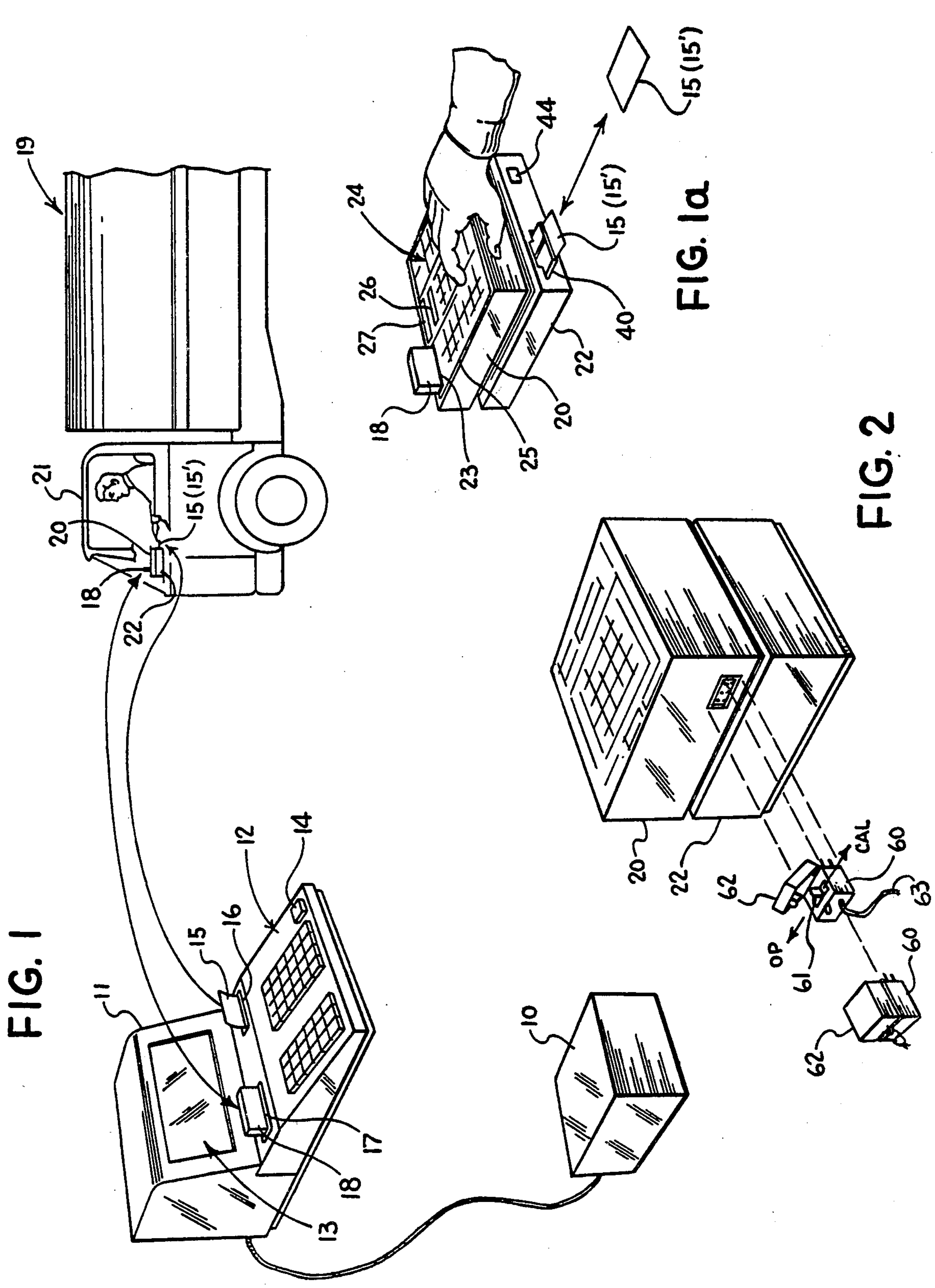
FIG. 1 is a schematic view of the inventive data network for the delivery of fluid commodities.
FIG. 1*a* is a schematic view of the calculator and printing devices used in the inventive data network of FIG. 1.
FIG. 2 is a schematic view of a calibrating mechanism communicating with the calculator device shown in FIG. 1*a*.

Now referring to FIG. 1, a data network is generally shown for a fluid commodity delivery system which is particularly applicable to fuel deliveries. The data network comprises a fixed, central data station generally having a main computer 10 which communicates with a data console 11 having a keyboard 12 and a display screen 13. The main computer 10 computes amongst other items of information degree-day data, in order to determine the needs and requirements of fuel oil customers.

Each day, the computer 10 will determine a plurality of customers needing a fuel oil delivery for each delivery route, i.e., each delivery truck will be given information regarding a number of customers who are running low of fuel oil. The main computer 10 is programmed with a customer ticket printing routine, which is invokable through the console 11 by pressing the print button 14. When the button 14 is depressed on console 11, a plurality of customer tickets 15 will be ejected from slot 16 on the console 11. Each customer ticket 15 (typical) will contain amongst other information, the customer's name and address, the type of fuel oil or other petroleum products to be delivered, a billing code, the delivery zone, the tax to be added to the delivery price, etc.

Each customer ticket will be sectioned into three different receipt portions: (a) a customer receipt portion, (b) a truck operator receipt portion, and (c) a data center receipt portion.

The customer receipt portion will be used as a means of billing the customer. This receipt portion will be left with the customer at the delivery site, and will have the delivery and bill amount imprinted thereon at the time of delivery.

The truck operator receipt portion will be used by the truck operator to verify the delivery data when a compilation report is prepared.

The data center receipt will be used by the central office for accounting purposes.

Additional data or information can be added to any individual customer ticket 15 via the keyboard 12 of the console 11, such as a customer address change or a fuel delivery allocation amount in times of shortages.

The console 11 is also provided with a slot 17 for the insertion of a data, capsule 18 (typical). A data capsule 18 is provided to each bulk operator and is a portable memory storage unit which is used to record the entire daily transactions of the particular delivery truck.

The typical data capsule 18 can be encapsulated (modular) non-volatile, semi-conductor, erasable memory with a capacity for 4,906 digits of information in order to accommodate over one hundred delivery transactions.

Each of the data capsules 18 is identical and is programmed with a price format via the computer 10. The price format comprises the unit price (dollars/liter or gallon) of each of several commodites to be delivered, e.g., home heating oil, diesel fuel, gasoline, etc. The particular unit price for each delivery will be subsequently multiplied by the delivered volume in order to calculate a billing amount (in dollars) at each delivery site. Each particular fuel will have more than one unit price depending upon delivery zone or in some cases a quantity discount, i.e., fuels needing to be transported a greater distance will have a higher unit price.

The portable capsule 18 will also contain different tax structures to be applied to each particular delivery when computing the billing amount, since different fuels will be taxed at different rates.

The proper unit price is obtained for each particular delivery or customer by entering into a truck calculator, the zone and a billing code, as will be explained in more detail hereinafter. The proper billing code is obtained from each customer ticket, and when entered into the calculator device will act as a memory locating address.

As part of the data network, each delivery truck vehicle 19 will be provided with a calculator device 20 (also shown in FIG. 1*a*). The calculator device can be permanently mounted in the cab 21 of the truck 19 for the convenience of the truck operator, and to discourage theft or tampering by unauthorized personnel. The calculator 20 has a peripheral printing device 22 electrically connected thereto, for the purposes of printing a billing amount on each customer ticket, and for printing a compilation report at the end of each day's delivery run.

The calculator device 20 can be a general purpose computer, but is preferably a microprocessor, such as an Intel model 8085 manufactured by the Intel Corporation, Santa Clara, Calif. A sub-function of the processor has 256 words of RAM memory capable of accessing up to 16 I/O sub-systems. The process sub-function has a hardware multiplier which computes the product of two BCD digits. This is for the purpose of calculating a billing amount for each delivery which requires a multiplication between the unit price obtained from the portable memory capsule 18 and a delivered volume amount. The delivered volume amount can be obtained from an electrical pulse-generating flow meter, as will be explained in more detail hereinafter.

Figure 4:
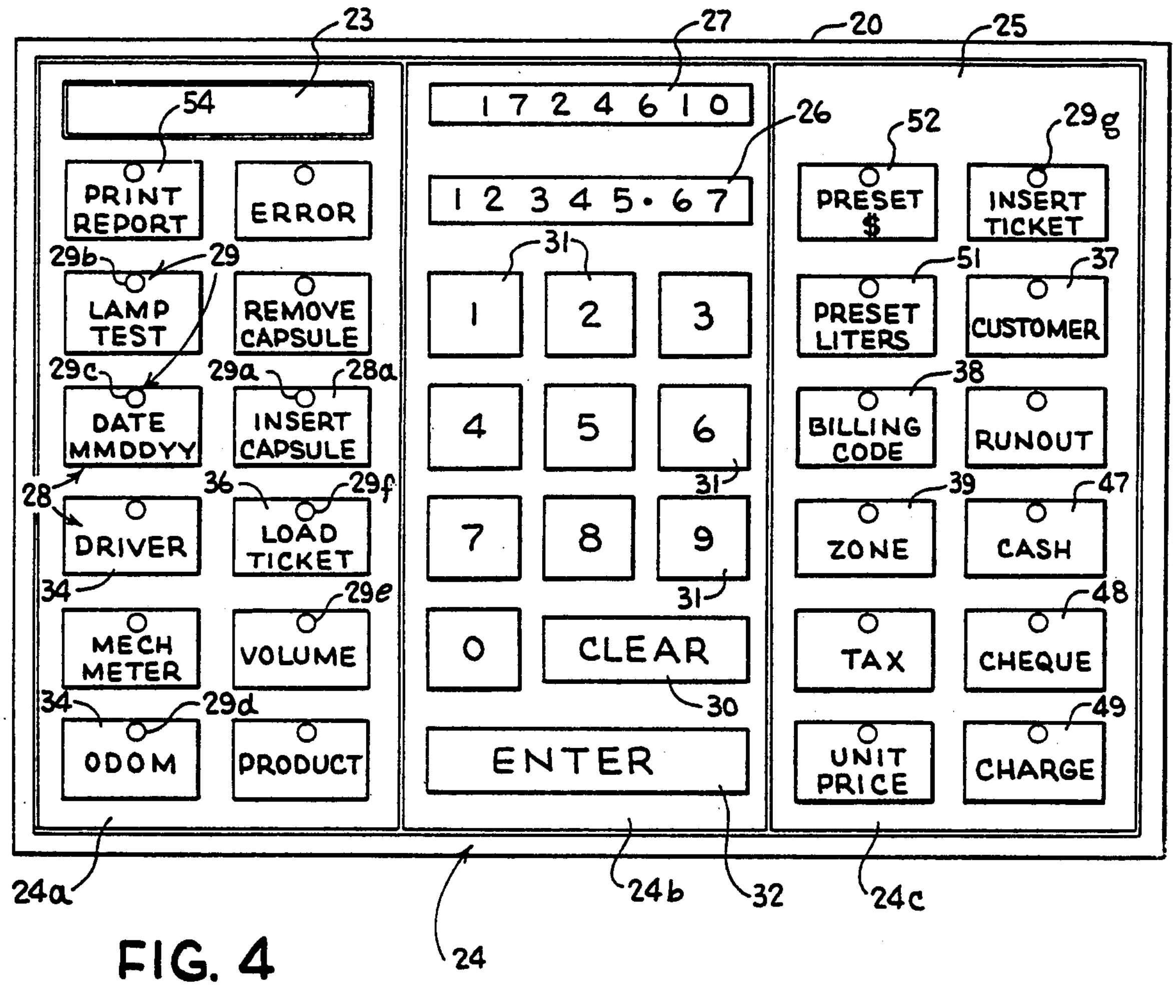
FIG. 4 is a plan view of the keyboard and display for the calculator device of FIG. 1*a*.

At the beginning of each day, each truck operator will obtain a portable data capsule 18, and a number of customer tickets 15 from the central station, as aforementioned. The truck operator will begin the delivery procedure by inserting the capsule 18 into slot 23, disposed on the upper face panel 25 of the calculator 20, as illustrated in FIGS. 1*a* and 4. The upper face panel 25 of the calculator 20 comprises a keyboard 24 comprising three sections 24*a*, 24*b*, and 24*c*, respectively, as depicted in detail in FIG. 4. The upper face panel 25 of the calculator 20 also comprises a display window 26, and a totalizer 27, i.e., an electromechanical volume register operating in a continuously ascending register mode.

The activity of the operator at the beginning of the day will relate primarily to initializing the capsule 18 via calculator 20 in order to properly record data for the subsequent fuel deliveries. With the capsule 18 in place (deposited in slot 23 on the panel 25), the calculator 20 is now in communication with the capsule memory. Data and information can be entered into, and retrieved from, the data capsule by depressing the appropriate input key 31 and retrieval key 34, respectively, on the keyboard 24 of the calculator 20, as illustrated in FIG. 1*a*. The operator will key-in basic information into the capsule 18 such as: the date, his identification number, the odometer reading of his truck, the register amount appearing in the totalizer 27, and any inventory amount of each fluid commodity remaining in his truck from the previous day. Section 24*a* contains the operation instructions 28 (typical) which are printed on each key 34 used to initialize the capsule 18.

The calculator 20 has a standard-type of routine well known in the art for guiding the operator through the workings of the keyboard operation. Each key 34 has an LED 29 (typical) which illuminates over the instructions 28 printed on the key 34, when information is requested. When the proper response is furnished, the next programmed LED 29 will be illuminated, while the previous LED 29 is extinguished. For example, when the power to the calculator 20 is turned on, the LED 29*a* for instructions 28*a* becomes illuminated, indicating that the data capsule 18 is required to be inserted in slot 23. After the proper insertion of the capsule 18, LED 29*a* is extinguished and LED 29*b* is illuminated. The operator is now required to enter the date (a numerical entry) via the numerical keys 31 (typical) in section 24*b*.

When the operator keys in the date, the date will appear in the display window 26. If the operator has made an error in the keying of the date as indicated in the display, he can clear this entry by depressing the clear button 30. If the operator has correctly entered the date, he will then depress the enter button 32. After the entry, button 32 is depressed, LED 29*b* will go out and LED 29*c* will illuminate, indicating the requirement for entering the driver identification number via keys 31. When the operator keys-in his identification number, the display 26 will show this entry. If it is correct, the enter button 32 is again depressed, LED 29*c* will be extinguished, and the "Odometer" LED 29*d* will become illuminated.

In this fashion, the operator is led through the initializing procedure. If at any time, the operator desires to recall any information, he may depress the appropriate retrieval key 34 on panel 25, and the data will appear in the display window 26. Depressing the clear button 30 will then return the keyboard to the proper place in the routine.

The initialization procedure will be terminated when the "Volume" instruction, LED 29*e*, is extinguished. This is accomplished by properly entering the previous day's remaining fluid inventories via data input buttons 31.

After initialization of the capsule 18, the operator may load further amounts of fuel(s) at the depot, if his inventories are low. After the operator loads the various products, the load ticket button 36 is depressed and LED 29*f* is activated. The number of the load ticket is entered into the display 26 via key 31. The enter button 32 is depressed to extinguish LED 29*f* and illuminate the "Volume" LED 29*e*.

A product code relating to a particular fluid commodity will now appear in the display 26. If this product is being loaded into the truck, the operator enters the loaded volume via key 31 and presses the enter key 32. Now, the next product code appears in the display window 26, and the procedure is repeated until all the products have been recorded. If a particular product has not been loaded, the enter button 32 is depressed without entering any numerical amount.

When the volume for the last product has been entered, all the lights on panel 25 will be extinguished signifying that the truck is now loaded with products and is ready to make a delivery run.

Any previously entered product volumes will be automatically added to the newly entered product volumes by the calculator 20 to reflect the true inventory values.

At the customer sites, the truck operator must first insert the proper customer ticket 15 into the printer slot 40 and enter the customer code number via key 37. An interlock device located inside the printer 22 will then actuate a flow valve solenoid in the fuel delivery line to an open position. In this regard, the interlock insures that no delivery can be made without a customer ticket being printed for the transaction.

The operator is reminded to insert the customer ticket 15 into slot 40 by LED 29*g* which will illuminate when the pumping equipment is actuated.

A similar interlock is located in the calculator 20 to insure that fuel cannot be delivered if a data capsule 18 is not positioned in slot 23.

The keys controlling the delivery of products to the customer are generally located in section 24*c* of panel 25. The appropriate billing code and zone buttons 38 and 39 are respectively depressed and the billing code and zone for that particular customer are respectively entered in sequence into the calculator. As aforementioned, the proper billing code and zone information are obtained from the customer ticket 15. The calculator 20 will directly receive digital volume information from an electronic pulse generating flow sensor 42, generally shown in FIG. 5. The calculator will obtain the volume of the delivered product and multiply it by the unit price fetched from the memory capsule 18.

The calculator 20 will also subtract each delivery amount from the stored inventory volume in order to keep account of the various fuels remaining in the truck.

The totalizer 27, which is nothing more than a continuously ascending register will add each delivery volume to the prior total, thus indicating the total volume of all products delivered-to-date.

After the actual delivery has been achieved, the operator will press a print button 44 located on the front face of the printer 22. This will cause the billing amount to be printed upon the customer ticket 15, and the ticket can then be manually removed or automatically ejected from slot 40. The customer tickets can also be caused to be printed from outside the cab 21 of the truck by means of a remote control switch for the convenience of the delivery man.

Other buttons in section 24*c* of panel 25 may be actuated as part of the delivery and billing procedure printout. The keying of the "cash", "cheque", or "charge" buttons 47, 48, and 49, respectively, will record the type of payment being made by the customer.

The delivery of a predetermined volume or dollar amount, as in the case of shortage allotments may be entered by keys 51 and 52, respectively. When either one of these buttons is depressed, the calculator will automatically compute the volume (in the case of a present dollar amount) to be delivered, and will automatically control the electrically actuated flow control solenoid (not shown) to shut off the delivery of fuel at the proper time. Again, the delivered volume will be directly digitally fed to the calculator 20 from the flow sensor 42 (FIG. 5).

Figure 5:
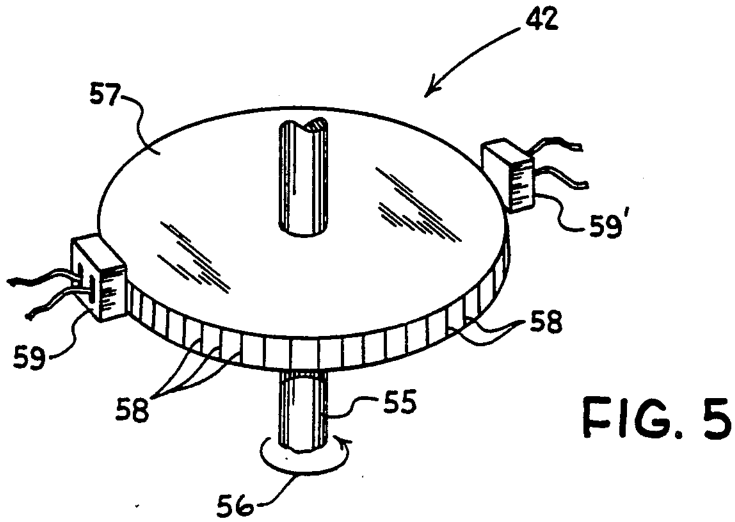
FIG. 5 is a schematic view of a typical flow sensor utilized in the delivery system depicted in FIG. 3.

Referring now to FIG. 5, a schematic view of one type of flow sensor device 42 which can be used in the present system, is illustrated. The flow sensor or measurement device 42 may be a Potter pulse-generating flow meter, manufactured by Potter Instruments Company, or a pulse-generating flow measuring device similar to that shown in the U.S. patent to J. R. Wiegand, entitled: PULSE GENERATOR, Pat. No. 3,780,313; issued Dec. 18, 1973. Pulse-generating flow meters are quite common to the flow meter arts, and many commercial meters are available which are compatible with the present system.

The flow sensor 42 of FIG. 5 is similar to the device described in the aforementioned U.S. Pat. No. 3,780,313, and any description of the pulse-generator of that patent is meant to be included herein by way of reference.

The shaft 55 of the pulse-generating flow sensor 42 is connected to an impeller (not shown) disposed in the delivery flow line. The shaft 55 may also be connected to a mechanical meter flow drive mechanism. In certain jurisdictions, it may be necessary to retain the mechanical meter in order to satisfy certain "weights and measures" requirements. The volume amount may be introduced into calculator 20 directly, as aforementioned, or the volume amount may be read from the mechanical meter and entered into the calculator 20 via the keyboard 24.

Shaft 55 will be caused to be rotated (arrow 56) in response to the fluid flow of the fuel being deliverd. The rotor 57 fixedly attached to shaft 55 will rotate through a given rotational angle with respect to the passage of a known volume of fluid in the delivery line. A series of electrical pulses will be generated by the rotor 57 which carries a plurality of evenly-spaced two domain magnetic wires 58 disposed on its periphery. The magnetic wires 58 rotates past two magnetic read heads 59 and 59'. As the wires 58 move past the magnetic read heads 59 and 59', respectively, a first magnetic field in each read head will magnetically switch a first domain in each of the adjacent wires 58. When the wires 58 move adjacent an inductive pick-up coil (not shown) in each head, the second domain in each wire will be caused to be magnetizied, thus resulting in an inductive biasing on the first domain. This inductive effect is sensed by the pick-up coil, thus producing a pulse in each magnetic head 59 and 59', respectively.

The system is designed to convert the number of pulses to a volume amount, e.g., 100 pulses per liter of delivered fuel. Two magnetic heads 59 and 509' are used to detect any defects in a particular wire 58. The system will sense in a quarter or half-revolution of the rotor 57 more pulses from one of the magnetic heads in the event one of the wires 58 is defective.

The generated electrical pulses are converted to a volume amount by the calculator 20 through the use of an algorithm based upon the following formula:

$$\Delta V=(CK/100)+(dv/di)\,(T-15) \quad (1)$$

where:

T is the Temperature of the fuel in ° C.;
C is the calibration coefficient;
K is the Viscosity associated with that particular fuel;
dv/dt is the change in fuel volume per fuel pulse per ° C.; and
ΔV is the fuel volume per fuel sensor pulse.
dv/dt is derived from the following formula:

$$dv/dt=(CK/100)\,(T_c-1) \quad (2)$$

where: T is a temperature correction factor.

In those situations where the temperature correction i not contemplated, the aforementioned formula (1) reduces to $$\Delta V=CK/100 \quad (3)$$

A temperature sensor in the fuel line (not shown) will provide the valve for T in equation (1) above.

The temperature sensor can be an Analog Devices AD 590 grade M sensor or equivalent.

The temperature correction factor for each fuel may be stored in a non-volatile memory disposed in a volume calibrator 60 shown in FIG. 2. The volume calibrator 60 will also contain the calibration coefficient C for the fluid flow sensor 42. The non-volatility of calibrator 60 can be achieved by known non-volatile storage means, or by a volatile memory with battery back-up.

The calibrator 60 of FIG. 2 is electrically connected to the calculator 20 by means of a plug and socket arrangement as illustrated. The calibrator 60 is mechanically connected to the flow sensor via cable 63, which cable electrically connects the flow sensor to the calculator through the illustrated calibrator plug and socket arrangement.

The calibrator 60 operates in two modes: an operation mode; and a calibrating mode. A switch 61 protected by a sealable lid 62, can be thrown to either mode position as depicted by the arrows.

In the calibration mode, i.e., switch 61 is in the calibration position, a known volume tank is filled with fuel, and the sensor 42 will supply a number of pulses corresponding to the delivered volume. The calibrator 60 will supply a calibration coefficient to calcultor 20. A volume amount will appear in display window 26. If the calibration of the sensor 42 is in need of adjustment, as when the displayed volume does not coincide with the known delivered volume, the correct volume amount is keyed into the keyboard Section **24*b*. This will cause the calculator 20 to readjust the calibration coefficient, which is then fed into the memory of the calibrator 60. The true amount will also appear in display 26. The calibrator switch 61 is then returned to the operation position, and the lid 62 is sealed by authorized personnel. The calculator 20** is now ready for normal operations.

At frequent intervals, the calibration of sensor 42 may be checked to see if the displayed volume amount continues to correspond with a known volume delivered. If it is determined that a correction in the calibration coefficient is again required, the seal is broken, lid 62 is opened, and switch 61 is moved to the calibration position. The aforementioned procedure is then repeated.

The measurement and calibration method used herein can be applied to other measuring systems and devices, and may be briefly summarized as comprising the following steps of:

(a) electronically measuring a known quantity and providing a first electrical output respective of said known quantity;

(b) determining at least one calibration coefficient for said known quantity in response to said electrical output;

(c) electronically storing said calibration coefficient;

(d) electronically measuring an unknown quantity and providing a second electrical output respective of said unknown quantity;

(e) retrieving said stored calibration coefficient; and (f) electronically calculating a true quantity for said unknown quantity in accordance with said retrieved calibration coefficient and said second electrical output.

The calibrator 60 is purposely separated from the main calculator housing, so that a breakdown in the calculator 20 will not require a recalibration of sensor 42. If a calculator 20 should be in need of repair, the calculator 20 can be removed from the cab 21 of truck 19, and a new or repaired calculator 20 can be inserted therein without the need to recalibrate sensor 42.

At the end of each delivery run, or on a daily basis, a summary or compilation report may be obtained from the calculator 20 by pressing the print report button 54 in section 24*a* of the panel 25 (see FIG. 4). The "insert ticket" LED 29*g* will then illuminate. A compilation ticket 15' will then be inserted by the truck operator into slot 40 of the printer 22 shown in FIG. 1*a*.

The final odometer reading of the truck may be entered by keying-in the odometer setting in section 24*b* of panel 25.

When the enter button 12 is depressed, the calculator 20 will cause the printer 22 to print the summary report on ticket 15'.

The entire day's transactions will be summarized, including the print-out of bulk delivery volumes for each product, abd bulk dollar amounts for each product.

Memory registers and routines for bulk totalizing are well known in the art, and are easily programmed into an Intel microprocessor, as shown by the U.S. patent to F. T. Check, Jr. entitled: MICROCOMPUTERIZED ELECTRONIC POSTAGE METER SYSTEM, Pat. No. 3,978, 457; issued Aug. 31, 1976. Such teachings are desired to be incorporated herein by reference.

After the compilation report is printed upon ticket 15', the ticket 15' is removed or ejected from slot 40 (FIG. 1*a*), and the portable data capsule 18 is removed from slot 23 on the face panel 25 of the calculator 20.

The truck operator will then return the capsule 18 to the central data station along with the station receipt portions of each customer ticket 15.

The compilation report 15' will also be deposited at the central data station.

Capsule 18, which has captured all the transactions of the delivery run, can now be plugged into slot 17 of console 11 (FIG. 1) to verify the receipts. All the transactions captured in capsule 18 will be displayed on the console display screen 13.

All the information contained in the capsuel 18 will also be recorded in computer 10, which will update the master file.

Figure 3:
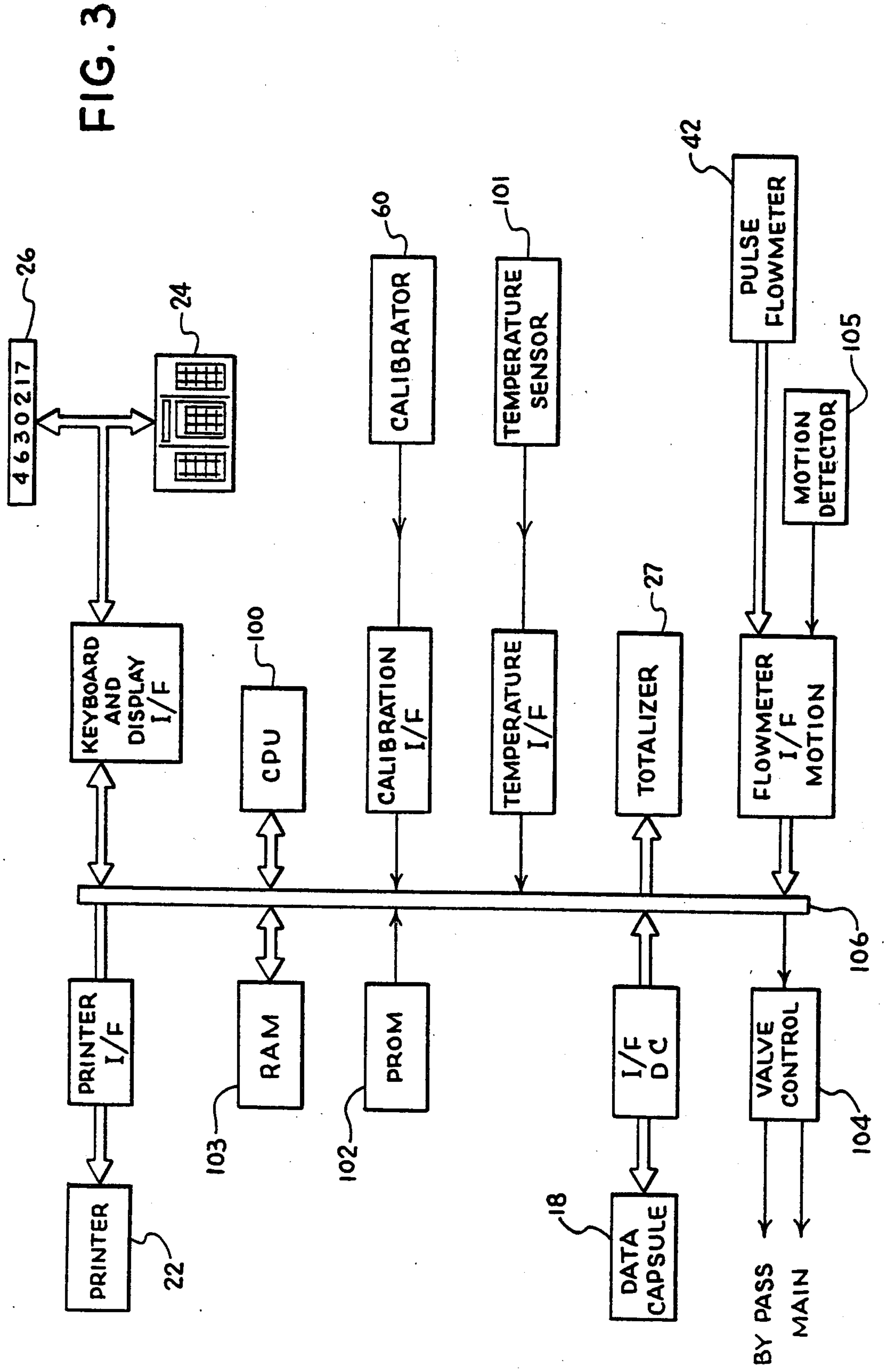
FIG. 3 is a diagramatic view of the delivery system for the data network illustrated in FIG. 1.

The calculator or microprocessor system for the data network of FIG. 1 is illustrated in FIG. 3. The calculator 20 of FIG. 1 comprises a system employing a central processor unit, 100 for providing data flow control and for providing calculation of the billing amounts for each delivery in accordance with the received information from the data capsule 18, the flowmeter 42, th calibrator 60, and a fuel temperature sensor 101. Coupled to the CPU 100 is a permanent non-alterable memory or PROM 102 which stores the delivery program. A temporary or RAM memory 103 is also provided for storing and forwarding working data in accordance with the operation of the CPU 100.

The use of a non-volatile memory for data capsule 18 is important in that data which is significant in the system, i.e., data regarding each delivery, is permanently stored or captured.

Further interaction is provided with the CPU 100 by means of the keyboard 24, which provides the appropriate data and information to the CPU 100 for data keeping and calculation purposes. The display 26 also interfaces with the CPU 100 for recalling data from the temporary storage 103 in accordance with keyboard commands.

The ultimate output of the CPU 100 is coupled to a customer ticket an compilation report printer 22 for printing the various receipts, bills, and data reports.

Under the influence of the CPU 100, the flow of the fluid commodity can be controlled via the aforementioned valve control device 104 comprising a pair of solenoid actuated valves. One valve can effect a complete shut-off of the flow, as when either of the ticket interlock or capsule interlock is operative. The other valve can cause a slowing of the flow just prior to shut-off. As an added tamper-proof feature, the system may comprise a motion detector 105 and an appropriate interlock, which will automatically cause a customer ticket 15 to be printed and the delivery data to be entered into the capsuel 18, if the truck is moved before the customer ticket has been printed. This or other interlocks may also be connected to the power train, braking system or ignition of the delivery vehicle.

All the various peripheral and interfacing components communicate with the CPU 100 via the data bus 106.

OPERATION OF THE SYSTEM

The calculator device or data processor 20 monitors fuel deliveries and loadings, as aforementioned. The data generated by each transaction is stored in the data capsule 18. Upon request, the data processor 20 also controls the fuel flow during delivery, based on a preset of predetermined volume or dollar amount.

When an entry is required from panel 24, the data processor 20 uses appropriate display buttons to prompt the operator. When the capsuel is full, or when so requested by the operator, the data processor 20 compiles and totals all the data. These totals are stored in capsule 18. Hard copy print-outs are generated for each transaction, as aforementioned, and also for the compilation report. A data processor 20 which can be used for the above purposes is an Intel 8085 microprocessor.

Figure 6:
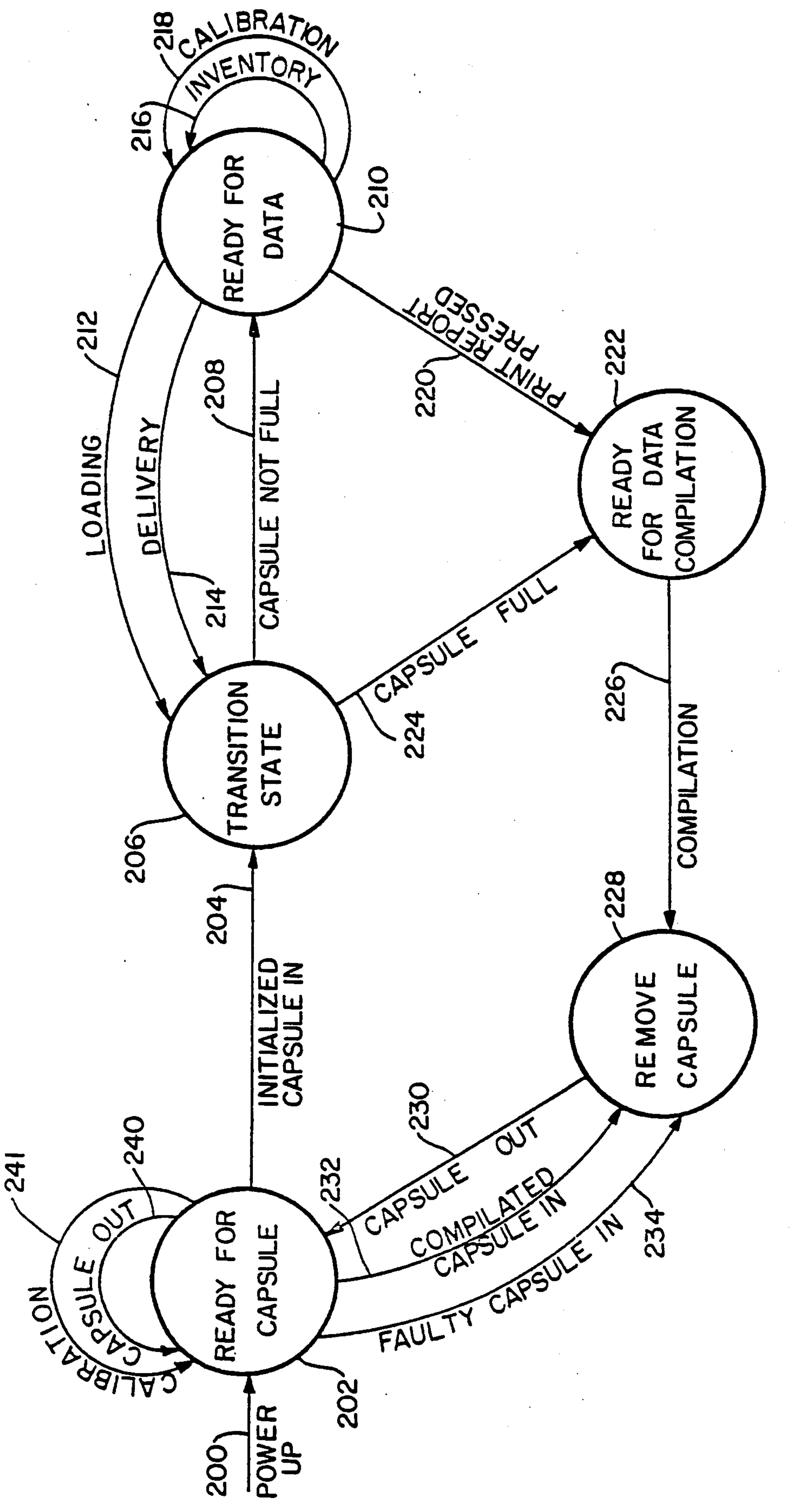
FIG. 6 is a flow chart diagram for the over-all process definition of the invention.

Referring to the program in the attached appendium, and to the flow chart of FIG. 6, a process definition is given for the above functions.

The data processor 20 is powered-up as shown by input line 200. The panel 23 will then respond by indicating the processor's readiness for insertion for the data capsule 18, as shown in circular block 202. Upon proper insertion of the data capsule 18 and initialization, block 202 is exited along line 204, and initialization is accomplished by proceeding through the preprogrammed interrogation subroutine, which subroutine guides the operator in the procedure of entering information such as operator identification (previously refered to). In the transition state, the capsule and processor can receive data and information by entering block 210 via line 208.

The received data can be for (1) loading the truck at the depot with fuel for subsequent delivery, or for, (2) each delivery at a particular delivery site. Such data is respectively fed to the capsule via lines 212 and 214. Also, the processor is in the mode to receive inventory data from the keyboard panel via line 216, and calibration data from the keyboard via line 218.

At any time a print-out is requested in this mode, a compilation report can be obtained by pressing button 54 on panel 24, exiting on line 220 to circular block 222.

In transition block 206, a compilation report will be obtained by exiting on line 224, indicating the capsule 18 has reached its storage capacity. No further receipt of data is then possible. From circular block 222, line 226 is used to enter block 228, wherein the capsule 18 can be removed from slot 23 in panel 24.

The capsule can also be removed after entering block 202 by exiting lines 230, 232, and 234, respectively. Line 230 indicates that the "remove capsule" button 70 has been pressed on panel 24 via line 240. Line 232 indicates that a compilated capsule has been inserted into slot 23, and line 234 indicates that a faulty capsule was inserted.

The "ready for capsule" mode (block 202) may have to wait for the calibration of the system in accordance with the sub-routine of line 241. Such a routine can be accomplished without the insertion of the capsule 18 into slot 23 of panel 24.

Figure 7:
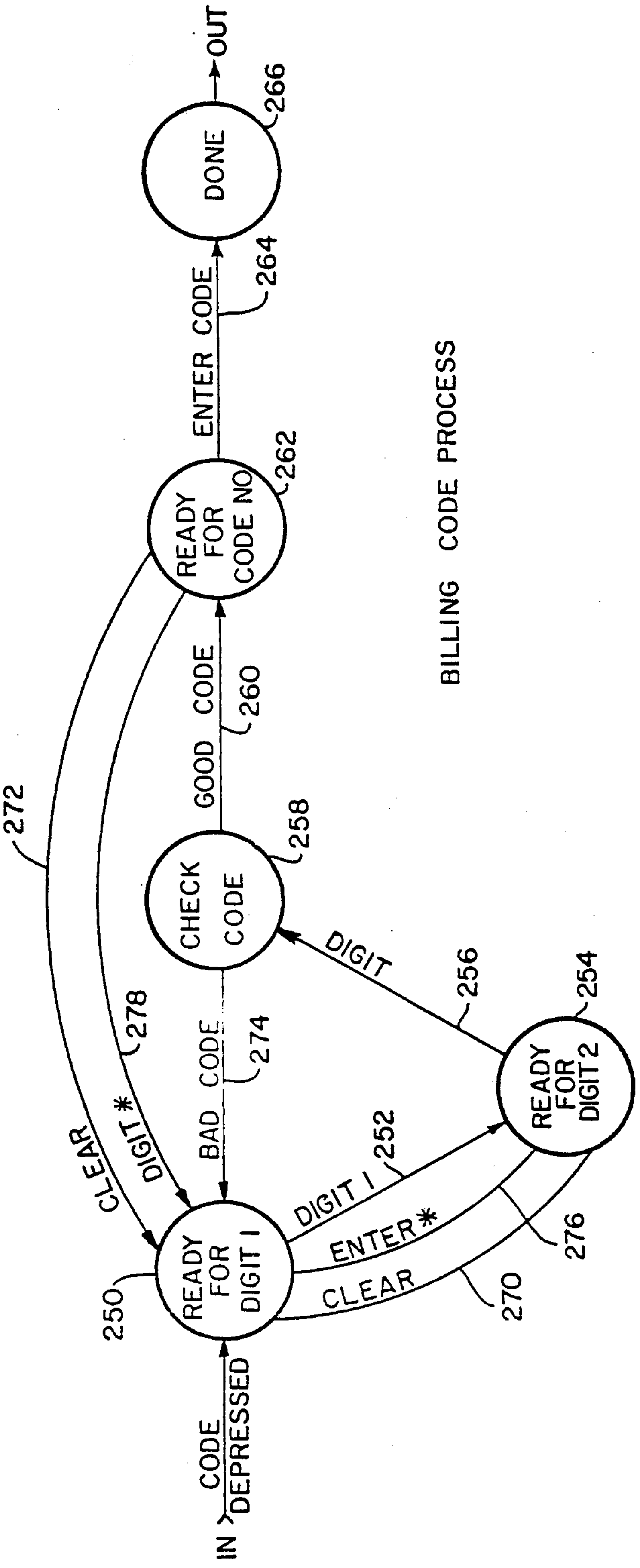
FIG. 7 is a flow chart diagram of a typical sub-routine in the billing process of this invention.

During initialization, the operator enters the customer code for billing purposes. This sub-routine operation is illustrated in the flow chart of FIG. 7. The "ready for digit 1" block (block 250) is entered and defines the state where the processor is awaiting the first digit. If a first digit has been entered properly, block 250 is exited along line 252 to block 254. The block 254 defines the state where the processor awaits the second digit of the customer code. If the second digit has been properly received the sub-routine will take line 256 to block 258 and check the entered two-digit code to see if it is valid. This is a transient state prior to checking the code against the code stored in capsule memory. If the code matches the stored code number, line 260 is exited and block 262 is entered. The "ready for code number" state is the state where the process awaits the depression of the ENTRY button 32 on panel 24. When the code is entered (line 264), the "done" block 266 is entered.

The "done" block will provide illumination of the customer's billing code in the display, and will call up from memory the unit price data for the fuel delivery. This will include a discount if applicable.

The "ready for digit 1" block can be returned to, from either block 254 or from block 262 if the clear button 30 is depressed (respective lines 270 and 272). The block 250 can also be re-entered via line 274 from block 258, which indicates that an improper or bad code has been chosen.

If a valid code is entered, but does not match a stored billing code, block 250 is re-entered via line 278 from block 262, and the operator must re-enter another two digit number.

If an improper first digit button is depressed the routine will re-enter block 250 from block 254 via line 276.

Following the "billing code" sub-routine (instruction 38 on panel 24), the routine will jump to the next instruction, which is "zone" instruction 39. The operator will enter a single digit number. This routine is similar to the "billing code" routine.

Most of the routines and sub-routines of the initialization process instruct the operator to perform a sequential function, which function is then verified by the memory or some other sensing device. For example, the insertion of a customer ticket according to the instruction box 36 of panel 24 is verified by a switch or photocell disposed in the ticket slot 40 of the printer 22.

A knowledge of all the routines and sub-routines can be obtained from the attached program in the Appendium, which program uses an Intel program language format known as PLM.

It should be understood that the present invention has been presented herein in an exemplary fashion since many modifications and changes can be realized by the skilled practitioner. Various changes can be made in the various data gathering procedures and equipments as befits a particular intended purpose. The invention is intended as a teaching in the best mode of how such a delivery system may operate. The protection sought by way of Letters Patent is intended to be encompassed within the spirit, scope and purview of the following appended claims.

APPENDIX

COMPUTER PROGRAM

```
   DO,
    DELCDE=2;
    CALL CLEAR$DISPLAY,
    DATA$WORD$8279=70H;
    CALL ERROR$PROCESS;
    DELIVERY$CODE=0;
   END;
   ELSE */ /*REMOVED AT PEB REQUEST*/
   CALL PRINTD;
   IF DELCDE<2 THEN
   DO;
    CALL STATUS$LAMP(097H);
    CALL STATUS$LAMP(0B7H);
    CALL STATUS$LAMP(0CBH);
    CALL STATUS$LAMP(0ABH);
    CODE=0;
    DO WHILE CODE=0;
     PRESSED$KEY=READ$KEYBOARD;
     IF PRESSED$KEY=RUNOUT$KEY THEN
     DO;
      DELIVERY$CODE=DELIVERY$CODE OR 8;
                                          /* RUNOUT CODE */
      CALL STATUS$LAMP(RUNOUT$LAMP);
     END;
     IF PRESSED$KEY=CHEQUE$KEY THEN CODE=3;
     IF PRESSED$KEY=CHARGE$KEY THEN CODE=2;
     IF PRESSED$KEY=CASH$KEY THEN CODE=1;
    END;
    CALL STATUS$LAMP(CHEQUE$LAMP);
    CALL STATUS$LAMP(CHARGE$LAMP);
    CALL STATUS$LAMP(CASH$LAMP);
    CALL STATUS$LAMP(RUNOUT$LAMP);
   END;
   ELSE
    CODE=0;
   DELIVERY$CODE=DELIVERY$CODE OR CODE;
   IF STORE$DATA$STRING$TO$CAPSULE(.DELIVERY$CODE,20+DELIVERY$ITEM$START,
1,1) THEN
    STATE=1;
   CALL DELIVERY$CHECKSUM;
   IF STATE=1 THEN   /* ERROR  */
   DO;
   END;
   ELSE
    CALL CLEAR$ALL;  /* CLEAR DISPLAY,LAMPS */
  END;
 END;
 ELSE
 DO;
  DELIVERY$CODE=DELIVERY$CODE AND 0BH; /*PARTIAL*/
  CALL DMI40(23);
  CALL CLEAR$ALL; /*DECIMAL OFF*/
  CALL CLEAR$DISPLAY;
  DATA$WORD$8279=20H;
  CALL ERROR$PROCESS;
 END;
 RETURN 1;
END DELIVERY$PROCESS;
END DELIVERY$MODULE;
 CALL CLEAR$ALL;  /
 CALL DMI40(23)
 RETURN 0;
END;
CMD$WORD$8279=8;
LAST$DISPLAY$DIGIT=5;
VALVE$CONTROL$DATA=3;   /* OPEN BOTH VALVES */
```

```
  CALL FLOWMETER;
  VALVE$CONTROL$DATA=0;  /* CLOSE BOTH VALVES */
  IF VOLUME(0)>127 THEN
  DO;
   CALL INITIALIZE$VOLUME;
   VOL5=0;
  END;
/*IF VOLUME(5)>4 THEN CALL BCD$ADD(1,6,.ROUNDOFF,.VOLUME,.CARRY$STATUS);*/
  CALL BCD$MULTIPLY(4,6,8,.UNIT$PRICE,.VOLUME,.BASE$PRICE);  /* TRUNCATE */
  CALL BCD$MULTIPLY(3,6,7,.TAX$1,.VOLUME,.TAX1$PRICE);
  CALL BCD$MULTIPLY(3,6,7,.TAX$2,.VOLUME,.TAX2$PRICE);
  DO I=0 TO 5;
   VOLUME$DELIVERED(I)=VOLUME(I);
   TOTAL$PRICE(I)=BASE$PRICE(I+2);
  END;
  CALL BCD$ADD(7,6,.TAX1$PRICE,.TOTAL$PRICE);
  CALL BCD$ADD(7,6,.TAX2$PRICE,.TOTAL$PRICE);
/* UPDATE TOTALIZER */
  CALL BCD$ADD(1,6,.VOL$TENTHS,.VOLUME);
  IF CARRY$STATUS THEN
   TOTALIZER$DATA$WORD=0FEH;   /* PULSE FWD TOTALIZER */
  VOL$TENTHS=VOLUME(5);

  IF (CONTACT$TRANSITION AND 20H)>0 THEN  /* FULL */
  DO;
   DELIVERY$CODE=4;
   DELCDE=1;
  END;
  IF (CONTACT$TRANSITION AND 40H)>0 THEN  /* PARTIAL */
  DO;
   DELIVERY$CODE=0;
   DELCDE=0;
  END;
  IF (CONTACT$TRANSITION AND 10H)>0 THEN  /* MOTION */
  DO;
   DELCDE=2;
   DELIVERY$CODE=0;
  END;
  IF STATE=1 THEN  /* ERROR */
  DO;
   CAPSULE$DEL$CODE= 4;   /* ERROR CODE */
   CALL WRITE$DELIVERY$DATA$TO$CAPSULE;
   CALL DELIVERY$CHECKSUM;
   CALL PRINTD;
   CALL CLEAR$DISPLAY;
   DATA$WORD$8279=50H;
   CALL ERROR$PROCESS;
   CALL CLEAR$ALL; /*CLEAR DISPLAY,LAMPS*/
   RETURN 0;
  END;
  ELSE
  DO;
   CALL WRITE$DELIVERY$DATA$TO$CAPSULE;
/* IF TICKET$ERROR THEN
 DO WHILE (INPUT(078H) AND 40H)=0;
  PRESSED$KEY=READ$KEYBOARD;
  IF PRESSED$KEY=CUSTOMER$KEY THEN
  DO;
 * CALL CLEAR$DISPLAY;
   DO I=0 TO 6;
    DATA$WORD$8279=SHL(CUSTOMER$CODE(I),4);
   END; */
   CALL CUST$CODE(1);
   CALL CLEAR$DISPLAY,
  END;
  IF (PRESSED$KEY=DRIVER$KEY) AND (NO$EXC<8) THEN
  DO;
   CALL STATUS$LAMP(0AEH);  /*DRIVER LAMP ON*/
   IF FIXED$DIGIT$ENTRY(3,.NEW$DRIVER$NO,0) THEN
    DRIVER$EXC=1;
```

```
 CALL STATUS$LAMP(DRIVER$LAMP);
 CALL CLEAR$DISPLAY;
END;
IF PRESSED$KEY=PRESET$DOL$KEY THEN
 CALL PRESET$DOLLAR$PROCESS;
IF PRESSED$KEY=PRESET$LT$KEY THEN
 CALL PRESET$VOLUME$PROCESS;
IF PRESSED$KEY=ZONE$KEY THEN
 CALL ZONE$EXCEPTION$PROCESS;
IF PRESSED$KEY=BILLING$CODE$KEY THEN
 CALL BILLING$CODE$EXCEPTION$PROCESS;
IF PRESSED$KEY=UNIT$PRICE$KEY THEN
 CALL PRICE$EXCEPTION$PROCESS;
IF PRESSED$KEY=TAX$KEY THEN
 CALL TAX$EXCEPTION$PROCESS;
CALL DMI40(11H); /*RE-ENABLE TICKET GRAB AFTER EXCEPTIONS*/
IF PRESSED$KEY=CLEAR$KEY THEN
DO;
 CALL CLEAR$ALL; /* CLEAR DISPLAY,LAMPS */
 RETURN 0;
END;
END;
CALL STATUS$LAMP (INSERT$TICKET$LAMP);
CALL STATUS$LAMP(OEEH); /*TENTHS DECIMAL ON*/
CALL CLEAR$DISPLAY;
CALL INITIALIZE$VOLUME;
VOL5=0;
CALL READ$DATA$STRING$FROM$CAPSULE(.PRODUCT$CODE,54+38*ITEM$NO,2);
IF SEARCH$CAPSULE$FOR$DATA$MATCH(.PRODUCT$CODE,3696,.ITEM$NO,4) THEN
 GO TO CAP$ERR;
PRODUCT=ITEM$NO+1;
CALL READ$DATA$STRING$FROM$CAPSULE(.DATE,0,9); /*READ DATA AND DRIVER NO*/
DELNUM(0)=0;
DELNUM(1)=(DELIVERY$ITEM$NO+1)/10;
DELNUM(2)=(DELIVERY$ITEM$NO+1) MOD 10;
DELCDE=2; /* ERROR CODE (DEFAULT CONDITION) */
CALL READ$CALIBRATION$MEMORY(.FRCNUM,0,3);
CALL READ$CALIBRATION$MEMORY(.CALIB,24+23*ITEM$NO,7);
IF CALIB(6)=CHECKSUM(.CALIB,6) THEN
DO;
 IF DELIVERY$SETUP$PROCESS THEN
 DO;
  CALL CLEAR$DISPLAY;
  DATA$WORD$8279=60H;
  CALL ERROR$PROCESS;
  CALL READ$DATA$STRING$FROM$CAPSULE(.CUSTOMER$CODE,DELIVERY$ITEM$START,33);
   REV$CHECK$SUM=CHECK$SUM(.CUSTOMER$CODE,33); /* TYPED PROC */
   IF STORE$DATA$STRING$TO$CAPSULE(.REV$CHECK$SUM,33+DELIVERY$ITEM$START,
1,1) THEN
    STATE=1;
   RETURN;
END DELIVERY$CHECKSUM;


CUST$CODE: PROCEDURE (DFLT);
 DECLARE DFLT BYTE;

 CALL STATUS$LAMP(08BH); /*CUSTOMER LAMP ON*/
 L1000: RETURN$CODE=FIXED$DIGIT$ENTRY(7,.CCODE0,DFLT);
 IF RETURN$CODE THEN
 DO;
  SUM=(CCODE0+CCODE2+CCODE4+2*(CCODE1+CCODE3+CCODE5)) MOD 10;
  IF SUM<>CCODE6 THEN
  DO;
   CALL ERROR$PROCESS;
   GO TO L1000;
  END;
 END;
 CALL STATUS$LAMP(CUSTOMER$LAMP);
 RETURN;
END CUST$CODE;
```

```
/****************MAIN DELIVERY ROUTINE*******************/


DELIVERY$PROCESS:
PROCEDURE BYTE PUBLIC;
 DECLARE ITEM$OFFSET ADDRESS;

 CAPSULE$DEL$CODE=0FH;
 TICKET$ERROR=0;
 CALL CLEAR$ALL;
 DRIVER$EXC=0;
 ZONE=READ$DATA$CAPSULE(48);
 CALL CUST$CODE(0);
 IF RETURN$CODE=0 THEN RETURN 0;
 CALL CLEAR$DISPLAY;
 CALL READ$DATA$STRING$FROM$CAPSULE(.BILLING$CODE,39,2);
 IF SEARCH$CAPSULE$FOR$DATA$MATCH(.BILLING$CODE,
      52,.ITEM$NO,10) THEN  /* NOT FOUND */
 CAPERR: DO;
  CALL STATUS$LAMP(9EH); /*PRINT REPORT ON*/
  CALL CLEAR$DISPLAY;
  DATA$WORD$8279=30H;
  CALL ERROR$PROCESS;
  STATE=1; /*ERROR*/
  RETURN 0;
 END;
 CALL READ$DATA$STRING$FROM$CAPSULE(.UNIT$PRICE,
      ZONE*4+52+(ITEM$OFFSET:=38*ITEM$NO),4);
 CALL READ$DATA$STRING$FROM$CAPSULE(.TAX$1,76+ITEM$OFFSET,6);
 ZONE$CODE=ZONE;

 DELIVERY$MODE=0;  /* NORMAL MODE */
 CALL STATUS$LAMP (0CDH); /*INSERT TICKET ON*/
 CALL BCD$MULTIPLY(6,6,5,.FLOWMETER$COEFFICIENT,.CALIB,
.VOL$INCREMENT);
/* CALL BCD$MULTIPLY(5,5,5,.VOL$INCREMENT,.TEMP$CORRECTION,
      .VOLUME$DERIVATIVE); */
 UPWT0,UPWT1=0;
 UPWT2=TAXTWO0;
 UPWT3=TAXTWO1;
 UPWT4=TAXTWO2;
 CALL BCD$ADD(3,5,.TAX$1,.UNIT$PRICE$WITH$TAX);
 CALL BCD$ADD(4,5,.UNIT$PRICE,.UNIT$PRICE$WITH$TAX);
/* CALL BCD$MULTIPLY(6,7,5,.VOLUME$DERIVATIVE,.PRICE$INCREMENT,
      .PRICE$DERIVATIVE); */
 DO I=0 TO 5;
  RESTRICTOR(I)=VOLUME$DELIVERED(I);
 END;
 IF DELIVERY$MODE=0FFH THEN /*PRESET PRICE*/
 DO;
  COMPARE$DIGITS=3;
  IF BCD$DIVIDE(.UPWT0,.TOTAL$PRICE,.RESTRICTOR,6,5) THEN
   RETURN 1;
 END;
 DO I=0 TO 5;
  CUTOFF(I)=RESTRICTOR(I);
 END;
 CALL READ$CALIBRATION$MEMORY(.RESTRICT$VOL$VALUE,3,5);
 CALL BCD$SUBTRACT(3,6,.RESTRICT$VOL$VALUE,.RESTRICTOR);
 IF CARRY$STATUS>1FH THEN
 DO I=0 TO 5;
  RESTRICTOR(I)=0;
 END;
 CALL BCD$SUBTRACT(2,6,.CUTOFF$VOL$VALUE,.CUTOFF);
 IF CARRY$STATUS>1FH THEN
 DO I=0 TO 5;
  CUTOFF(I)=0;
 END;
 RETURN 0;
END DELIVERY$SETUP$PROCESS;
```

```
WRITE$DELIVERY$DATA$TO$CAPSULE:
PROCEDURE;
 DECLARE EXC$CHECK$SUM BYTE AT (.DRINUM$EXC$ITEM(12));

 IF STORE$DATA$STRING$TO$CAPSULE(.CUSTOMER$CODE,
(DELIVERY$ITEM$START:=432+34*DELIVERY$ITEM$NO),33,1) THEN
  STATE=1;
 IF DRIVER$EXC THEN
 DO;
  DO I=0 TO 5;
   DRINUM$EXC$ITEM(I+6)=VOLUME(I);
  END;
  EXC$CHECK$SUM=CHECK$SUM(.DRINUM$EXC$ITEM,12);
  IF STORE$DATA$STRING$TO$CAPSULE(.DRINUM$EXC$ITEM,3570+13*NO$EXC,13,1) THEN
   STATE=1;
  NO$EXC=NO$EXC+1;
 END;
 DELIVERY$ITEM$NO=DELIVERY$ITEM$NO+1;
END WRITE$DELIVERY$DATA$TO$CAPSULE;

DELIVERY$CHECKSUM: PROCEDURE;


  DATA$WORD$8279=0FFH;
  DO I=0 TO 2;
   DATA$WORD$8279=SHL(TAX$2(I),4); /* ADD TAX2 TO DISPLAY */
  END;
  RETURN$CODE=FLEX$DIGIT$ENTRY(3,.TAX$2,1,0);
 CALL CLEAR$DISPLAY;
 CALL STATUS$LAMP(TAX$LAMP);
 CALL STATUS$LAMP(DS1$DP);
 RETURN;
END TAX$EXCEPTION$PROCESS;


BILLING$CODE$EXCEPTION$PROCESS:
PROCEDURE;
 DECLARE (RETURN$CODE,I) BYTE;
 DECLARE NEW$BILLING$CODE(2) BYTE;
 DECLARE (BC0,BC1) BYTE AT (.NEW$BILLING$CODE);
 DECLARE (DIBC0,DIBC1) BYTE AT (.BILLING$CODE);
 BC0=DIBC0;
 BC1=DIBC1;
 CALL STATUS$LAMP(09BH); /*BILLING CODE ON*/
 L1000: IF FIXED$DIGIT$ENTRY(2,.NEW$BILLING$CODE,1) THEN
 DO;
  IF SEARCH$CAPSULE$FOR$DATA$MATCH(.NEW$BILLING$CODE,52,.ITEM$NO,10)=0
  THEN  /* CODE FOUND  */
  DO;
   DIBC0=BC0;
   DIBC1=BC1;
   CALL READ$DATA$STRING$FROM$CAPSULE(.UNIT$PRICE,
ZONE$CODE*4+52+38*ITEM$NO,4);
 /* READ TAX 1 AND TAX 2 FROM CAPSULE IN ONE OPERATION */
   CALL READ$DATA$STRING$FROM$CAPSULE(.TAX$1,76+38*ITEM$NO,6);
  END;
  ELSE
  DO;
   BC0=DIBC0;
   BC1=DIBC1;
   CALL ERROR$PROCESS;
   GO TO L1000;
  END;
 END;
 CALL CLEAR$DISPLAY;
 CALL STATUS$LAMP(BILLING$CODE$LAMP);
 RETURN;
END BILLING$CODE$EXCEPTION$PROCESS;
```

```
DELIVERY$SETUP$PROCESS:
PROCEDURE BYTE PUBLIC;
 DECLARE (SEARCH$ERROR,BORROW$STATUS) BYTE;
 DECLARE UNCOMP$FLOW$COEF(8) BYTE;
 DECLARE FLOWMETER$CORRECTION(6) BYTE;
/*DECLARE TEMP$CORRECTION(5) BYTE;*/
 DECLARE PROD$CODE(2) BYTE;
/*DECLARE VOLUME$DERIVATIVE(7) BYTE;*/
/*DECLARE TOTAL$TAX(3) BYTE;*/
/*DECLARE PRICE$DERIVATIVE(7) BYTE;*/
 DECLARE RESTRICT$VOL$VALUE(3) BYTE;
 DECLARE CUTOFF$VOL$VALUE(2) BYTE;
 DECLARE RESTRICT$PRICE$VALUE (6) BYTE AT (.UNCOMP$FLOW$COEF);
 DECLARE CUTOFF$PRICE$VALUE (5) BYTE AT (.UNCOMP$FLOW$COEF);
 END;
 RETURN;
END PRESET$DOLLAR$PROCESS;


PRICE$EXCEPTION$PROCESS:
PROCEDURE;
 DECLARE RETURN$CODE BYTE;

 CALL STATUS$LAMP(0EEH);
 CALL STATUS$LAMP(0A7H); /*UNIT PRICE LAMP ON*/
 RETURN$CODE=FLEX$DIGIT$ENTRY(4,.UNIT$PRICE,1,1);
 CALL CLEAR$DISPLAY;
 CALL STATUS$LAMP(UNIT$PRICE$LAMP);
 CALL STATUS$LAMP(DS1$DP);
 RETURN;
END PRICE$EXCEPTION$PROCESS;


ZONE$EXCEPTION$PROCESS:
PROCEDURE;
 DECLARE (RETURN$CODE,ZONE) BYTE;
 CALL STATUS$LAMP(0BBH); /*ZONE LAMP ON*/
 ZONE=ZONE$CODE;
L1000: IF FIXED$DIGIT$ENTRY(1,.ZONE,1) THEN
 DO;
  IF ZONE>0 AND ZONE<6 THEN
  ZONE$CODE=ZONE;
  ELSE
  DO;
   CALL ERROR$PROCESS;
   ZONE=ZONE$CODE;
   GO TO L1000;
  END;
  CALL READ$DATA$STRING$FROM$CAPSULE(.UNIT$PRICE,
          52+ZONE*4+38*ITEM$NO,4);
 END;
 CALL CLEAR$DISPLAY;
 CALL STATUS$LAMP(ZONE$LAMP);
 RETURN;
END ZONE$EXCEPTION$PROCESS;


TAX$EXCEPTION$PROCESS:
PROCEDURE;
 DECLARE (RETURN$CODE,I) BYTE;
 CALL STATUS$LAMP(0EEH);
 CALL STATUS$LAMP(087H); /*TAX LAMP ON*/
 CALL CLEAR$DISPLAY;
 DATA$WORD$8279=10H;    /* DISPLAY "1" */
 DATA$WORD$8279=0FFH;
 DATA$WORD$8279=0FFH;   /* SHIFT "1" LEFT 3 TIMES */
 DATA$WORD$8279=0FFH;
 DO I=0 TO 2;
  DATA$WORD$8279=SHL(TAX$1(I),4); /* ADD TAX 1 TO DISPLAY */
 END;
```

```
RETURN$CODE=FLEX$DIGIT$ENTRY(3,.TAX$1,1,0);
CALL CLEAR$DISPLAY;
 DATA$WORD$8279=20H;   /* DISPLAY "2" */
 DATA$WORD$8279=0FFH;
 DATA$WORD$8279=0FFH;   /* SHIFT "2" LEFT 3 TIMES */
END DMI40;


ENSOD:
PROCEDURE EXTERNAL;
END ENSOD;


DISSOD:
PROCEDURE EXTERNAL;
END DISSOD;


/*******************LOCAL PROCEDURES***********************/


PRESET$VOLUME$PROCESS:
PROCEDURE PUBLIC;
 DECLARE RETURN$CODE BYTE;


 CALL DISSOD;
 CALL STATUS$LAMP(PRESET$DOL$LAMP);
 CALL STATUS$LAMP(0DDH); /*PRESET LT LAMP ON*/
 CALL STATUS$LAMP(0EEH); /*TENTHS DECIMAL ON*/
 RETURN$CODE=FLEX$DIGIT$ENTRY(6,.VOLUME$DELIVERED,0,0);
 CALL CLEAR$DISPLAY;
 CALL STATUS$LAMP(DS1$DP);
 IF RETURN$CODE THEN
 DO;
  CALL ENSOD;
  DELIVERY$MODE=1;    /* PRESET VOL MODE */
 END;
 ELSE DO;
  DELIVERY$MODE=0;
  CALL STATUS$LAMP(PRESET$LT$LAMP);
 END;
 RETURN;
END PRESET$VOLUME$PROCESS;


PRESET$DOLLAR$PROCESS:
PROCEDURE;
 DECLARE RETURN$CODE BYTE;


 CALL DISSOD;
 CALL STATUS$LAMP(0DBH); /*PRESET $ LAMP ON*/
 CALL STATUS$LAMP(PRESET$LT$LAMP);
 CALL STATUS$LAMP(0DEH); /*HUNDREDTHS DECIMAL ON*/
 RETURN$CODE=FLEX$DIGIT$ENTRY(6,.TOTAL$PRICE,0,0);
 CALL CLEAR$DISPLAY;
 CALL STATUS$LAMP(DS2$DP);
 IF RETURN$CODE THEN
 DO;
  CALL ENSOD;
  DELIVERY$MODE=0FFH;    /* PRESET PRICE MODE */
 END;
 ELSE DO;
  DELIVERY$MODE=0;
  CALL STATUS$LAMP(PRESET$DOL$LAMP);

       ADRS$PROD) EXTERNAL;
  DECLARE (DIGITS$MLTPLR,DIGITS$MLTPLCD,DIGITS$PROD) BYTE;
  DECLARE (ADRS$MLTPLR,ADRS$MLTPLCD,ADRS$PROD) ADDRESS;
 END BCD$MULTIPLY;
```

```
READ$CALIBRATION$MEMORY:
PROCEDURE (RAM$ADRS,MEMORY$ADRS,DIGITS) EXTERNAL;
 DECLARE(RAM$ADRS,MEMORY$ADRS) ADDRESS;
 DECLARE DIGITS BYTE;
END READ$CALIBRATION$MEMORY;


SEARCH$CAPSULE$FOR$DATA$MATCH:
PROCEDURE (RAM$ADRS,CAPSULE$ADRS,ADRS$ITEM$NO,NO$OF$ITEMS)
           BYTE EXTERNAL;
 DECLARE (RAM$ADRS,CAPSULE$ADRS,ADRS$ITEM$NO) ADDRESS;
 DECLARE NO$OF$ITEMS BYTE;
END SEARCH$CAPSULE$FOR$DATA$MATCH;


CHECK$SUM:
PROCEDURE (ADRS$DATA,DIGITS) BYTE EXTERNAL;
 DECLARE ADRS$DATA ADDRESS;
 DECLARE DIGITS BYTE;
END CHECK$SUM;


FIXED$DIGIT$ENTRY:
PROCEDURE (DIGITS,ADRS$ARRAY,OPTION) BYTE EXTERNAL;
 DECLARE (DIGITS,OPTION) BYTE;
 DECLARE ADRS$ARRAY ADDRESS;
END FIXED$DIGIT$ENTRY;


FLEX$DIGIT$ENTRY:
PROCEDURE (DIGITS,ADRS$ARRAY,OPTION,AUTO$DSP) BYTE EXTERNAL;
 DECLARE (DIGITS,OPTION,AUTO$DSP) BYTE;
 DECLARE ADRS$ARRAY ADDRESS;
END FLEX$DIGIT$ENTRY;


ERROR$PROCESS:
PROCEDURE EXTERNAL;
END ERROR$PROCESS;


FLOWMETER:
PROCEDURE EXTERNAL;
END FLOWMETER;


PRINTD:
PROCEDURE EXTERNAL;
END PRINTD;


DMI40: PROCEDURE (CHAR) EXTERNAL;
 DECLARE CHAR BYTE;
 END STATUS$LAMP;


 READ$KEYBOARD:
 PROCEDURE BYTE EXTERNAL;
 END READ$KEYBOARD;


 CLEAR$DISPLAY:
 PROCEDURE EXTERNAL;
 END CLEAR$DISPLAY;

 CLEAR$ALL: PROCEDURE EXTERNAL;
 END CLEAR$ALL;

 INITIALIZE$VOLUME: PROCEDURE EXTERNAL;
 END INITIALIZE$VOLUME;
```

```
BCD$DIVIDE:
PROCEDURE(ADRS$DVSR,ADRS$DVND,ADRS$QUOT,DIG$DVSR,DIG$DVND) BYTE EXTERNAL;
 DECLARE (ADRS$DVSR,ADRS$DVND,ADRS$QUOT) ADDRESS;
 DECLARE (DIG$DVND,DIG$DVSR) BYTE;
END BCD$DIVIDE;


STORE$DATA$STRING$TO$CAPSULE:
PROCEDURE (ADRS$RAM,ADRS$DC,NO$OF$DIGITS,EH$FLAG) BYTE EXTERNAL;
 DECLARE (ADRS$RAM,ADRS$DC) ADDRESS;
 DECLARE (NO$OF$DIGITS,EH$FLAG) BYTE;
END STORE$DATA$STRING$TO$CAPSULE;


READ$DATA$CAPSULE: PROCEDURE (CAPADD) BYTE EXTERNAL;
 DECLARE CAPADD ADDRESS;
END READ$DATA$CAPSULE;


READ$DATA$STRING$FROM$CAPSULE:
PROCEDURE (ADRS$RAM,ADRS$DC,DIGITS) EXTERNAL;
 DECLARE (ADRS$RAM,ADRS$DC) ADDRESS;
 DECLARE DIGITS BYTE;
END READ$DATA$STRING$FROM$CAPSULE;


BCD$ADD:
PROCEDURE (DIGITS$INCR,DIGITS$TOTAL,ADRS$INCR,ADRS$TOTAL)
       EXTERNAL;
 DECLARE (DIGITS$INCR,DIGITS$TOTAL) BYTE;
 DECLARE (ADRS$INCR,ADRS$TOTAL) ADDRESS;
END BCD$ADD;


BCD$SUBTRACT:
PROCEDURE (DIGITS$INCR,DIGITS$TOTAL,ADRS$INCR,ADRS$TOTAL) EXTERNAL,
 DECLARE (DIGITS$INCR,DIGITS$TOTAL) BYTE;
 DECLARE (ADRS$INCR,ADRS$TOTAL) ADDRESS;
END BCD$SUBTRACT;


BCD$MULTIPLY:
PROCEDURE (DIGITS$MLTPLR,DIGITS$MLTPLCD,DIGITS$PROD,ADRS$MLTPLR,ADRS$MLTPLCD,
 DECLARE (CCODE0,CCODE1,CCODE2,CCODE3,CCODE4,CCODE5,CCODE6) BYTE
AT ( CUSTOMER$CODE);
 DECLARE (ZONE,TICKET$INSERTED,PRESSED$KEY,KEY$STATUS,CAL$CHECK$SUM,I,
         LOAD$ERROR,WRITE$ERROR$FLAG,DELIVERYCODE,
         RELATIVE$ADRS,CODE) BYTE;
 DECLARE DELIVERY$ITEM$START ADDRESS;
 DECLARE VALVE$CONTROL$DATA BYTE AT (0B000H);
 DECLARE DATA$WORD$8279 BYTE AT (0A000H);
 DECLARE CMD$WORD$8279 BYTE AT (0A001H);
 DECLARE DATA$WORD$PRINTER BYTE AT (07800H);
 DECLARE TOTALIZER$DATA$WORD BYTE AT (0B800H);
 DECLARE TEMP$DATA$WORD BYTE AT (0A800H);
 DECLARE CONTACT BYTE AT (07000H);
 DECLARE (RETURN$CODE,SUM) BYTE;
 DECLARE CARRY$STATUS BYTE EXTERNAL;
 DECLARE CALIB(7) BYTE;
 DECLARE BILL$CODE(2) BYTE;
 DECLARE PRODUCT$CODE(2) BYTE;
 DECLARE CODE$NOT$FOUND BYTE;
 DECLARE DRIVER$EXC BYTE;

/*****************LITERAL DECLARATIONS*******************/
 DECLARE CLEAR$KEY LITERALLY '0E1H';
 DECLARE PRESET$DOL$KEY LITERALLY '0D3H';
 DECLARE PRESET$LT$KEY LITERALLY '0DBH';
 DECLARE ZONE$KEY LITERALLY '0CCH';
 DECLARE BILLING$CODE$KEY LITERALLY '0EBH';
 DECLARE TAX$KEY LITERALLY '0DCH';
```

```
DECLARE UNIT$PRICE$KEY LITERALLY '0ECH';
DECLARE RUNOUT$KEY LITERALLY '0C4H';
DECLARE CASH$KEY LITERALLY '0D4H';
DECLARE CHEQUE$KEY LITERALLY '0E4H';
DECLARE CHARGE$KEY LITERALLY '0C5H';
DECLARE CUSTOMER$KEY LITERALLY '0E3H';
DECLARE DRIVER$KEY LITERALLY '0D2H';

DECLARE ERROR$LAMP LITERALLY '57H';
DECLARE CUSTOMER$LAMP LITERALLY '0BH';
DECLARE RUNOUT$LAMP LITERALLY '2BH';
DECLARE CASH$LAMP LITERALLY '4BH';
DECLARE CHEQUE$LAMP LITERALLY '17H';
DECLARE CHARGE$LAMP LITERALLY '37H';
DECLARE ZONE$LAMP LITERALLY '3BH';
DECLARE UNIT$PRICE$LAMP LITERALLY '27H';
DECLARE TAX$LAMP LITERALLY '07H';
DECLARE BILLING$CODE$LAMP LITERALLY '1BH';
DECLARE PRINT$REPORT$LAMP LITERALLY '0EH';
DECLARE PRESET$DOL$LAMP LITERALLY '5BH';
DECLARE PRESET$LT$LAMP LITERALLY '5DH';
DECLARE DS1$DP LITERALLY '6EH';
DECLARE DS2$DP LITERALLY '5EH';
DECLARE INSERT$TICKET$LAMP LITERALLY '4DH';
DECLARE DRIVER$LAMP LITERALLY '2EH';


/******************EXTERNAL PROCEDURES*********************/


STATUS$LAMP:
PROCEDURE (LAMP$NAME) EXTERNAL;
 DECLARE LAMP$NAME BYTE;
DELIVERY$MODULE:
DO;

/*******************EXTERNAL DECLARATIONS*************************/

 DECLARE STATE BYTE EXTERNAL;
 DECLARE CONTACT$TRANSITION BYTE PUBLIC;
 DECLARE DELIVERY$ITEM$NO BYTE EXTERNAL;  /* MUST BE INITIALIZED TO 0 */
 DECLARE VOLUME(11) BYTE EXTERNAL;        /* AT POWER ON             */
 DECLARE VOL5 BYTE AT (.VOLUME+5);
 DECLARE PRICE(11) BYTE PUBLIC;
 DECLARE VOL$TENTHS BYTE EXTERNAL;
 DECLARE FLOWMETER$COEFFICIENT(6) BYTE PUBLIC
DATA (1,0,0,0,0,0);
 DECLARE RESTRICTOR(7) BYTE PUBLIC;
 DECLARE CUTOFF(7) BYTE PUBLIC;
 DECLARE PRICE$INCREMENT(9) BYTE PUBLIC;
 DECLARE VOL$INCREMENT(7) BYTE PUBLIC;
 DECLARE DELIVERY$MODE BYTE PUBLIC;
 DECLARE ITEM$NO BYTE PUBLIC;
 DECLARE ROUNDOFF BYTE DATA(1);
 DECLARE UNIT$PRICE$WITH$TAX(5) BYTE;
 DECLARE (UPWT0,UPWT1,UPWT2,UPWT3,UPWT4) BYTE AT (.UNIT$PRICE$WITH$TAX),

 DECLARE CUSCDE(7) BYTE PUBLIC AT (.CUSTOMER$CODE);
 DECLARE BILCDE(2) BYTE PUBLIC AT (.BILLING$CODE);
 DECLARE PRICEU(4) BYTE PUBLIC AT (.UNIT$PRICE);
 DECLARE TAXONE(3) BYTE PUBLIC AT (.TAX$1);
 DECLARE TAXTWO(3) BYTE PUBLIC AT (.TAX$2);
 DECLARE DELVOL(6) BYTE PUBLIC AT (.VOLUME$DELIVERED);
 DECLARE PRICET(6) BYTE PUBLIC AT (.TOTAL$PRICE);
 DECLARE PRICEZ BYTE PUBLIC AT (.ZONE$CODE);
 DECLARE DRINUM$EXC$ITEM(13) BYTE;
 DECLARE NEW$DRIVER$NO(3) BYTE AT (.DRINUM$EXC$ITEM);
 DECLARE DELNUM(3) BYTE PUBLIC AT (.DRINUM$EXC$ITEM+3);
 DECLARE DATE(6) BYTE PUBLIC;
 DECLARE DRINUM(3) BYTE PUBLIC;
 DECLARE FRCNUM(3) BYTE PUBLIC;
```

```
 DECLARE DELCDE BYTE PUBLIC;
 DECLARE (LAST$DISPLAY$DIGIT,COMPARE$DIGITS) BYTE EXTERNAL;
 DECLARE NO$EXC BYTE PUBLIC;
 DECLARE BASE$PRICE(10) BYTE PUBLIC;
 DECLARE (TAX1$PRICE,TAX2$PRICE)(9) BYTE PUBLIC;
 DECLARE PRODUCT BYTE PUBLIC;
 DECLARE TICKET$ERROR BYTE PUBLIC;

/*********************LOCAL DECLARATIONS**********************/

 DECLARE (CAPSULE$ADRS,CALIBRATION$ADRS) ADDRESS;
 DECLARE CUSTOMER$CODE(7) BYTE;
 DECLARE BILLING$CODE(2) BYTE;
 DECLARE ZONE$CODE BYTE;
 DECLARE UNIT$PRICE(4) BYTE;
 DECLARE TAX$1(3) BYTE;
 DECLARE TAX$2(3) BYTE;
 DECLARE (TAXTWO0,TAXTWO1,TAXTWO2) BYTE AT (.TAX$2);
 DECLARE CAPSULE$DEL$CODE BYTE;
 DECLARE VOLUME$DELIVERED(6) BYTE;
 DECLARE TOTAL$PRICE(6) BYTE;
 DECLARE REV$CHECK$SUM BYTE;

KBD$DIGIT
DO;
DIGIT$KEY: PROCEDURE (KEYCODE) BYTE PUBLIC;
 DECLARE (KEYCODE,I) BYTE;
 DECLARE BCD(10) BYTE DATA (19H,0,8,10H,18H,20H,28H,1,9,11H);

 DO I=0 TO 9;
  IF (KEYCODE AND 3FH)=BCD(I) THEN RETURN I;
 END;
 RETURN OFFH;
END DIGIT$KEY;
END KBD$DIGIT;

ADD$MODULE:
DO;

 DECLARE CARRY$STATUS BYTE PUBLIC;

BCD$ADD: PROCEDURE
  (DIGITS$IN$INCR,DIGITS$IN$TOTAL,START$OF$INCR,START$OF$TOTAL) PUBLIC;
 DECLARE (DIGITS$IN$INCR,DIGITS$IN$TOTAL,CARRY,SUM,INDEX,I) BYTE,
 DECLARE (START$OF$INCR,START$OF$TOTAL,CARRY$BIT) ADDRESS;
 DECLARE (INCREMENT BASED START$OF$INCR)(16) BYTE;
 DECLARE (RUNNING$TOTAL BASED START$OF$TOTAL)(16) BYTE;

 CARRY,CARRY$STATUS=0;
 CARRY$BIT=1;
 DIGITS$IN$INCR=DIGITS$IN$INCR-1;
 DIGITS$IN$TOTAL=DIGITS$IN$TOTAL-1;
 DO I=0 TO DIGITS$IN$TOTAL;
  INDEX=DIGITS$IN$TOTAL-I;
  SUM=RUNNING$TOTAL(INDEX)+CARRY;
  IF DIGITS$IN$INCR>=I THEN
   SUM=SUM+INCREMENT(DIGITS$IN$INCR-I);
  IF SUM>9 THEN
  DO,
   SUM=SUM-10;
   CARRY=1;
  END;
  ELSE CARRY=0;
  RUNNING$TOTAL(INDEX)=SUM;
  IF CARRY THEN
  CARRY$STATUS=CARRY$STATUS+CARRY$BIT;
  CARRY$BIT=CARRY$BIT+CARRY$BIT;
 END;
END BCD$ADD;
END ADD$MODULE;
```

```
STO REC:
   DO;
  WRITE$TO$DATA$CAPSULE: PROCEDURE (CAP$ADDR,DIGIT,EF$ADDR) EXTERNAL;
   DECLARE (CAP$ADDR,EF$ADDR) ADDRESS;
   DECLARE DIGIT BYTE;
  END WRITE$TO$DATA$CAPSULE;

  ERROR$PROCESS: PROCEDURE EXTERNAL;
  END ERROR$PROCESS;

  CLEAR$DISPLAY: PROCEDURE EXTERNAL;
  END CLEAR$DISPLAY;

  READ$DATA$CAPSULE: PROCEDURE (CAP$ADDR) BYTE EXTERNAL;
   DECLARE CAP$ADDR ADDRESS;
  END READ$DATA$CAPSULE;

  STORE$DATA$STRING$TO$CAPSULE:
  PROCEDURE (RAM$ADDR,START$ADDR,NO$OF$DIGITS,EHFLAG) BYTE PUBLIC;
   DECLARE (RAM$ADDR,START$ADDR,CAPSULE$ADDR) ADDRESS;
   DECLARE (DUMMY,NO$OF$DIGITS,EHFLAG,TEMP$EFLG) BYTE;
   DECLARE EFLAG BYTE;
   DECLARE DIGIT BASED RAM$ADDR BYTE;
   DECLARE CAPSULE$TYPE BYTE AT (8000H);
   DECLARE CAPSULE$CONTROL BYTE AT (8800H);
   DECLARE EAROM LITERALLY '0';
   DECLARE ERROR LITERALLY '4';
   DECLARE CAP$STATUS LITERALLY '49';
   DECLARE ON LITERALLY '1';
   DECLARE BAD$LOAD LITERALLY '10H';
   DECLARE DISPLAY BYTE AT (0A000H);

   TEMP$EFLG=0;
  /*TURN ON CAPSULE POWER AND PROGRAMMING VOLTAGE*/

  /*CALL UTILITY TO WRITE EACH INDIVIDUAL DIGIT INTO CAPSULE*/
   DO CAPSULE$ADDR=START$ADDR TO (START$ADDR-1+NO$OF$DIGITS);
    CALL WRITE$TO$DATA$CAPSULE(CAPSULE$ADDR,DIGIT,.EFLAG);
    TEMP$EFLG=TEMP$EFLG+EFLAG;
    RAM$ADDR=RAM$ADDR+1;
   END;
   IF TEMP$EFLG>0 THEN
   DO;
    /*SET ERROR BIT IN CAPSULE STATUS IF IT IS NOT ALREADY SET*/
    CALL WRITE$TO$DATA$CAPSULE (CAP$STATUS,(READ$DATA$CAPSULE(49) AND 0BH),
    MMY);
    IF EHFLAG=1 THEN
    DO /*IF REQUESTED, LIGHT ERROR LAMP AND DISPLAY ERROR CODE*/;
     CALL CLEAR$DISPLAY;
     DISPLAY=BAD$LOAD;
     CALL ERROR$PROCESS;
    END;
    RETURN 1;
   END;
   ELSE RETURN 0;
   ENDSTORE$DATA$STRING$TO$CAPSULE;
  ENDSTOREC;

ERROR$MODULE:
DO;

 CLEAR$ALL: PROCEDURE EXTERNAL;
 END CLEAR$ALL;

 READ$KEYBOARD:PROCEDURE BYTE EXTERNAL;
 END READ$KEYBOARD;

 STATUS$LAMP: PROCEDURE (LAMP$ON$OFF) EXTERNAL;
  DECLARE (LAMP$ON$OFF) BYTE;
 END STATUS$LAMP;
```

```
 ERROR$PROCESS: PROCEDURE PUBLIC;
  DECLARE CLEAR$KEY LITERALLY '0E1H';
  DECLARE ERROR$LAMP LITERALLY '57H';

  CALL STATUS$LAMP(0D7H); /*ERROR LAMP ON*/
  DO WHILE 1;
   IF READ$KEYBOARD=CLEAR$KEY THEN
   DO;
    CALL CLEAR$ALL;
    RETURN;
   END;
  END;
 END ERROR$PROCESS;
END ERROR$MODULE;

SUBTRACT$MODULE.
DO;

DECLARE CARRY$STATUS BYTE EXTERNAL;

BCD$SUBTRACT: PROCEDURE
 (DIGITS$IN$INCR,DIGITS$IN$TOTAL,START$OF$INCR,START$OF$TOTAL) PUBLIC;
 DECLARE (DIGITS$IN$INCR,DIGITS$IN$TOTAL,BORROW,DIFF,INDEX,I) BYTE;
 DECLARE (START$OF$INCR,START$OF$TOTAL,BORROW$BIT) ADDRESS;
 DECLARE (INCREMENT BASED START$OF$INCR)(16) BYTE;
 DECLARE (RUNNING$TOTAL BASED START$OF$TOTAL)(16) BYTE;

 BORROW,CARRY$STATUS=0;
 BORROW$BIT=1;
 DIGITS$IN$INCR=DIGITS$IN$INCR-1;
 DIGITS$IN$TOTAL=DIGITS$IN$TOTAL-1;
 DO I=0 TO DIGITS$IN$TOTAL;
  INDEX=DIGITS$IN$TOTAL-I;
  DIFF=(RUNNING$TOTAL(INDEX) - BORROW);
  IF DIGITS$IN$INCR>=I THEN
   DIFF=DIFF-INCREMENT(DIGITS$IN$INCR-I);
  IF DIFF>127 THEN
  DO;
   DIFF=DIFF+10;
   BORROW=1;
  END;
  ELSE BORROW=0;
  RUNNING$TOTAL(INDEX)=DIFF;
  IF BORROW THEN
  CARRY$STATUS=CARRY$STATUS+BORROW$BIT;
  BORROW$BIT=SHL(BORROW$BIT,1);
 END;
END BCD$SUBTRACT;
END SUBTRACT$MODULE;

READCAP$STRING$MODULE


DO;

 READ$DATA$CAPSULE: PROCEDURE(CAPSULE$ADDR) BYTE EXTERNAL;
  DECLARE CAPSULE$ADDR ADDRESS;
 END READ$DATA$CAPSULE.

 READ$DATA$STRING$FROM$CAPSULE:
 PROCEDURE(RAM$START$ADDR,CAPSULE$START$ADDR,TOTAL$NUMBER$DIGITS) PUBLIC;
  DECLARE (RAM$START$ADDR,RAM$ADDR) ADDRESS;
  DECLARE RAM$DIGIT BASED RAM$ADDR BYTE;
  DECLARE (CAPSULE$START$ADDR,CAPSULE$ADDR) ADDRESS;
  DECLARE TOTAL$NUMBER$DIGITS BYTE;
  DECLARE CAPSULE$CONTROL BYTE AT (8800H);

  RAM$ADDR=RAM$START$ADDR /*INITIALIZE RAM ADDRESS*/;
```

```
/*TRANSFER DATA STRING FROM DATA CAPSULE TO PROCESSOR RAM*/

  DO CAPSULE$ADDR=CAPSULE$START$ADDR TO
                CAPSULE$START$ADDR+TOTAL$NUMBER$DIGITS-1;
   RAM$DIGIT=READ$DATA$CAPSULE(CAPSULE$ADDR);
   RAM$ADDR=RAM$ADDR+1;
  END;

  RETURN;
 END READ$DATA$STRING$FROM$CAPSULE;
END READCAP$STRING$MODULE;

SEARCH$CAPSULE$MODULE.
DO;

 DECLARE STATE BYTE EXTERNAL;

READ$DATA$STRING$FROM$CAPSULE:
PROCEDURE(RAM$ADRS, DC$ADRS, DIGITS) EXTERNAL;
 DECLARE(RAM$ADRS, DC$ADRS) ADDRESS;
 DECLARE DIGITS BYTE;
END READ$DATA$STRING$FROM$CAPSULE;

SEARCH$CAPSULE$FOR$DATA$MATCH:
PROCEDURE(ADRS$INPUT$DATA, CAPSULE$ADRS, ADRS$ITEM$NO,
          NO$OF$ITEMS) BYTE PUBLIC;
 DECLARE (ADRS$INPUT$DATA, CAPSULE$ADRS, ADRS$ITEM$NO,
          ADRS$ERROR$FLAG, DC$ADRS) ADDRESS;
 DECLARE (INPUT BASED ADRS$INPUT$DATA)(2) BYTE;
 DECLARE ITEM$NO BASED ADRS$ITEM$NO BYTE;
 DECLARE (NO$OF$ITEMS, MLTPLR) BYTE;
 DECLARE CAPSULE$DATA(2) BYTE;


  IF CAPSULE$ADRS=52 THEN
   MLTPLR=38;
  IF CAPSULE$ADRS=3858 THEN
   MLTPLR=15;
  IF CAPSULE$ADRS=3696 THEN
   MLTPLR=39;
  DO ITEM$NO=0 TO (NO$OF$ITEMS-1);
   DC$ADRS=CAPSULE$ADRS+MLTPLR*ITEM$NO;
  CALL READ$DATA$STRING$FROM$CAPSULE(.CAPSULE$DATA, DC$ADRS, 2);
   IF INPUT(0)=CAPSULE$DATA(0) AND INPUT(1)=CAPSULE$DATA(1) THEN
    RETURN 0;
  END;
  RETURN 1;   /* NO MATCH FOUND */
 END SEARCH$CAPSULE$FOR$DATA$MATCH;
 END SEARCH$CAPSULE$MODULE;

   ARRAY(I)=BUFFER(I);        /*VALUE FROM BUFFER TO ARRAY*/
   DATA$WORD$8279=SHL(ARRAY(I),4);
  END;
  DIGIT$COUNTER=0;
 END;
 ELSE DO;
  DIGIT=DIGIT$KEY(KEY$CODE);
  IF DIGIT<10 THEN
  DO;
   IF DIGIT$COUNTER<ARRAY$SIZE THEN
   DO;
    IF DIGIT$COUNTER=0 THEN
     CALL CLEAR$DISPLAY;
     ELSE DO I=0 TO (ARRAY$SIZE-2);
      ARRAY(I)=ARRAY(I+1);
     END;
    DATA$WORD$8279=SHL(DIGIT,4);
    ARRAY(ARRAY$SIZE-1)=DIGIT;
    DIGIT$COUNTER=DIGIT$COUNTER+1;
   END;
```

```
   END;
   ELSE DO;
    IF KEY$CODE=ENTER$KEY THEN
    DO;
     I=ARRAY$SIZE-DIGIT$COUNTER;
     IF DIGIT$COUNTER=0 THEN
     DO;
      IF INPUT$MODE=OPTIONAL THEN
       RETURN DEFAULT$CODE;
     END;
     ELSE DO;
      DO WHILE I>0;
       ARRAY(I-1)=0;
       I=I-1;
      END;
      RETURN ENTER$CODE;
     END;
    END;
   END;
  END;
 END;
END FLEX$DIGIT$ENTRY;
END FLEXIBLE$ENTRY$MODULE;

/*FLEXIBLE DIGIT KEYBOARD ENTRY*/

FLEXIBLE$ENTRY$MODULE:
DO;
READ$KEYBOARD: PROCEDURE BYTE EXTERNAL;
END READ$KEYBOARD;

RELEASE$CAPSULE: PROCEDURE EXTERNAL;
END RELEASE$CAPSULE;

CLEAR$DISPLAY: PROCEDURE EXTERNAL;
END CLEAR$DISPLAY;

DMI40: PROCEDURE (CHAR) EXTERNAL;
 DECLARE CHAR BYTE;
END DMI40;

DIGIT$KEY: PROCEDURE(KEY$CODE) BYTE EXTERNAL;
 DECLARE KEY$CODE BYTE;
END DIGIT$KEY;

DECLARE ENB$SOL BYTE EXTERNAL; /*=1 IF CAPSULE MAY BE REMOVED*/
DECLARE RELEASE$KEY LITERALLY '0C4H'; /*RUNOUT KEY FOR PROTOTYPE--
WILL CHANGE TO REMOVE CAPSULE KEY LATER*/

FLEX$DIGIT$ENTRY;
PROCEDURE(ARRAY$SIZE,ARRAY$PTR,INPUT$MODE,AUTO$DSP) BYTE PUBLIC;
 DECLARE FOREVER LITERALLY 'WHILE 1';
 DECLARE ARRAY$PTR ADDRESS;
 DECLARE (ARRAY BASED ARRAY$PTR) (1) BYTE;
 DECLARE BUFFER (7) BYTE;
 DECLARE RETURN$CODE BYTE;
 DECLARE DATA$WORD$8279 BYTE AT (0A000H);
 DECLARE CLEAR$CODE LITERALLY '00H', ENTER$CODE LITERALLY '01H',
         DEFAULT$CODE LITERALLY '10H';
 DECLARE (DIGIT$COUNTER,INPUT$MODE,DIGIT,ARRAY$SIZE,I,KEY$CODE,STATUS$8279) BYTE
 DECLARE OPTIONAL LITERALLY '01H', MANDATORY LITERALLY '00H';
 DECLARE CLEAR$KEY LITERALLY '0E1H', ENTER$KEY LITERALLY '0E9H';
 DECLARE AUTO$DSP BYTE;

 CALL DMI40(12H); /*DISABLE TICKET ACCEPTANCE DURING EXCEPTIONS*/
/* INITIALIZE */
 IF AUTO$DSP THEN
  CALL CLEAR$DISPLAY;
 DO I=0 TO (ARRAY$SIZE-1);/*STORE DEFAULT VALUE IN ARRAY TO BUFFER*/
  BUFFER(I)=ARRAY(I);
```

```
 IF AUTO$DSP THEN
  DATA$WORD$8279=SHL(ARRAY(I),4);
END;
DIGIT$COUNTER=0; /*INITIALIZE #DIGITS IN WORKING ARRAY*/
DO FOREVER;
 KEY$CODE=READ$KEYBOARD;
 IF (KEY$CODE=RELEASE$KEY) AND END$SOL THEN
  CALL RELEASE$CAPSULE;
 IF KEY$CODE=CLEAR$KEY THEN
 DO;
  CALL CLEAR$DISPLAY;
  IF DIGIT$COUNTER=0 THEN
   RETURN CLEAR$CODE;
  IF INPUT$MODE=OPTIONAL THEN
  DO I=0 TO ARRAY$SIZE-1;    /*STORE AND DISPLAY DEFAULT*/
```

```
COMPARE$MODULE:
DO;
BCD$COMPARE:
PROCEDURE (DIGITS$IN$INPUT$1,DIGITS$IN$INPUT$2,ADRS$INPUT$1,
           ADRS$INPUT$2) BYTE PUBLIC;
 DECLARE (ADRS$INPUT$1,ADRS$INPUT$2) ADDRESS;
 DECLARE (INPUT$1 BASED ADRS$INPUT$1) BYTE;
 DECLARE (INPUT$2 BASED ADRS$INPUT$2) BYTE;
 DECLARE (DIGITS$IN$COMMON,DIGITS$IN$INPUT$1,DIGITS$IN$INPUT$2,DIFF,I,J) BYTE

 DIGITS$IN$COMMON=DIGITS$IN$INPUT$1;
 IF DIGITS$IN$INPUT$1 > DIGITS$IN$INPUT$2 THEN
 DO;
  DIGITS$IN$COMMON=DIGITS$IN$INPUT$2;
  DIFF = DIGITS$IN$INPUT$1 - DIGITS$IN$INPUT$2;
  DO J = 1 TO DIFF;
   IF INPUT$1 > 0 THEN
    RETURN 1;
   ADRS$INPUT$1=ADRS$INPUT$1+1;
  END;
 END;
 IF DIGITS$IN$INPUT1 < DIGITS$IN$INPUT$2 THEN
 DO;
  DIFF = DIGITS$IN$INPUT$2 - DIGITS$IN$INPUT$1;
  DIGITS$IN$COMMON=DIGITS$IN$INPUT$1;
  DO J = 1 TO DIFF;
   IF INPUT$2 > 0 THEN
     RETURN OFFH;
   ADRS$INPUT$2=ADRS$INPUT$2+1;
  END;
 END;
 DO J=1 TO DIGITS$IN$COMMON;
  IF INPUT$2 > INPUT$1 THEN
   RETURN OFFH;
  ELSE IF INPUT$2 < INPUT$1 THEN
   RETURN 1;
  ADRS$INPUT$1=ADRS$INPUT$1+1;
  ADRS$INPUT$2=ADRS$INPUT$2+1;
 END;
 RETURN 0;
END BCD$COMPARE;
END COMPARE$MODULE;
```

```
PRESSED$KEY=READ$KEYBOARD;
DIGIT=DIGIT$KEY(PRESSED$KEY);
IF DIGIT <> OFFH THEN
DO;
 IF VOLUME(0)=0 THEN  /* VERIFY NO MORE THAN 6 DIGITS ENTERED */
 DO;
  DO I=0 TO 4;
   VOLUME(I)=VOLUME(I+1);     /* SHIFT VOLUME TOWARD MS DIGIT */
  END;
  VOLUME(5)=DIGIT;
  DATA$WORD$8279=SHL(DIGIT,4);   /* ADD DIGIT TO DISPLAY */
 END;
END;
```

```
   IF PRESSED$KEY=ENTER$KEY THEN
   RETURN;
  END;      /* PRESSED$KEY=CLEAR$KEY */
 END;  /* WHILE 1 */
END FUEL$VOLUME$ENTRY;
END FUEL$VOL$ENTRY$MODULE;

FUEL$VOL$ENTRY$MODULE
DO;
READ$KEYBOARD:
PROCEDURE BYTE EXTERNAL;
END READ$KEYBOARD;

CLEAR$DISPLAY:
PROCEDURE EXTERNAL;
END CLEAR$DISPLAY;

DIGIT$KEY:
PROCEDURE (KEY$CODE) BYTE EXTERNAL;
 DECLARE KEYCODE BYTE;
END DIGIT$KEY;


FUEL$VOLUME$ENTRY:
PROCEDURE (VOLUME$PTR,PRODUCT$CODE$PTR,OPTIONAL$FLAG) PUBLIC;
 DECLARE (VOLUME$PTR,PRODUCT$CODE$PTR) ADDRESS;
 DECLARE OPTIONAL$FLAG BYTE;      /* OPTIONAL=1,MANDATORY=0 */
 DECLARE (VOLUME BASED VOLUME$PTR)(6) BYTE;
 DECLARE (PRODUCT$CODE BASED PRODUCT$CODE$PTR)(2) BYTE;
 DECLARE DATA$WORD$8279 BYTE AT (0A000H);
 DECLARE DEFAULT$BUFFER(6) BYTE;
 DECLARE (VALID$ENTER,PRESSED$KEY,I) BYTE;
 DECLARE DIGIT BYTE;




 DECLARE ERROR$LAMP LITERALLY '17H';
 DECLARE CLEAR$KEY LITERALLY '0E1H';
 DECLARE ENTER$KEY LITERALLY '0E9H';
 DECLARE DS1$DP LITERALLY '6EH';
 DECLARE DS2$DP LITERALLY '5EH';
 DECLARE BLANK LITERALLY '0FFH';

 DO WHILE 1;
  DO I=0 TO 5;
   VOLUME(I)=0;
  END;
  CALL CLEAR$DISPLAY;
  DATA$WORD$8279 = SHL(PRODUCT$CODE(0),4);
  DATA$WORD$8279 = SHL(PRODUCT$CODE(1),4);
  DATA$WORD$8279 = BLANK;
  DATA$WORD$8279 = BLANK;
  DATA$WORD$8279 = BLANK;
  IF OPTIONAL$FLAG=1 THEN
  DATA$WORD$8279=0;
  ELSE DATA$WORD$8279=BLANK;
 KEYLOOP: PRESSED$KEY=READ$KEYBOARD;
    IF PRESSED$KEY = ENTER$KEY THEN
     IF OPTIONAL$FLAG=1 THEN
      RETURN;
    DIGIT=DIGIT$KEY(PRESSED$KEY);
   IF DIGIT=BLANK THEN GO TO KEYLOOP;
   VOLUME(5)=DIGIT;
   CALL CLEAR$DISPLAY;
   DATA$WORD$8279=SHL(DIGIT,4);
   DO WHILE PRESSED$KEY<>CLEAR$KEY;
```

```
BCDMLT:
DO;
BCD$MULTIPLY: PROCEDURE (MPLIER$SIZE,MCAND$SIZE,PRODUCT$SIZE,MPLIER$START,
                    MCAND$START,PRODUCT$START) PUBLIC;

  DECLARE (MPLIER$SIZE,MCAND$SIZE,PRODUCT$SIZE,I,J,K,CARRY) BYTE;
  DECLARE (MPLIER$START,MCAND$START,PRODUCT$START,SUM) ADDRESS;
  DECLARE (MPLIER BASED MPLIER$START) (16) BYTE;
  DECLARE (MCAND BASED MCAND$START) (16) BYTE;
  DECLARE (PRODUCT BASED PRODUCT$START) (16) BYTE,

  K=PRODUCT$SIZE+1;
  IF K>MPLIER$SIZE+MCAND$SIZE-1 THEN K=MPLIER$SIZE+MCAND$SIZE-1;
  CARRY=0;
  DO WHILE K>0;
   I=K-1;
   IF I>=MCAND$SIZE THEN I=MCAND$SIZE-1;
   J=K-MCAND$SIZE;
   IF J>128 THEN J=0;
   SUM=CARRY;
   DO WHILE I<128 AND J<MPLIER$SIZE;
    SUM=SUM+MPLIER(J)*MCAND(I);
    J=J+1;
    I=I-1;
   END;
   PRODUCT(K)=SUM MOD 10;
   CARRY=SUM/10;
   K=K-1;
  END;
  PRODUCT(0)=CARRY;
  I=PRODUCT$SIZE-1;
  IF PRODUCT$SIZE<MPLIER$SIZE+MCAND$SIZE THEN
   IF PRODUCT(PRODUCT$SIZE)>5 OR (PRODUCT(PRODUCT$SIZE)=5 AND
      (PRODUCT(I) MOD 2=1)) THEN
   DO;
    SUM=PRODUCT(I)+1;
    PRODUCT(I)=SUM MOD 10;
    CARRY=SUM/10;
    DO WHILE CARRY>0;
     I=I-1;
     SUM=PRODUCT(I)+CARRY;
     PRODUCT(I)=SUM MOD 10;
     CARRY=SUM/10;
    END;
   END;
  RETURN;
 END BCD$MULTIPLY;
END BCDMLT;

   REDCAP$MODULE:
       DO;

READ $ DATA$CAPSULE: PROCEDURE (CAPSULE$ADDR) BYTE PUBLIC;
   DECLARE (CAPSULE$ADDR,CAPSULE$MEMORY$REF) ADDRESS;
   DECLARE DATA$SELECT LITERALLY '8000H';
   DECLARE CAPSULE$WORD BASED CAPSULE$MEMORY$REF BYTE;
   DECLARE CAPSULE$CONTROL BYTE AT (8800H);
   DECLARE EAROM LITERALLY '0';
   DECLARE CAPSULE$TYPE BYTE AT (8000H);
   DECLARE DATA$WORD BYTE AT (8800H);
   DECLARE TRUE LITERALLY '1', FALSE LITERALLY '0';
   DECLARE TEMP$DATA BYTE;

 /$ USING LOCATION FROM CAPSULE MEMORY MAP FIND CAPSULE ROM ADDRESS*/
   CAPSULE$MEMORY$REF=DATA$SELECT+(CAPSULE$ADDR/2);
   CAPSULE$WORD=OFFH /*SEND ROM ADDRESS TO INTERFACE (FF IS A DUMMY VALUE)*/;

/* IF  CAPSULE USES EAROMS...*/
   IF  CAPSULE$TYPE AND 2)=EAROM THEN
   DO;
```

```
    CAPSULE$CONTROL=09CH    /*SET CONTROL LINES FOR READ*/;
/* STROBE READ AND APPROPRIATE CHIP ENABLE*/
    IF CAPSULE$ADDR>2047 THEN CAPSULE$CONTROL=0DCH;
    ELSE CAPSULE$CONTROL=09DH;
    TEMP$DATA=DATA$WORD;
    CAPSULE$CONTROL=09CH;
   END;

 /* IF CAPSULE CONTAINS AN EPROM .... */
   ELSE DO;
    CAPSULE$CONTROL=093H/*SET CHIP ENABLE LOW, STROBE READ*/;
    TEMP$DATA=DATA$WORD /*GET CAPSULE DATA WHILE ENABLED*/;
      DISLE CAPSULE*/
    CAPSULE$CONTROL=090H/* NOTE: MUST STILL SET TO PROPER VALUE */;
    AND;
  /* IFCAPSULE ADDRESS IS EVEN (IN RIGHT HALF)*/
   IF ((CAPSULE$ADDR MOD 2)=0 THEN
    RETURN ((TEMP$DATA) AND (0FH));
   ELSE
    RETURN SHR(TEMP$DATA,4);
  AND READ$DATA$CAPSULE;
 AND READCAP$MODULE;

STATUS OF $LAMP:
       DO;

 DMI40  PROCEDURE(CHAR) EXTERNAL;
   DECLARE CHAR BYTE;
   END MI40;

  DECLARE MOTOR$ON LITERALLY '11H';

  STATUS$LAMP:
  PROCEDURE (LAMP$NAME) PUBLIC;
   DECLARE (LAMP$NAME,LAMP$ADRS,LAMP$CODE,NEW$CODE,DATA$8279) BYTE;
   DECLARE CMD$WORD$8279 BYTE AT (0A001H);
   DECLARE DATA$WORD$8279 BYTE AT (0A000H);

   IF LAMP$NAME=0CDH THEN
    CALL DMI40(MOTOR$ON);
   IF LAMP$NAME=4DH THEN CALL DM140(12H);/*DISABLE TICKET IF INSERT TICKET OFF
   LAMP$ADRS = SHR(LAMP$NAME,4) AND 7; /*BITS 4-6 OF INPUT BYTE*/
   LAMP$CODE = LAMP$NAME AND 00001111B; /*BITS 0-3 OF INPUT*/
   CMD$WORD$8279 = 01110000B OR LAMP$ADRS;  /* "READ DISPLAY RAM" CMD */
   DATA$8279 =DATA$WORD$8279 AND 00001111B;  /* READ 8279 DISPLAY RAM */
   CMD$WORD$8279 = 10101000B;  /* "WRITE INHIBIT/BLANK" CMD */
   CMD$WORD$8279 = 10000000B OR LAMP$ADRS;  /* "WRITE DISPLAY RAM" CMD */

   IF (LAMP$NAME AND 80H)>0 THEN /*BIT 8 INDICATES ON OR OFF*/
   DO;                      /* TURN LAMP ON */
    NEW$CODE = DATA$8279 AND LAMP$CODE; /* ADD NEW LAMP CODE TO CODE FOR */
   END;                                 /* LAMPS ALREADY ON             */
   ELSE
   DO;                     /* TURN LAMP OFF */
    NEW$CODE = DATA$8279 OR NOT LAMP$CODE; /* REMOVE NEW LAMP CODE FROM CODE */
   END;                                    /* FOR LAMPS ALREADY ON          */
   DATA$WORD$8279 = NEW$CODE; /* WRITE NEW CODE INTO 8279 DISPLAY RAM */
  END STATUS$LAMP;
  END;

CLR$DISPLAY:
DO;
 CLEAR$DISPLAY:
 PROCEDURE PUBLIC;
  DECLARE CMD$WORD$8279 BYTE AT (0A001H);
  DECLARE DATA$WORD$8279 BYTE AT (0A000H);
  DECLARE I BYTE;

  CMD$WORD$8279 = 08H,  /* KEYBOARD DISPLAY MODE TO LEFT ENTRY */
  CMD$WORD$8279 = 18H;  /*    "        "        "    " RIGHT ENTRY */
  CMD$WORD$8279 = 10100100B;  /* "WRITE INHIBIT/BLANK" CMD (INHIBIT B NIBBLE).
```

```
CMD$WORD$8279 = 10010111B;   /* "WRITE DISPLAY RAM" CMD */
DO I = 0 TO 15;
 DATA$WORD$8279 = OFFH;   /* CLEAR DISPLAY (ALL A NIBBLES = 1111) */
END;
END CLEAR$DISPLAY;
END;

RD$ KEYBOARD:
    DO;
READ$ KEYBOARD:
 PROCEDURE BYTE PUBLIC;
  DECLARE STATUS$8279 BYTE;
  DECLARE CMD$WORD$8279 BYTE AT (0A001H);
  DECLARE DATA$WORD$8279 BYTE AT (0A000H);
  DECLARE NO$OF$FIFO$CHARS BYTE;


  STATUS$8279 = CMD$WORD$8279;       /* READ 8279 STATUS WORD */
  NO$OF$FIFO$CHARS = STATUS$8279 AND 00001111B;
  IF NO$OF$FIFO$CHARS > 0 THEN
     DO;
   CMD$WORD$8279 =01000000B;   /* READ FIFO CMD SENT TO 8279 */
   RETURN DATA$WORD$8279;  /* READ FIFO CONTENTS */
  END;
  ELSE
  DO;
   RETURN 11111111B;    /* UNUSED CODE */
  END;
 END READ$KEYBOARD;
 END;
      DIGIT=DIGIT$KEY(KEY$CODE)   /*CHECK IF DIGIT KEY PRESSED*/;
      IF DIGIT <> OFFH THEN   /*DIGIT KEYED IN*/
      DO;
      CALL CLEAR$DISPLAY;
       ARRAY(DIGIT$COUNTER)=DIGIT;
       DATA$WORD$8279=SHL(DIGIT,4)   /*SHIFT NIBBLE B(LAMPS)
                          TO A(DIGITS)DISPLAY REG*/;
       DIGIT$COUNTER=1;
       END;

       END
       END
       END
       ELSE
       DO;

    IF KEY$CODE=CLEAR$KEY THEN
       DO;
     CALL CLEAR$DISPLAY;
     IF INPUT$MODE=OPTIONAL THEN
     DO I=0 TO (ARRAY$SIZE-1)   /*STORE DEFAULT FROM BUFFER IN ARRAY*/;
      ARRAY(I)=BUFFER(I);
          /*DISPLAY PRESENT DEFAULT VALUE IN BUFFER*/
      DATA$WORD$8279=SHL(BUFFER(I),4);
        END:
     DIGIT$COUNTER=0;
        END:
    IF DIGIT$COUNTER=ARRAY$SIZE THEN
       DO;
     IF KEY$CODE=ENTER$KEY THEN
      RETURN ENTER$CODE;
       END;
       ELSE
       DO;

     DIGIT=DIGIT$KEY(KEY$CODE);
     IF DIGIT <> OFFH THEN   /*DIGIT KEYED IN*/
       DO;
      ARRAY(DIGIT$COUNTER)=DIGIT;
      DATA$WORD$8279= SHL(DIGIT,4);
```

```
        DIGIT$COUNTER=DIGIT$COUNTER+1;
        END
        END
        END
        END
END FIXED $DIGIT$ENTRY;
        END;

FIXED$ENTRY$ MODULE:
        DO;
  READ$KEYBOARD: PROCEDURE BYTE EXTERNAL;
   ANAREAD$KEYBOARD;

 CLEAR $DISPLAY: PROCEDURE EXTERNAL;
  END CLEAR$DISPLAY;

 RELEASE $CAPSULE: PROCEDURE EXTERNAL;
  END RELEASE$CAPSULE;

DMI40:   PROCEDURE (CHAR) EXTERNAL;
  DECLARE CHAR BYTE;
  END DMI40;

 DIGIT $KEY: PROCEDURE(KEY$CODE) BYTE EXTERNAL;
   DECLARE KEY$CODE BYTE;
END DIGIT  $KEY;
  DECLARE ENTER$KEY LITERALLY '0E9H', CLEAR$KEY LITERALLY '0E1H';
  DECLARE ENB$SOL BYTE EXTERNAL; /*=1 IF CAPSULE MAY BE REMOVED*/
  DECLARE RELEASE$KEY LITERALLY '0C4H'; /*RUNOUT KEY FOR PROTOTYPE--
  WILL CHANGETO REMOVE CAPSULE KEY LATER*/

 FIXED $DIGIT$ENTRY:
  PROCEDURE (ARRAY$SIZE,ARRAY$PTR,INPUT$MODE) BYTE PUBLIC;
    DECLARE(DIGIT$COUNTER,INPUT$MODE,DIGIT,I,ARRAY$SIZE,KEY$CODE,
            STATUS$8279) BYTE;
   DECLARE FOREVER LITERALLY 'WHILE 1';
   DECLARE ARRAY$PTR ADDRESS;
   DECLARE (ARRAY BASED ARRAY$PTR) (1) BYTE;
   DECLARE BUFFER (7) BYTE;
   DECLARE DATA$WORD$8279 BYTE AT (0A000H);
   DECLARE OPTIONAL LITERALLY '01H', MANDATORY LITERALLY '00H';
   DECLARE CLEAR$CODE LITERALLY '00H', ENTER$CODE LITERALLY '01';

   CALL DMI40(12H); /*DISABLE TICKET ACCEPTANCE DURING EXCEPTIONS*/
   /* INITIALIZE INPUT SECTION*/
   CALL CLEAR$DISPLAY;
   IF INPUT$MODE THEN
   DO I=0  TO (ARRAY$SIZE-1);    /*STORE DEFAULT VALUE IN ARRAY TO BUFFER*/
   BUFFER (I)=ARRAY(I);
   DATA $WORD$8279=SHL(BUFFER(I),4);

  DIGIT $COUNTER=0/*INITIALIZE #DIGITS IN WORKING ARRAY*/;
   DO FOREVER;
   KEY $CODE=READ$KEYBOARD;
    IF (KEY$CODE=RELEASE$KEY) AND ENB$SOL THEN
    CALL  RELEASE$CAPSULE;
    IF DIGIT$COUNTER=0 THEN
      DO;
     IF KEY$CODE=CLEAR$KEY THEN
      RETURN CLEAR$CODE;
      ELSE
      DO;
      IF KEY$CODE=ENTER$KEY THEN
      DO;
       IF INPUT$MODE=OPTIONAL THEN
        RETURN ENTER$CODE;
      END;
      ELSE
      DO;
```

```
DIVIDE$MODULE:
DO;

BCD$SUBTRACT:
PROCEDURE (DIGITS$IN$INCR, DIGITS$IN$TOTAL, ADRS$INCR, ADRS$TOTAL) EXTERNAL;
 DECLARE (DIGITS$IN$INCR, DIGITS$IN$TOTAL) BYTE;
 DECLARE (ADRS$INCR, ADRS$TOTAL) ADDRESS;
END BCD$SUBTRACT;

BCD$COMPARE:
PROCEDURE (DIGITS$IN$INPUT$1, DIGITS$IN$INPUT$2, ADRS$INPUT$1, ADRS$INPUT$2)
            BYTE EXTERNAL;
 DECLARE (DIGITS$IN$INPUT$1, DIGITS$IN$INPUT$2) BYTE;
 DECLARE (ADRS$INPUT$1, ADRS$INPUT$2) ADDRESS;
END BCD$COMPARE;

DECLARE COMPARE$DIGITS BYTE PUBLIC;

BCD$DIVIDE:
PROCEDURE (ADRS$DIVISOR, ADRS$DIVIDEND, ADRS$QUOTIENT,
DIGITS$IN$DIVIDEND, DIGITS$IN$DIVISOR) BYTE PUBLIC;
 DECLARE (ADRS$DIVISOR, ADRS$DIVIDEND, ADRS$QUOTIENT) ADDRESS;
 DECLARE (DIVISOR BASED ADRS$DIVISOR)(7) BYTE;
 DECLARE (DIVDND BASED ADRS$DIVIDEND)(7) BYTE;
 DECLARE (QUOTIENT BASED ADRS$QUOTIENT)(7) BYTE;
 DECLARE DIVIDEND(16) BYTE;   /* WORKING DIVIDEND */
 DECLARE (DIGITS$IN$DIVISOR, DIGITS$IN$DIVIDEND, I, INDEX, COMPARE$STATUS,
          VALUE) BYTE;
 DECLARE BORROW$STATUS ADDRESS;

 DO I=0 TO (DIGITS$IN$DIVIDEND-1);
  DIVIDEND(I)=DIVDND(I);     /* XFER DIVIDEND INTO WORKING DIVIDEND */
 END;
 DO I=DIGITS$IN$DIVIDEND TO 15;
  DIVIDEND(I)=0;
 END;
 DO INDEX=0 TO 6;     /* QUOTIENT IS 6 DIGITS  */
  VALUE=0;
  L1010: QUOTIENT(INDEX)=VALUE;
  IF BCD$COMPARE (DIGITS$IN$DIVISOR, COMPARE$DIGITS, ADRS$DIVISOR,
                 .DIVIDEND)<>1 THEN /*  DIVISOR<=DIVIDEND  */
  DO;
   CALL BCD$SUBTRACT (DIGITS$IN$DIVISOR, COMPARE$DIGITS, ADRS$DIVISOR,
                     .DIVIDEND);
   VALUE = VALUE+1;
   IF VALUE>9 THEN
    RETURN 1; /*OVERFLOW ERROR*/
   GO TO L1010;
  END;
  COMPARE$DIGITS=COMPARE$DIGITS+1;
 END;       /* END WHILE <6   */
 RETURN 0;
END BCD$DIVIDE;
END DIVIDE$MODULE;

   CAPSULE$CONTROL=9CH;
   CAPSULE$CONTROL=9DH /*STROBE APPROPRIATE CHIP ENABLE*/;
  END;
  END;
 /* IF CAPSULE CONTAINS AN EPROM. . .*/
  ELSE DO;
   CAPSULE$CONTROL=0CDH /*SET CHIP ENABLE LOW, READ ENABLE HIGH, AND
                        PROGRAMMING VOLTAGE HIGH*/;
   CAPSULE$CONTROL=0CCH /*SET CHIP ENABLE HIGH TO PROGRAM*/;
   CALL TIME(250);
   CALL TIME(250);
   CALL TIME(250) /*WAIT 50 MILLISEC*/;
   CAPSULE$CONTROL=0CDH /*SET CHIP ENABLE LOW*/;
   CAPSULE$CONTROL=09FH /*REMOVE DATA FROM CAPSULE INPUTS AND ENABLE READ*/;
   END
```

```
IF DIGIT=READ$DATA THEN ERROR=FALSE;
ELSE ERROR=TRUE /*SET ERROR FLAG IF BAD LOAD*/;
CAPSULE$CONTROL=09CH /*DISABLE CAPSULE*/;
RETURN;
END WRITE$TO$DATA$CAPSULE;
END WRITECAP$MODULE;

WRITECAP$MODULE:
DO;

STATUS$LAMP: PROCEDURE (LAMP) EXTERNAL;
DECLARE LAMP BYTE;
END STATUS$LAMP;

READ$DATA$CAPSULE: PROCEDURE (CAPSULE$LOCN) BYTE EXTERNAL;
DECLARE CAPSULE$LOCN ADDRESS;
END READ$DATA$CAPSULE;

WRITE$TO$DATA$CAPSULE: PROCEDURE (CAPSULE$ADDR,DIGIT,FLAG$ADDR) PUBLIC;
DECLARE (CAPSULE$ADDR,FLAG$ADDR,CAPSULE$MEMORY$REF,SHARED$DIGIT$ADDR) ADDRESS
DECLARE ERROR BASED FLAG$ADDR BYTE;
DECLARE DATA$SELECT LITERALLY '8000H';
DECLARE (I,DIGIT,SHARED$DIGIT) BYTE;
DECLARE WRITE$DATA BASED CAPSULE$MEMORY$REF BYTE;
DECLARE CAPSULE$CONTROL BYTE AT (8800H);
DECLARE EAROM LITERALLY '0';
DECLARE CAPSULE$TYPE BYTE AT (8000H);
DECLARE READ$DATA BYTE AT (8800H);
DECLARE TRUE LITERALLY '1', FALSE LITERALLY '0';

IF (INPUT(78H) AND 20H)=0 THEN /*DOOR NOT CLOSED*/
DO;
 CALL STATUS$LAMP(0D7H) /*ERROR*/;
 DO WHILE (INPUT(78H) AND 20H)=0;
 END;
 DO I=1 TO 80;
  CALL TIME(250);
 END;
 CALL STATUS$LAMP(57H);
END;
CAPSULE$MEMORY$REF=DATA$SELECT+(CAPSULE$ADDR/2) /*USING LOCATION FROM
                    CAPSULE MEMORY MAP, FIND DESIRED LOCATION IN PROCESSOR
                    MEMORY SPACE*/;
IF (CAPSULE$ADDR MOD 2)=0 THEN
/* IF DIGIT IS TO GO IN RIGHT HALF OF CAPSULE WORD, PACK OTHER DIGIT IN
   LEFT HALF*/
 DIGIT=16*READ$DATA$CAPSULE(CAPSULE$ADDR+1)+DIGIT;
/* IF DIGIT IS TO GO IN LEFT HALF, PACK OTHER DIGIT IN RIGHT HALF*/
 ELSE DIGIT=16*DIGIT+READ$DATA$CAPSULE(CAPSULE$ADDR-1);
/* SEND PACKED DATA AND CAPSULE ADDRESS TO CAPSULE INTERFACE*/
 WRITE$DATA=DIGIT;
/* IF CAPSULE USES EAROMS. . .*/
   (CAPSULE$TYPE AND 2)=EAROM THEN
   DO;
  CAPSULE$CONTROL=088H /*SET CONTROL LINES FOR WRITE*/;
  IF CAPSULE$ADDR>2047 THEN CAPSULE$CONTROL=0CAH;
  ELSE CAPSULE$CONTROL=08BH /*STROBE WRITE AND APPROPRIATE CHIP ENABLE*/;
  CAPSULE$CONTROL=09CH /*RESET STROBES, REMOVE DATA FROM CAPSULE INPUTS,
                         AND SET CONTROLS FOR READ*/;
  CALL TIME(15) /*WAIT 1 MILLISEC*/;
  IF CAPSULE$ADDR>2047 THEN
    DO;
   CAPSULE$CONTROL=0DCH;
   CAPSULE$CONTROL=9CH;
   CAPSULE$CONTROL=0DCH;
  END;
  ELSE DO;
   CAPSULE$CONTROL=9DH;
  END.
  IF VOL2>9 THEN
     DO;
```

```
 VOL3=VOL3+1;
 VOL2=VOL2-10;
END;
IF VOL3>9 THEN
DO;
 VOL4=VOL4+1;
 VOL3=VOL3-10;
END;
END VOLUME$ADD;
END FAST$VOLUME$ADD$MODULE;

FAST$VOLUME$ADD$MODULE:
DO;
 DECLARE VOLUME(11) BYTE EXTERNAL;
 DECLARE (VOL4, VOL3, VOL2, VOL1, VOL0, VOLM1, VOLM2, VOLM3, VOLM4,
          VOLM5, VOLM6) BYTE AT (.VOLUME) /*VOLUME ARRAY, BROKEN
          DOWN INTO INDIVIDUALLY NAMED DIGITS FOR SPEED*/;
 DECLARE VOL$INCREMENT(6) BYTE EXTERNAL;
 DECLARE (INCM1, INCM2, INCM3, INCM4, INCM5, INCM6) BYTE AT (.VOL$INCREMENT);
 DECLARE CARRY BYTE;
 DECLARE TOTALIZER BYTE AT (0B800H);
 DECLARE FWD$PULSE LITERALLY '0FEH';
VOLUME$ADD: PROCEDURE (PULSE) PUBLIC;
 DECLARE PULSE BYTE;

 VOLM6=VOLM6+INCM6;
 VOLM5=VOLM5+INCM5;
 IF VOLM6>9 THEN
 DO;
  VOLM5=VOLM5+1;
  VOLM6=VOLM6-10;
 END;
 VOLM4=VOLM4+INCM4;
 IF VOLM5>9 THEN
 DO;
  VOLM4=VOLM4+1;
  VOLM5=VOLM5-10;
 END;
 VOLM3=VOLM3+INCM3;
 IF VOLM4>9 THEN
 DO;
  VOLM3=VOLM3+1;
  VOLM4=VOLM4-10;
 END;
 VOLM2=VOLM2+INCM2;
 IF VOLM3>9 THEN
 DO;
  VOLM2=VOLM2+1;
  VOLM3=VOLM3-10;
 END;
 VOLM1=VOLM1+INCM1;
 IF VOLM2>9 THEN
 DO;
  VOLM1=VOLM1+1;
  VOLM2=VOLM2-10;
 END;
 IF VOLM1>9 THEN
 DO;
  VOL0=VOL0+1;
  VOLM1=VOLM1-10;
  IF PULSE THEN
   TOTALIZER=FWD$PULSE;
 END;
 IF VOL0>9 THEN
 DO;
  VOL1=VOL1+1;
  VOL0=VOL0-10;
 END;
 IF VOL1>9 THEN
 DO;
  VOL2=VOL2+1;
  VOL1=VOL1-10;
```

```
CALL BLANKS(7);
CALL PRINT$DATA(.DELVOL,6,5,0);
CALL PRINT$DATA(.ZERO,11,8,0);
CALL PRINT$DATA(.DELVOL,6,5,1);
CALL LINEFEED(2);
CALL BLANKS(6);
CALL PRINT$DATA(.DATE,2,0,0);
CALL BLANKS(1);
CALL PRINT$DATA(.DATE+2,2,0,0);
CALL BLANKS(1);
CALL PRINT$DATA(.DATE+4,2,0,0);
CALL BLANKS(3);
CALL PRINT$DATA(.IDNUM,3,0,0);
CALL PRINT$DATA(.DELNUM,3,0,0);
CALL BLANKS(5);
CALL DMI40(PRODUCT);
CALL PRINT$DATA(.BILCDE,2,0,1);
CALL LINEFEED(2);
CALL BLANKS(6);
CALL PRINT$DATA (.CUSCDE,7,0,0);
CALL BLANKS(3);
CALL PRINT$DATA(.DRINUM,3,0,0);
CALL BLANKS(4);
CALL PRINT$DATA(.FRCNUM,3,0,0);
CALL BLANKS(3);
CALL DMI40(DELCDE);
CALL BLANKS(3);
CALL DMI40(PRICEZ);
CALL LINEFEED(6);
CMD$WORD$8279=0CEH; /* CLEAR FIFO */
RETURN;
END PRINTD;
END PRINT$DELIV$TICKET;

END DMI40;

BLANKS: PROCEDURE (NO$BLANKS) PUBLIC;
 DECLARE (NO$BLANKS,I) BYTE;

 DO I=1 TO NO$BLANKS;
  CALL DMI40(BLANK$CHAR);
 END;
 RETURN;
END BLANKS;

PRINT$DATA: PROCEDURE (START$ADDR,NO$DIGITS,DECPT,END$LINE) PUBLIC;
 DECLARE START$ADDR ADDRESS;
 DECLARE (NO$DIGITS,DECPT,END$LINE) BYTE;
 DECLARE PRINT$ADDR ADDRESS;
 DECLARE PRINTOUT BASED PRINT$ADDR BYTE;
 DECLARE I BYTE;

 PRINT$ADDR=START$ADDR;
 DO I=1 TO NO$DIGITS;
  CALL DMI40(PRINTOUT);
  IF I=DECPT THEN
   CALL DMI40(DECIMAL);
  PRINT$ADDR=PRINT$ADDR+1;
 END;
 IF END$LINE THEN
  CALL DMI40(PTLINE);
 RETURN;
END PRINT$DATA;

LINEFEED: PROCEDURE (NO$LINES) PUBLIC;
 DECLARE (NO$LINES,I) BYTE;

 DO I=1 TO NO$LINES;
  CALL DMI40(PTLINE);
 END;
 RETURN;
END LINEFEED;
```

```
PRINTD: PROCEDURE PUBLIC;

 CALL READ$DATA$STRING$FROM$CAPSULE(.IDNUM,33,3);

 CALL DMI40(7FH); /*SOFTWARE RESET*/
 CALL LINEFEED(22);
 CALL BLANKS(27);
 CALL PRINT$DATA(.PRICET,6,4,1);
 CALL LINEFEED(1);
 CALL BLANKS(18);
 CALL PRINT$DATA(.TAXTWO,3,2,0);
 CALL BLANKS(5);
 CALL PRINT$DATA(.TAX2$PRICE+1,6,4,1);
 CALL BLANKS(18);
 CALL PRINT$DATA(.TAXONE,3,2,0);
 CALL BLANKS(5);
 CALL PRINT$DATA(.TAX1$PRICE+1,6,4,1);
 CALL BLANKS(17);
 CALL PRINT$DATA(.PRICEU,4,3,0);
 CALL BLANKS(5);
 CALL PRINT$DATA(.BASE$PRICE+2,6,4,1);
 CALL LINEFEED(4); /*SENSITIVE PARAMETER*/

[illegible]INT$DELIV$TICKET:
DO;

 DECLARE PRICET(6) BYTE EXTERNAL;
 DECLARE DELVOL(5) BYTE EXTERNAL;
 DECLARE TAXTWO(3) BYTE EXTERNAL;
 DECLARE TAXONE(3) BYTE EXTERNAL;
 DECLARE PRICEU(4) BYTE EXTERNAL;
 DECLARE BILCDE(2) BYTE EXTERNAL;
 DECLARE DELCDE BYTE EXTERNAL;
 DECLARE PRICEZ BYTE EXTERNAL;
 DECLARE FRCNUM(3) BYTE EXTERNAL;
 DECLARE DRINUM(3) BYTE EXTERNAL;
 DECLARE CUSCDE(7) BYTE EXTERNAL;
 DECLARE DATE(6) BYTE EXTERNAL;
 DECLARE DELNUM(3) BYTE EXTERNAL;
 DECLARE PRODUCT BYTE EXTERNAL;
 DECLARE IDNUM(3) BYTE;
 DECLARE CMD$WORD$8279 BYTE AT (0A001H);
 DECLARE (TAX1$PRICE,TAX2$PRICE,BASE$PRICE)(9) BYTE EXTERNAL;
 DECLARE ZERO(11) BYTE DATA (20H,20H,20H,0,0,0,0,0,0,20H,20H);

 DECLARE TICPNT LITERALLY '078H';
 DECLARE ASCII LITERALLY '30H';
 DECLARE BLANK$CHAR LITERALLY '20H';
 DECLARE DECIMAL LITERALLY '2EH';
 DECLARE PTLINE LITERALLY '0DH';

 READ$DATA$STRING$FROM$CAPSULE:
 PROCEDURE (ADRS$RAM,ADRS$DC,DIGITS) EXTERNAL;
  DECLARE (ADRS$RAM,ADRS$DC) ADDRESS;
  DECLARE DIGITS BYTE;
 END READ$DATA$STRING$FROM$CAPSULE;

/*CY480: PROCEDURE (PRINTOUT) PUBLIC;
  DECLARE PRINTOUT BYTE;

  DO WHILE (INPUT(TICPNT) >127);
  END;
  IF PRINTOUT<16 THEN
   PRINTOUT=PRINTOUT OR ASCII;
  OUTPUT(TICPNT)=PRINTOUT OR 80H;
  OUTPUT(TICPNT)=PRINTOUT AND 7FH;
  DO WHILE (INPUT(TICPNT)<128);
  END;
  RETURN;
 END CY480; */

 DMI40:PROCEDURE (PRINTOUT) PUBLIC;
  DECLARE PRINTOUT BYTE;
```

```
DO WHILE (INPUT(TICPNT) >127);
END;
IF PRINTOUT<10 THEN
 PRINTOUT=PRINTOUT OR ASCII;
IF PRINTOUT=23 THEN PRINTOUT=7;
OUTPUT(TICPNT)=PRINTOUT AND 7FH;
DO WHILE (INPUT(TICPNT)<128);
END;
OUTPUT(TICPNT)=PRINTOUT OR 80H;
RETURN;
; ASSY LNG PROCEDURE TO DISABLE SOD
;
NAMEDSOD;
PUBLICDISSOD;
        CSEG            ;
DISSOD: MVI     A,40H   ;
        SIM             ;
RET;
        END,
  CALL BLANKS(18);
  CALL PRINT$DATA(.PRICEB,4,3,1);
  CALL LINEFEED(2);
  CALL BLANKS(2);
  CALL PRINT$DATA(.DRINMR,3,0,0);
  CALL BLANKS(9);
  CALL PRINT$DATA(.RDATE,2,0,0);
  CALL BLANKS(1);
  CALL PRINT$DATA(.RDATE+2,2,0,0);
  CALL BLANKS(1);
  CALL PRINT$DATA(.RDATE+4,2,0,0);
  CALL BLANKS(8);
  CALL READ$DATA$STRING$FROM$CAPSULE(.DRINMR,33,3);  /*CAPSULE ID*/
  CALL PRINT$DATA(.DRINMR,3,0,0);
  CALL BLANKS(2);
  CALL PRINT$DATA(.FRCNMR,3,0,1);
 END PRINT$RECON$TICKET;
END RECON$TICKET$PRINT;
  CALL BLANKS(1);
  CALL PRINT$DATA(.CASH+2,7,5,1);
  CALL PRINT$ZONE$TOTAL(2);
  CALL PRINT$DATA(.CHEQUE,2,0,0);
  CALL BLANKS(1);
  CALL PRINT$DATA(.CHEQUE+2,7,5,1);
  CALL PRINT$ZONE$TOTAL(1);
  CALL LINEFEED(2);
  CALL BLANKS(12);
  CALL PRINT$DATA(.ODOMET,6,0,0);
  CALL BLANKS(4);
  CALL PRINT$DATA(.ODOMET+6,6,0,0);
  CALL BLANKS(3);
  CALL PRINT$DATA(.ODMDIF,6,0,1);
  CALL LINEFEED(2);
  DO I=0 TO 3;
   INV$LIN=.PRCD00+26*(3-I);
   CALL PRINT$INVENTORY;
  END;
  CALL LINEFEED(2);
  DO I1=0 TO 9;
   CALL READ$DATA$STRING$FROM$CAPSULE(.LOADING$ITEM,3852+15*(I:=9-I1),14);
   IF LOADING$ITEM(0)<10 THEN
   DO;
    CALL BLANKS(2);
    CALL PRINT$DATA(.LOADING$ITEM,6,0,0);
    CALL BLANKS(1);
    CALL PRINT$DATA(.LOADING$ITEM+6,2,0,0);
    CALL BLANKS(1);
    CALL PRINT$DATA(.LOADING$ITEM+8,6,0,0);
   END;
   ELSE
    CALL BLANKS(18);
   IF BILLING$DATA(I).BLG$CODE(0)<10 THEN
   DO;
```

```
    CALL BLANKS(2);
    CALL PRINT$DATA(.BILLING$DATA(I).BLG$CODE,2,0,0);
    CALL BLANKS(1);
    CALL PRINT$DATA(.BILLING$DATA(I).TOTAL$VOL$DLVRD,6,0,0);
    CALL BLANKS(1);
    CALL PRINT$DATA(.BILLING$DATA(I).SALES,7,5,0);
   END;
   CALL DMI40(ODH);
  END;
  CALL LINEFEED(2);
  CALL BLANKS(12);
  CALL PRINT$DATA(.TOTLIT,6,0,0);
  CALL BLANKS(3);
  CALL PRINT$DATA(.TOTLIT+6,6,0,0);
  CALL BLANKS(4);
  CALL PRINT$DATA(.TOTDIF,6,0,1);
  CALL LINEFEED(2);
  CALL BLANKS(18);
  CALL PRINT$DATA(.TAX2,3,2,1);
  CALL BLANKS(3);
  CALL PRINT$DATA(.BILCDB,2,0,0);
  CALL BLANKS(13);
  CALL PRINT$DATA(.TAX1,3,2,0);
  CALL BLANKS(12);
  CALL DMI40(PRICZB);
  CALL DMI40(ODH);
  PRINT$INVENTORY: PROCEDURE;
   DECLARE I BYTE;

   IF INVALUE=OFH THEN
    CALL LINEFEED(1);
   ELSE DO;
    CALL BLANKS(2);
    CALL PRINT$DATA(INV$LIN,2,0,0);
    INV$LIN=INV$LIN+2;
    DO I=0 TO 3;
     CALL BLANKS(NO$OF$SPACES(I));
     CALL PRINT$DATA(INV$LIN,6,0,0);
     INV$LIN=INV$LIN+6;
    END;
    CALL DMI40(ODH); /*PRINT LINE*/
   END;
   RETURN;
  END PRINT$INVENTORY;

  PRINT$ZONE$TOTAL: PROCEDURE(ZONE);
   DECLARE ZONE BYTE;

   CALL BLANKS(2);
   CALL DMI40(ZONE);
   CALL BLANKS(5);
   CALL PRINT$DATA(.ZONE$CODE(ZONE-1).VOLUME,6,0,0);
   CALL BLANKS(13);
   RETURN;
  END PRINT$ZONE$TOTAL;

  PRINT$RECON$TICKET: PROCEDURE PUBLIC;

   DO I1=0 TO 7;
    CALL READ$DATA$STRING$FROM$CAPSULE(.DRIVER$EXC$ITEM,3570+13*(I:=
(7-I1) XOR 1),12);
    IF DRIVER$EXC$ITEM(0)>10 THEN
    DO;
     IF I THEN
      CALL LINEFEED(1);
    END;
    ELSE DO;
     CALL BLANKS(2);
     CALL PRINT$DATA(.DRIVER$EXC$ITEM,3,0,0);
     CALL BLANKS(1);
     CALL PRINT$DATA(.DRIVER$EXC$ITEM+6,5,0,I);
```

```
  IF (NOT I) THEN
   CALL BLANKS(3);
  END;
 END;
CALL LINEFEED(2);
CALL PRINT$ZONE$TOTAL(5);
CALL PRINT$DATA(.TOTTIC,2,0,0);
CALL BLANKS(1);
CALL PRINT$DATA(.TOTSLS,7,5,1);
CALL PRINT$ZONE$TOTAL(4);
CALL PRINT$DATA(.NO$OF$CHARGES$0,2,0,0);
CALL BLANKS(1);
CALL PRINT$DATA(.CHARGE,7,5,1);
CALL PRINT$ZONE$TOTAL(3);
CALL PRINT$DATA(.CASH,2,0,0);
RECON$TICKET$PRINT:
DO;

 DECLARE PRCD00(26) BYTE EXTERNAL;
 DECLARE PRCD01(26) BYTE EXTERNAL;
 DECLARE PRCD02(26) BYTE EXTERNAL;
 DECLARE PRCD03(26) BYTE EXTERNAL;
 DECLARE INV$LIN ADDRESS;
 DECLARE INVALUE BASED INV$LIN BYTE;
 DECLARE TOTTIC(2) BYTE EXTERNAL;
 DECLARE TOTSLS(7) BYTE EXTERNAL;
 DECLARE CHARGE(7) BYTE EXTERNAL;
 DECLARE (NO$OF$CHARGES$0,NO$OF$CHARGES$1) BYTE EXTERNAL;
 DECLARE CASH(9) BYTE EXTERNAL;
 DECLARE CHEQUE(9) BYTE EXTERNAL;
 DECLARE ODOMET(12) BYTE EXTERNAL;
 DECLARE ODMDIF(6) BYTE EXTERNAL;
 DECLARE TOTLIT(12) BYTE EXTERNAL;
 DECLARE TOTDIF(6) BYTE EXTERNAL;
 DECLARE TAX2(3) BYTE EXTERNAL;
 DECLARE TAX1(3) BYTE EXTERNAL;
 DECLARE PRICEB(4) BYTE EXTERNAL;
 DECLARE BILCDB(2) BYTE EXTERNAL;
 DECLARE PRICZB BYTE EXTERNAL;
 DECLARE DRINMR(3) BYTE EXTERNAL;
 DECLARE RDATE(6) BYTE EXTERNAL;
 DECLARE FRCNMR(3) BYTE EXTERNAL;
 DECLARE TICPNT LITERALLY '0CBH';
 DECLARE LOADING$ITEM(14) BYTE;
 DECLARE ZONE$CODE(5) STRUCTURE (VOLUME(7) BYTE) EXTERNAL;
 DECLARE BILLING$DATA(10) STRUCTURE (BLG$CODE(2) BYTE,
TOTAL$VOL$DLVRD(7) BYTE,SALES(7) BYTE) EXTERNAL;
 DECLARE I BYTE;
 DECLARE I1 BYTE;
 DECLARE TEMP$LIN ADDRESS;
 DECLARE DRIVER$EXC$ITEM(11) BYTE;
 DECLARE NO$OF$SPACES(4) BYTE DATA (1,1,3,4);

 READ$DATA$STRING$FROM$CAPSULE:
 PROCEDURE(START$ADDR,CAP$ADDR,NDIG) EXTERNAL;
  DECLARE (START$ADDR,CAP$ADDR) ADDRESS;
  DECLARE NDIG BYTE;
 END READ$DATA$STRING$FROM$CAPSULE;

 BLANKS: PROCEDURE(NBLKS) EXTERNAL;
  DECLARE NBLKS BYTE;
 END BLANKS;

 PRINT$DATA:
 PROCEDURE(START$OF$LINE,NDIG,DEC,PRT$LINE) EXTERNAL;
  DECLARE START$OF$LINE ADDRESS;
  DECLARE (NDIG,DEC,PRT$LINE) BYTE;
 END PRINT$DATA;

 LINEFEED: PROCEDURE(NLINES) EXTERNAL;
  DECLARE NLINES BYTE;
 END LINEFEED;
```

```
DMI40: PROCEDURE(PRINTOUT) EXTERNAL;
 DECLARE PRINTOUT BYTE;
END DMI40;
 CALL BLANKS(1);
 CALL PRINT$DATA(.CALDATE+2,2,0,0);
 CALL BLANKS(1);
 CALL PRINT$DATA(.CALDATE+4,2,0,1);
 CALL BLANKS(25);
 CALL PRINT$DATA(.NEWDATE,2,0,0);
          CALL BLANKS(1);
          CALL PRINT$DATA(.NEWDATE+2,2,0,0);
          CALL BLANKS(1);
          CALL PRINT$DATA(.NEWDATE+4,2,0,1);
 CALL LINEFEED(2);
 CALL BLANKS(20);
 CALL DMI40(PROD$NO);
 CALL DMI40(ODH);
 CALL LINEFEED(5);
 GO TO L1070;
  L1060: CALL CALIBRATION$ERROR;
  L1070: CALL STATUS$LAMP(47H);
 RETURN;
 END CALIBRATION;
END CALIB$MODULE;
  VOLUME(I)=0;
  IF I<5 THEN
   VOL$INCREMENT(I)=FLOWMETER$COEFFICIENT(I);
 END;
  L1080: DO WHILE RAW$PULSES$LSW>0;
  CALL VOLUME$ADD(0);
  RAW$PULSES$LSW=RAW$PULSES$LSW-1;
 END;
 IF RAW$PULSES$MSW>0 THEN
 DO;
  RAW$PULSES$MSW=RAW$PULSES$MSW-1;
  RAW$PULSES$LSW=0FFFFH;
  GO TO L1080;
 END;
 COMPARE$DIGITS=7;
 IF BCD$DIVIDE(.VOLUME,.TRUE$VOLUME,.NEW$CALIBRATION,7,7)
  THEN GO TO L1060;
 NEW$CALIBRATION(0)=0;
/*CALL CALIBRATION$CHECK;
 IF STATE>0 THEN GO TO L1060;*/
 NEW$CALIBRATION(7)=CHECK$SUM(.NEW$CALIBRATION,7);
 DO I=1 TO 7;
  DISPLAY=SHL(NEW$CALIBRATION(I),4);
 END;
 CALL WCM(.NEWTOT,8+SECTION,22);
 FULL$PRINT=1;
 IF STATE THEN GO TO L1060;
  L1100: CALL LINEFEED(15);
 IF FULL$PRINT THEN
 DO;
  CALL BLANKS(16);
  CALL PRINT$DATA(.NEW$CALIBRATION,7,1,1);
  CALL LINEFEED(1);
  CALL BLANKS(13);
  CALL PRINT$DATA(.TRUE$VOLUME,7,5,1);
           CALL LINEFEED(4);
 END;
          ELSE CALL LINEFEED(7);
 CALL BLANKS(13);
 CALL PRINT$DATA(.OBSERVED$VOL,7,5,1);
 CALL LINEFEED(1);
 CALL BLANKS(22);
 CALL PRINT$DATA(.OLD$CALIBRATION,7,1,1);
          CALL LINEFEED(1);
 CALL BLANKS(15);
 CALL PRINT$DATA(.OLD$FRC,3,0,0);
 CALL BLANKS(10);
```

```
CALL PRINT$DATA(.NEW$FRC,3,0,1);
        CALL LINEFEED(1);
CALL BLANKS(20);
CALL PRINT$DATA(.CALTOT,6,0,1);
CALL BLANKS(20);
CALL PRINT$DATA(.NEWTOT,6,0,1);
        CALL LINEFEED(3);
CALL BLANKS(18);
CALL PRINT$DATA(.NEWDRINUM,3,0,0);
CALL BLANKS(7);
CALL PRINT$DATA(.CALDRINUM,3,0,1);
CALL LINEFEED(1);
CALL BLANKS(25);
CALL PRINT$DATA(.CALDATE,2,0,0);
IF CHECK$SUM(.OLD$CALIBRATION+1,6)=OLD$CALIBRATION(7) THEN
DO I=1 TO 7;
 DISPLAY=SHL(OLD$CALIBRATION(I),4);
END;
CALL STATUS$LAMP(OCDH);
        DO WHILE (PRINT AND 40H)=0;
 IF READ$KEYBOARD=ODBH THEN /*PRESET VOLUME*/
 DO;
  CALL CLEAR$DISPLAY;
  CALL PRESET$VOLUME$PROCESS;
  I=DELIVERY$SETUP$PROCESS;
  CALL DMI40(11H);
  GOTO CAL$DSP;
 END;
END;
PRINT=OFFH;
CALL STATUS$LAMP(4DH);
CALL CLEAR$DISPLAY;
DO I=0 TO 10;
 VOLUME(I)=0;
END;
CALL BCD$MULTIPLY(6,6,5,.OLD$CALIBRATION+1,
FLOWMETER$COEFFICIENT,.VOL$INCREMENT);
VALVE=3;
CALL STATUS$LAMP(ODEH);
CALL CLEAR$DISPLAY;
LAST$DISPLAY$DIGIT=6;
EXTINGUISH=8;
CALL FLOWMETER;
VALVE=0;
EXTINGUISH=OCEH; /*CLEAR FIFO*/
DO I=0 TO 6;
 OBSERVED$VOL(I)=VOLUME(I);
END;
CALL DMI40(7FH);
IF STATE THEN
 GO TO L1060;
CALL STATUS$LAMP(8EH);
CALL STATUS$LAMP(O8DH);
 L1030: KEY$CODE=READ$KEYBOARD;
IF KEY$CODE=OC2H THEN /*PRINT REPORT*/
DO;
 CALL STATUS$LAMP(OEH);
 CALL STATUS$LAMP(ODH);
 CALL STATUS$LAMP(OC7H);
 CALL CLEAR$DISPLAY;
 CALL WCM(.NEWTOT,8+SECTION,14);
 FULL$PRINT=0;
 GO TO L1100;
END;
        IF KEY$CODE<>OEAH THEN GO TO L1030; /*VOLUME*/
CALL STATUS$LAMP(ODEH);
CALL STATUS$LAMP(OEH);
CALL CLEAR$DISPLAY;
DO WHILE FLEX$DIGIT$ENTRY (7,.TRUE$VOLUME,0,0)<>1;
END;
CALL STATUS$LAMP(ODH);
```

```
CALL STATUS$LAMP(5EH);
CALL STATUS$LAMP(0C7H); /*WAIT*/
CALL CLEAR$DISPLAY;
DO I=0 TO 10;
CONTROL=0BCH;
CONTROL=9CH;
CONTROL=0BCH; /*READ*/
IF ARRAY<>(CAL$DATA AND 0FH) THEN STATE=1;
CONTROL=90H;
INDEX=INDEX+1;
ARRAY$ADDRESS=ARRAY$ADDRESS+1;
I=I+1;
IF I<=LAST$DIGIT AND STATE=0 THEN GO TO L1000;
RETURN;
END WCM;

CALIBRATION: PROCEDURE PUBLIC;
DECLARE I BYTE;
STATE=0;
CALL STATUS$LAMP(0AEH);
CALL READ$CALIBRATION$MEMORY(.OLD$FRC,0,8);
DO I=0 TO 7;
 NEW$FRC(I)=OLD$FRC(I); /*THIS ALSO COPIES DATE, DRIVER NO.,*/
END;                    /*TOTALIZER AND RESTRICTOR/CUTOFF VALUES*/
        DO WHILE FIXED$DIGIT$ENTRY (3,.NEW$FRC,1)<>1;
END;
CALL STATUS$LAMP(2EH);
        CALL STATUS$LAMP(0ADH);
 L1005: DO WHILE FIXED$DIGIT$ENTRY (1,.PROD$NO,0)=0;
END;
IF PROD$NO<1 OR PROD$NO>4 THEN
DO;
 CALL ERROR$PROCESS;
 GO TO L1005;
END;
J=PROD$NO-1;
CALL READ$CALIBRATION$MEMORY(.CALTOT,8+(SECTION:=23*J),15);
DO I=0 TO 14;
 NEWTOT(I)=CALTOT(I);
END;
CALL STATUS$LAMP(2DH);
CALL STATUS$LAMP(0CEH);
DO WHILE FLEX$DIGIT$ENTRY(6,.NEWTOT,1,1)=0;
END;
CALL STATUS$LAMP(4EH);
CALL STATUS$LAMP(9EH);
DO WHILE FIXED$DIGIT$ENTRY(6,.NEWDATE,1)=0;
END;
CALL STATUS$LAMP(1EH);
CALL STATUS$LAMP(0AEH);
DO WHILE FIXED$DIGIT$ENTRY(3,.NEWDRINUM,1)=0;
END;
CALL STATUS$LAMP(2EH);
        CALL STATUS$LAMP(0DDH);
CALL STATUS$LAMP(0EEH);
DO WHILE FIXED$DIGIT$ENTRY(3,.RESTRICT$VALUE,1)=0;
END;
DO WHILE FIXED$DIGIT$ENTRY(2,.NEW$CUTOFF,1)=0;
END;
CALL READ$CALIBRATION$MEMORY (.OLD$CALIBRATION,23+SECTION,8);
OLD$CALIBRATION(0),DELIVERY$MODE=0;
CALL WCM(.NEW$FRC,0,7);
IF STATE THEN GO TO L1060;
CAL$DSP: CALL CLEAR$ALL;
  CALL CLEAR$DISPLAY;
  END CALIBRATION$ERROR;

  BCD$MULTIPLY: PROCEDURE (NPLIER,NCAND,NPROD,PLIER$ADD,CAND$ADD,
 PROD$ADD) EXTERNAL;
   DECLARE (NPLIER,NCAND,NPROD) BYTE;
   DECLARE (PLIER$ADD,CAND$ADD,PROD$ADD) ADDRESS;
  END BCD$MULTIPLY;
```

```
FLEX$DIGIT$ENTRY: PROCEDURE (DIGITS, ADRS$ARRAY, OPTION,
AUTO$DSP) BYTE EXTERNAL;
  DECLARE (DIGITS, OPTION, AUTO$DSP) BYTE;
  DECLARE ADRS$ARRAY ADDRESS;
 END FLEX$DIGIT$ENTRY;

 BCD$DIVIDE: PROCEDURE (DVSR$ADRS, DIVDND$ADRS, QUOT$ADRS,
DVND$DIG, DVSR$DIG) BYTE EXTERNAL;
  DECLARE (DIVDND$ADRS, DVSR$ADRS, QUOT$ADRS) ADDRESS;
  DECLARE (DVND$DIG, DVSR$DIG) BYTE;
 END BCD$DIVIDE;

/* CALIBRATION$CHECK: PROCEDURE;
  DECLARE LOW(7) BYTE DATA (0, 4, 5, 0, 0, 0, 0);
  DECLARE HIGH(7) BYTE DATA (0, 5, 5, 0, 0, 0, 0);
  DECLARE I BYTE;

   STATE=1;
 I=255;
  L1000: I=I+1;
 IF I>6 THEN RETURN;
 IF NEW$CALIBRATION(I)>HIGH(I) THEN RETURN;
 IF NEW$CALIBRATION(I)=HIGH(I) THEN GO TO L1000;
 I=255;
  L1010: I=I+1;
 IF I>6 THEN RETURN;
 IF NEW$CALIBRATION(I)<LOW(I) THEN RETURN;
 IF NEW$CALIBRATION(I)=LOW(I) THEN GO TO L1010;
 STATE=0;
 RETURN;
 END CALIBRATION$CHECK; */

 WCM: PROCEDURE (ARRAY$ADDRESS, INDEX, LAST$DIGIT);
  DECLARE (ARRAY$ADDRESS, DATA$ADDRESS) ADDRESS;
  DECLARE ARRAY BASED ARRAY$ADDRESS BYTE;
  DECLARE DTA BASED DATA$ADDRESS BYTE;
  DECLARE CONTROL BYTE AT (8800H);
  DECLARE INDEX BYTE;
  DECLARE (I, LAST$DIGIT) BYTE;
  DECLARE CAL$DATA BYTE AT (8800H);

 I=0;
         CONTROL=90H;
  L1000: DATA$ADDRESS=8000H+INDEX;
 DTA=ARRAY;
 CONTROL=0B0H; /*WORD ERASE*/
 CONTROL=9CH;
 CALL TIME(150);
 CONTROL=0BCH;
 CONTROL=8AH;
 CONTROL=0AAH; /*WRITE*/
 CONTROL=9CH;
 CALL TIME(15);
 CLEAR$ALL: PROCEDURE EXTERNAL;
 END CLEAR$ALL;

 VOLUME$ADD: PROCEDURE (PULSE) EXTERNAL;
  DECLARE PULSE BYTE;
 END VOLUME$ADD;

 STATUS$LAMP: PROCEDURE(LAMP) EXTERNAL;
  DECLARE LAMP BYTE;
 END STATUS$LAMP;

 CHECK$SUM: PROCEDURE (START$ADRS, DIGITS) BYTE EXTERNAL;
  DECLARE START$ADRS ADDRESS;
  DECLARE DIGITS BYTE;
 END CHECK$SUM;

 READ$CALIBRATION$MEMORY: PROCEDURE (ARRAY$ADDRESS,
STARTING$LOCATION, NO$DIGITS) PUBLIC;
```

```
DECLARE (ARRAY$ADDRESS,ADRS) ADDRESS;
DECLARE ARRAY BASED ADRS BYTE;
DECLARE (STARTING$LOCATION,NO$DIGITS) BYTE;
DECLARE CALIBRATION$ADDRESS ADDRESS;
DECLARE CALIBRATION$DATA BASED CALIBRATION$ADDRESS BYTE;
DECLARE CONTROL$DATA BYTE AT (8800H);
DECLARE I BYTE;
DECLARE CAL$DATA BYTE AT (8800H);

CONTROL$DATA=9CH;
DO I=0 TO NO$DIGITS-1;
 ADRS=ARRAY$ADDRESS+I;
 CALIBRATION$ADDRESS=8000H+STARTING$LOCATION+I;
 CALIBRATION$DATA=0FFH;
 CONTROL$DATA=0BCH;
 ARRAY=CAL$DATA AND 0FH;
 CONTROL$DATA=9CH;
END;
END READ$CALIBRATION$MEMORY;

FIXED$DIGIT$ENTRY: PROCEDURE (DIGITS,ARRAY$ADD,OPT) BYTE EXTERNAL;
 DECLARE (DIGITS,OPT) BYTE;
 DECLARE ARRAY$ADD ADDRESS;
END FIXED$DIGIT$ENTRY;

CLEAR$DISPLAY: PROCEDURE EXTERNAL;
END CLEAR$DISPLAY;

FLOWMETER: PROCEDURE EXTERNAL;
END FLOWMETER;

READ$KEYBOARD: PROCEDURE BYTE EXTERNAL;
END READ$KEYBOARD;

CALIBRATION$ERROR: PROCEDURE;
 DECLARE DISPLAY BYTE AT (0A000H);

 CALL CLEAR$DISPLAY;
 DISPLAY=20H;
 CALL STATUS$LAMP(0D7H);
 CALL DMI40(23); /*EJECT TICKET*/
 RETURN;
CALIB$MODULE:
DO;

 DECLARE NEW$FRC(3) BYTE;
 DECLARE RESTRICT$VALUE(3) BYTE;
 DECLARE NEW$CUTOFF(2) BYTE;
 DECLARE NEWTOT(6) BYTE;
 DECLARE NEWDATE(6) BYTE;
 DECLARE NEWDRINUM(3) BYTE;
 DECLARE NEW$CALIBRATION(8) BYTE;
 DECLARE OLD$FRC(3) BYTE;
 DECLARE OLD$RESTRICT(3) BYTE;
 DECLARE OLD$CUTOFF(2) BYTE;
 DECLARE CALTOT(6) BYTE;
 DECLARE CALDATE(6) BYTE;
 DECLARE CALDRINUM(3) BYTE;
 DECLARE COMPLETION$FLAG BYTE;
 DECLARE DISPLAY BYTE AT (0A000H);
 DECLARE EXTINGUISH BYTE AT (0A001H);
 DECLARE OLD$CALIBRATION(8) BYTE;
 DECLARE PRINT BYTE AT (07800H);
 DECLARE VOLUME(11) BYTE EXTERNAL;
 DECLARE FLOWMETER$COEFFICIENT(6) BYTE EXTERNAL;
 DECLARE VOL$INCREMENT(5) BYTE EXTERNAL;
 DECLARE DELIVERY$MODE BYTE EXTERNAL;
 DECLARE VALVE BYTE AT (0B000H);
 DECLARE STATE BYTE EXTERNAL;
 DECLARE KEY$CODE BYTE;
 DECLARE TRUE$VOLUME(7) BYTE;
```

```
DECLARE OBSERVED$VOL(7) BYTE;
DECLARE LAST$DISPLAY$DIGIT BYTE EXTERNAL;
DECLARE J BYTE;
DECLARE COMPARE$DIGITS BYTE EXTERNAL;
DECLARE (RAW$PULSES$LSW, RAW$PULSES$MSW) ADDRESS EXTERNAL;
DECLARE (PROD$NO, FULL$PRINT, SECTION) BYTE;

BLANKS: PROCEDURE (NO$BLANKS) EXTERNAL;
 DECLARE NO$BLANKS BYTE;
END BLANKS;

PRINT$DATA: PROCEDURE(START$ADDR, NO$DIGITS, DECPT, END$LINE) EXTERNAL;
 DECLARE START$ADDR ADDRESS;
 DECLARE (NO$DIGITS, DECPT, END$LINE) BYTE;
END PRINT$DATA;

DMI40: PROCEDURE(PRINTOUT) EXTERNAL;
 DECLARE PRINTOUT BYTE;
END DMI40;

LINEFEED: PROCEDURE(NO$LINES) EXTERNAL;
 DECLARE NO$LINES BYTE;
END LINEFEED;

PRESET$VOLUME$PROCESS: PROCEDURE EXTERNAL;
END PRESET$VOLUME$PROCESS;

DELIVERY$SETUP$PROCESS: PROCEDURE BYTE EXTERNAL;
END DELIVERY$SETUP$PROCESS;

ERROR$PROCESS: PROCEDURE EXTERNAL;
END ERROR$PROCESS;
FUEL$VOLUME$ENTRY:
PROCEDURE (ADRS$RAM, ADRS$PRODUCT$CODE, OPTION) EXTERNAL;
 DECLARE OPTION BYTE;
 DECLARE (ADRS$RAM, ADRS$PRODUCT$CODE) ADDRESS;
END FUEL$VOLUME$ENTRY;



LOAD$PROCESS:
PROCEDURE PUBLIC;

 CALL CLEAR$ALL;
 CALL STATUS$LAMP(OBEH); /*LOAD ON*/
 CALL CLEAR$DISPLAY;

 IF FIXED$DIGIT$ENTRY(6, .LOAD$NO, 0)=0 THEN /* CLEAR MODE */
 DO;
  CALL CLEAR$ALL;
  RETURN;
 END;
 CALL CLEAR$DISPLAY;
 DO INVENTORY$ITEM=0 TO 3;
  IF LOADING$ITEM>9 THEN
  DO;
   CALL CLEAR$ALL;
   RETURN;
  END;
  CALL READ$DATA$STRING$FROM$CAPSULE(.PCO,
            3696+39*INVENTORY$ITEM, 2);
  IF PCO<10 THEN
  DO;
   CALL FUEL$VOLUME$ENTRY(.VOL$LOADED, .PRODUCT$CODE, 1);
   DO I=0 TO 5;
    IF VOL$LOADED(I)>0 THEN GO TO L1000;
   END;
   GO TO L1010;
 L1000: REVCHECK$SUM=CHECK$SUM(.LOAD$NO, 14);
   IF STORE$DATA$STRING$TO$CAPSULE(.LOAD$NO,
            3852+15*LOADING$ITEM, 15, 1) THEN
```

```
    DO;
     CALL STATUS$LAMP(LOAD$LAMP);
     STATE=1;
     RETURN;
    END;
    LOADING$ITEM=LOADING$ITEM+1;
   END;
L1010: END;
 CALL CLEAR$ALL;
 RETURN;
END LOAD$PROCESS;
END LOAD$MODULE;
LOAD$MODULE:
DO;


 DECLARE STATE BYTE EXTERNAL;
 DECLARE LOADING$ITEM BYTE EXTERNAL; /*MUST BE INITIALIZED AT PWR UP*/


 DECLARE (I,RETURN$CODE,INVENTORY$ITEM,LOAD$ERROR) BYTE;
 DECLARE DATA$WORD$8279 BYTE AT (0A000H);
 DECLARE CMD$WORD$8279 BYTE AT (0A001H);
 DECLARE LOAD$NO(6) BYTE;
 DECLARE PRODUCT$CODE(2) BYTE;
 DECLARE VOL$LOADED(6) BYTE;
 DECLARE REV$CHECK$SUM BYTE;
 DECLARE BUFFER(6) BYTE;
 DECLARE LOAD$LAMP LITERALLY '3EH';
 DECLARE VOLUME$LAMP LITERALLY '0DH';
 DECLARE PRINT$REPORT$LAMP LITERALLY '1EH';
 DECLARE (PC0,PC1) BYTE AT (.PRODUCT$CODE);


CLEAR$DISPLAY:
PROCEDURE EXTERNAL;
END CLEAR$DISPLAY;

CLEAR$ALL: PROCEDURE EXTERNAL;
END CLEAR$ALL;

STATUS$LAMP:
PROCEDURE (LAMP$NAME) EXTERNAL;
 DECLARE LAMP$NAME BYTE;
END STATUS$LAMP;


CHECK$SUM:
PROCEDURE (RAM$ADRS,DIGITS) BYTE EXTERNAL;
 DECLARE RAM$ADRS ADDRESS;
 DECLARE DIGITS BYTE;
END CHECK$SUM;


STORE$DATA$STRING$TO$CAPSULE:
PROCEDURE (ADRS$RAM,ADRS$DC,DIGITS,EH$FLAG) BYTE EXTERNAL;
 DECLARE (DIGITS,EH$FLAG) BYTE;
 DECLARE (ADRS$RAM,ADRS$DC) ADDRESS;
END STORE$DATA$STRING$TO$CAPSULE;


READ$DATA$STRING$FROM$CAPSULE:
PROCEDURE (ADRS$RAM,ADRS$DC,DIGITS) EXTERNAL;
 DECLARE DIGITS BYTE;
 DECLARE (ADRS$RAM,ADRS$DC) ADDRESS;
END READ$DATA$STRING$FROM$CAPSULE;


FIXED$DIGIT$ENTRY:
PROCEDURE (DIGITS,ADRS$ARRAY,OPTION) BYTE EXTERNAL;
 DECLARE (DIGITS,OPTION) BYTE;
```

```
 DECLARE ADRS$ARRAY ADDRESS;
END FIXED$DIGIT$ENTRY;
; ASSY LNG PROCEDURE TO ENABLE SOD
;
NAMEESOD;
PUBLICENSOD;
        CSEG            ;
ENSOD:  MVI     A,OCOH  ;
        SIM             ;
RET;
        END;
  CALL READ$DATA$STRING$FROM$CAPSULE((INV$ADDR:=
.INV$ITEM$BUF(ITEM).FINAL$VOL),3698+39*ITEM,6);
  CALL BCD$ADD(6,6,.INV$ITEM$BUF(ITEM).TOTAL$VOL$LOADED,
INV$ADDR);
  CALL BCD$SUBTRACT(6,6,.INV$ITEM$BUF(ITEM).TOTAL$VOL$DLVRD,
INV$ADDR);
  IF CARRY$STATUS>1FH THEN
   RETURN 1;
  ELSE RETURN 0;
 END INV$TOTAL;

 INVENTORY: PROCEDURE PUBLIC;
 DECLARE I BYTE;

 CALL CLEAR$ALL;
 CALL INVENTORY$DELIVERED;
 CALL INVENTORY$LOADED;
 DO INV$ITEM= 0 TO 3;
  CALL READ$DATA$STRING$FROM$CAPSULE (.PCO,(3696+39*INV$ITEM),2);
  CALL CLEAR$DISPLAY;
  IF PCO<10 THEN
  DO;
   DISPLAY=SHL(PCO,4);
   DISPLAY=SHL(PC1,4);
   CALL STATUS$LAMP(VOL$LAMP);
   CALL STATUS$LAMP(OADH) /*PRODUCT CODE ON*/;
   KEY=READ$KEYBOARD;
   DO WHILE KEY<>PROD$KEY;
    IF KEY=VOLUME$KEY THEN
    DO;
     CALL STATUS$LAMP(PROD$CODE$LAMP);
     CALL STATUS$LAMP(O8DH); /*VOLUME ON*/
     CALL CLEAR$DISPLAY;
     I=INV$TOTAL(INV$ITEM);
     DO I=0 TO 5;
      DISPLAY=SHL(INV$ITEM$BUF(INV$ITEM).FINAL$VOL(I),4);
     END;
    END;
    IF KEY=CLEAR$KEY THEN GO TO LEAVE;
    KEY=READ$KEYBOARD;
   END;
  END;
 END;
 LEAVE: CALL STATUS$LAMP (PROD$CODE$LAMP);
 CALL STATUS$LAMP (VOL$LAMP);
 CALL CLEAR$DISPLAY;
 RETURN;
 END INVENTORY;
END INVENTORY$MODULE;
INVENTORY$MODULE:
DO;

 DECLARE DISPLAY BYTE AT (0A000H);
 DECLARE BLANK LITERALLY 'OFFH';
 DECLARE KEY BYTE;
 DECLARE CLEAR$KEY LITERALLY 'OE1H';
 DECLARE PROD$KEY LITERALLY 'OCBH';
 DECLARE VOL$LAMP LITERALLY 'ODH';
 DECLARE PROD$CODE$LAMP LITERALLY '2DH';
 DECLARE VOLUME$KEY LITERALLY 'OCCH';
```

```
DECLARE INV$ITEM$BUF(4) STRUCTURE (TOTAL$VOL$LOADED(6) BYTE,
TOTAL$VOL$DLVRD(6) BYTE, FINAL$VOL(6) BYTE) EXTERNAL;
DECLARE (PC0,PC1) BYTE;
DECLARE INV$ITEM BYTE;
DECLARE DUMMY ADDRESS;
DECLARE CARRY$STATUS BYTE EXTERNAL;

INVENTORY$DELIVERED: PROCEDURE EXTERNAL;
END INVENTORY$DELIVERED;

INVENTORY$LOADED: PROCEDURE EXTERNAL;
END INVENTORY$LOADED;

STATUS$LAMP: PROCEDURE(LAMP) EXTERNAL;
 DECLARE LAMP BYTE;
END STATUS$LAMP,

READ$KEYBOARD: PROCEDURE BYTE EXTERNAL;
END READ$KEYBOARD;

CLEAR$DISPLAY: PROCEDURE EXTERNAL;
END CLEAR$DISPLAY;

CLEAR$ALL: PROCEDURE EXTERNAL;
END CLEAR$ALL;

BCD$ADD: PROCEDURE (INC,TOTAL,INCPTR,TOTALPTR) EXTERNAL;
 DECLARE INC BYTE;
 DECLARE TOTAL BYTE;
 DECLARE INCPTR ADDRESS;
 DECLARE TOTALPTR ADDRESS;
END BCD$ADD;

BCD$SUBTRACT: PROCEDURE (INC,TOTAL,INCPTR,TOTALPTR) EXTERNAL;
 DECLARE INC BYTE;
 DECLARE TOTAL BYTE;
 DECLARE INCPTR ADDRESS;
 DECLARE TOTALPTR ADDRESS;
END BCD$SUBTRACT;

READ$DATA$STRING$FROM$CAPSULE: PROCEDURE (MEMADD,CAPADD,LENGTH) EXTERNAL;
 DECLARE MEMADD ADDRESS;
 DECLARE CAPADD ADDRESS;
 DECLARE LENGTH BYTE;
END READ$DATA$STRING$FROM$CAPSULE;

INV$TOTAL: PROCEDURE(ITEM) BYTE PUBLIC;
 DECLARE ITEM BYTE;
 DECLARE INV$ADDR ADDRESS;
NEXT:
NO$DLVRYS(0)=0;
NO$DLVRYS(1)=DELIVERY$ITEM/10;
NO$DLVRYS(2)=DELIVERY$ITEM MOD 10;

DO I=0 TO 4;
 IF ZONE$CODE(I).VOLUME(6)>4 THEN
  CALL BCD$ADD(6,6,.ROUNDOFF,.ZONE$CODE(I).VOLUME);
END;
BILLING$ITEM=0;
CALL READ$DATA$STRING$FROM$CAPSULE(.NO$ITEMS,46,2);
NO$BILLING$ITEMS=NO$ITEMS(1)+NO$ITEMS(0)*10; /*CONVERT BCD TO DECIMAL*/
IF NO$BILLING$ITEMS>10 THEN
DO;
 CALL DMI40(23);
 CALL CLEAR$DISPLAY;
 DISPLAY=30H;
 CALL ERROR$PROCESS;
 GO TO START;
END;
DO WHILE BILLING$ITEM<NO$BILLING$ITEMS;
 IF BILLING$DATA(BILLING$ITEM).TOTAL$VOL$DLVRD(6) > 4 THEN
 DO;
```

```
    CALL BCD$ADD(6,6,.ROUND$OFF,.BILLING$DATA(BILLING$ITEM).TOTAL$VOL$DLVRD);
    BILLING$DATA(BILLING$ITEM).TOTAL$VOL$DLVRD(6)=0;
   END;
   CALL READ$DATA$STRING$FROM$CAPSULE(.PRODUCT$CODE,
             54+38*BILLING$ITEM,2);
   IF SEARCH$CAPSULE$FOR$DATA$MATCH(.PRODUCT$CODE,3696,.ITEM$NO,10)=0 THEN
    CALL BCD$ADD(6,6,.BILLING$DATA(BILLING$ITEM).TOTAL$VOL$DLVRD,
                 .INV$ITEM$BUF(ITEM$NO).TOTAL$VOL$DLVRD);
   ELSE
   DO;
    STATE=1;
    LOAD$ERROR=STORE$DATA$STRING$TO$CAPSULE(.ERROR$CODE,49,1,0);
   END;
   BILLING$ITEM=BILLING$ITEM+1;
  END;
 END INVENTORY$DELIVERED;
 END INV$DLVRD$LOADED;
   INV$ITEM$BUF(I).TOTAL$VOL$DLVRD(J)=0;    /* (2 DIMENSIONAL ARRAY      */
   INV$ITEM$BUF(I).FINAL$VOL(J)=0;
  END;
END;
DO I=0 TO 29;
 CHEQUE$TOTAL(I)=0;    /* ZEROIZE RECEIPTS TOTALS  */
END;

DO I=0 TO 4;                          /* ZEROIZE ZONE CODE TOTALS */
 DO J=0 TO 6;
  ZONE$CODE(I).VOLUME(J)=0;
 END;
END;

DO I=0 TO 9;
 CALL READ$DATA$STRING$FROM$CAPSULE(.BILLING$DATA(I).BLG$CODE,
         52+38*I,2);
 DO J=0 TO 13;
  BILLING$DATA(I).TOTAL$VOL$DLVRD(J)=0;   /* ZEROIZE BILLING TOTAL VOL, SALES*/
 END;
END;
NO$CASH,NO$CHEQUES,NO$CHARGE=0;
DO DELIVERY$ITEM = 0 TO 92;
 CALL READ$DATA$STRING$FROM$CAPSULE(.BILLING$CODE,
           439+(DELIVERY$OFFSET:=34*DELIVERY$ITEM),2);
 IF BILLING$CODE(0)=0FH THEN /* ITEM EMPTY */
  GOTO NEXT;
 CALL READ$DATA$STRING$FROM$CAPSULE(.DELIVERY$CODE,
           452+DELIVERY$OFFSET,13);
 I=READ$DATA$CAPSULE(441+34*DELIVERY$ITEM); /*ZONE*/
 CALL BCD$ADD(6,7,.VOL$DLVRD,.ZONE$CODE(I-1).VOLUME);
 IF SEARCH$CAPSULE$FOR$DATA$MATCH(.BILLING$CODE,52,.ITEM$NO,10)=0 THEN
 DO;
  CALL BCD$ADD(6,7,.VOL$DLVRD,
             .BILLING$DATA(ITEM$NO).TOTAL$VOL$DLVRD);
  CALL BCD$ADD(6,7,.TOTAL$PRICE,.BILLING$DATA(ITEM$NO).SALES);
 END;
 ELSE
 DO;
  STATE=1; /*SET ERROR FLAG IF BAD PRICE TABLE DETECTED*/
  LOAD$ERROR=STORE$DATA$STRING$TO$CAPSULE(.ERROR$CODE,49,1,0);
 END;
 IF ((PAYMENT$TYPE:=DELIVERY$CODE AND 3)) =3 THEN  /*CHEQUE SALE */
 DO;
  CALL BCD$ADD(6,7,.TOTAL$PRICE,.CHEQUE$TOTAL);
  NO$CHEQUES=NO$CHEQUES+1;
 END;
 IF (PAYMENT$TYPE)<2 THEN  /* CASH SALE */
 DO;
  CALL BCD$ADD(6,7,.TOTAL$PRICE,.CASH$TOTAL);
  NO$CASH=NO$CASH+1;
 END;
 IF (PAYMENT$TYPE)=2 THEN /*CHARGE SALE*/
 DO;
```

```
  CALL BCD$ADD(6,7,.TOTAL$PRICE,.CHARGE$TOTAL);
  NO$CHARGE=NO$CHARGE+1;
 END;
 CALL BCD$ADD(6,7,.TOTAL$PRICE,.SALES$TOTAL);
END;

CLEAR$DISPLAY: PROCEDURE EXTERNAL;
END CLEAR$DISPLAY;

ERROR$PROCESS: PROCEDURE EXTERNAL;
END ERROR$PROCESS;

DMI40: PROCEDURE(CHAR) EXTERNAL;
 DECLARE CHAR BYTE;
END DMI40;

INVENTORY$LOADED:
PROCEDURE PUBLIC;

 DECLARE (LOADING$ITEM,NO$LOAD$ITEMS,ITEM$NO,SEARCH$ERROR,
         CARRY$STATUS) BYTE;
 DECLARE VOLUME$LOADED(6) BYTE;


 LOADING$ITEM=0;
 DO LOADING$ITEM=0 TO 9;
  CALL READ$DATA$STRING$FROM$CAPSULE(.PRODUCT$CODE,
            3858+(LOADING$OFFSET:=15*LOADING$ITEM),2);
  IF PRODUCT$CODE(0)=0FH THEN
   GOTO CALC$LOAD$NO;
  ELSE
  DO;
   CALL READ$DATA$STRING$FROM$CAPSULE(.VOLUME$LOADED,
3860+LOADING$OFFSET,6);
   IF SEARCH$CAPSULE$FOR$DATA$MATCH(.PRODUCT$CODE,3696,
            .ITEM$NO,4) THEN
   DO;
    STATE=1; /*SET ERROR FLAG IF BAD PRICE TABLE DETECTED*/
    LOAD$ERROR=STORE$DATA$STRING$TO$CAPSULE(.ERROR$CODE,49,1,0);
   END;
   ELSE
   DO;
    CALL BCD$ADD(6,6,.VOLUME$LOADED,
                 .INV$ITEM$BUF(ITEM$NO).TOTAL$VOL$LOADED);
   END;
  END;
 END;

 CALC$LOAD$NO:
 NO$ITEMS(0)=LOADING$ITEM/10;
 NO$ITEMS(1)=LOADING$ITEM MOD 10;
END INVENTORY$LOADED;



INVENTORY$DELIVERED:
PROCEDURE PUBLIC;

 DECLARE (SEARCH$ERROR,CARRY$STATUS,ERROR$FLAG,BILLING$ITEM,I,J,
          DELIVERY$ITEM,ITEM$NO) BYTE;
 DECLARE BILLING$CODE(2) BYTE;
 DECLARE ROUND$OFF(6) BYTE DATA (0,0,0,0,0,1);


 DO I=0 TO 3;
  DO J=0 TO 5;
   INV$ITEM$BUF(I).TOTAL$VOL$LOADED(J)=0;  /* ZEROIZE INVENTORY TOTALS */
INV$DLVRD$LOADED:
DO;
```

```
DECLARE STATE BYTE EXTERNAL;
DECLARE INV$ITEM$BUF(4) STRUCTURE (TOTAL$VOL$LOADED(6) BYTE,
        TOTAL$VOL$DLVRD(6) BYTE, FINAL$VOL(6) BYTE) EXTERNAL;
DECLARE (CHEQUE$TOTAL, CASH$TOTAL, CHARGE$TOTAL,
          SALES$TOTAL)(1) BYTE EXTERNAL;
DECLARE BILLING$DATA(10) STRUCTURE (BLG$CODE(2) BYTE, TOTAL$VOL$DLVRD(7)
          BYTE, SALES(7) BYTE) EXTERNAL;
DECLARE (REC$CHECK$SUM, NO$CHEQUES, NO$CASH, NO$CHARGE, NO$BILLING$ITEMS,
NO$CHEQUES$0, NO$CHEQUES$1, NO$CASH$0, NO$CASH$1) BYTE EXTERNAL;
DECLARE START LABEL EXTERNAL;

DECLARE DELIVERY$CODE BYTE;
DECLARE VOL$DLVRD(6) BYTE;
DECLARE TOTAL$PRICE(6) BYTE;
DECLARE NO$ITEMS(2) BYTE PUBLIC;
DECLARE NO$DLVRYS(3) BYTE PUBLIC;
DECLARE PRODUCT$CODE(2) BYTE;
DECLARE LOAD$ERROR BYTE;
DECLARE ERROR$CODE BYTE DATA (0BH);
DECLARE TOTTIC(2) BYTE PUBLIC AT (.NO$DLVRYS+1);
DECLARE ZONE$TOTAL(6) BYTE;
DECLARE ZONE$CODE(5) STRUCTURE (VOLUME(7) BYTE) PUBLIC;
DECLARE DISPLAY BYTE AT (0A000H);
DECLARE (LOADING$OFFSET, PAYMENT$TYPE) BYTE;
DECLARE DELIVERY$OFFSET ADDRESS;

READ$DATA$STRING$FROM$CAPSULE:
PROCEDURE (RAM$ADRS, DC$ADRS, DIGITS) EXTERNAL;
 DECLARE (RAM$ADRS, DC$ADRS) ADDRESS;
 DECLARE DIGITS BYTE;
END READ$DATA$STRING$FROM$CAPSULE;

READ$DATA$CAPSULE: PROCEDURE(CAPADD) BYTE EXTERNAL;
 DECLARE CAPADD ADDRESS;
END READ$DATA$CAPSULE;

SEARCH$CAPSULE$FOR$DATA$MATCH:
PROCEDURE (RAM$ADRS, DC$ADRS, ITEM$NO$ADRS, ITEMS) BYTE EXTERNAL;
 DECLARE (RAM$ADRS, DC$ADRS, ITEM$NO$ADRS) ADDRESS;
 DECLARE ITEMS BYTE;
END SEARCH$CAPSULE$FOR$DATA$MATCH;


BCD$ADD:
PROCEDURE (DIGITS$INCR, DIGITS$TOTAL, ADRS$INCR, ADRS$TOTAL)
           EXTERNAL;
 DECLARE (DIGITS$INCR, DIGITS$TOTAL) BYTE;
 DECLARE (ADRS$INCR, ADRS$TOTAL) ADDRESS;
END BCD$ADD;


STORE$DATA$STRING$TO$CAPSULE:
PROCEDURE (RAM$ADRS, DC$ADRS, DIGITS, EH$FLAG) BYTE EXTERNAL;
 DECLARE (DIGITS, EH$FLAG) BYTE;
 DECLARE (RAM$ADRS, DC$ADRS) ADDRESS;
END STORE$DATA$STRING$TO$CAPSULE;
                 3696+INVENTORY$OFFSET, 38);
  REV$CHECK$SUM=CHECK$SUM(.INV$STRING, 38);
  I=STORE$DATA$STRING$TO$CAPSULE(.REV$CHECK$SUM,
                 3734+INVENTORY$OFFSET, 1, 0);
 END;


 NEXT:
 CALL STATUS$LAMP(47H);
 CALL STATUS$LAMP(0CEH); /*TOTALIZER LAMP ON*/
 DO WHILE FLEX$DIGIT$ENTRY(6,.ENDING$TOTALIZER, 0, 0)=0;
 END;
 I=STORE$DATA$STRING$TO$CAPSULE(.ENDING$TOTALIZER, 15, 6, 0);
 CALL STATUS$LAMP(TOTALIZER$LAMP);
```

```
DO I=0 TO 5;
 ENDING$ODOMETER(I)=0;
END;
CALL STATUS$LAMP(09DH); /*ODOMETER ON*/
CALL CLEAR$DISPLAY;
DO WHILE FLEX$DIGIT$ENTRY(6,.ENDING$ODOMETER,1,1)=0;
END;
I=STORE$DATA$STRING$TO$CAPSULE(.ENDING$ODOMETER,27,6,0);
CALL STATUS$LAMP(ODOMETER$LAMP);
CALL CLEAR$DISPLAY;
GEN$STRING(49)=READ$DATA$CAPSULE(49) AND ODH;
I=STORE$DATA$STRING$TO$CAPSULE(.GEN$STRING(49),49,1,0);


CALL READ$DATA$STRING$FROM$CAPSULE(.GEN$STRING,0,51);
REV$CHECK$SUM=CHECK$SUM(.GEN$STRING,51);
I=STORE$DATA$STRING$TO$CAPSULE(.REV$CHECK$SUM,51,1,0);


DO I=0 TO 5;
 TOTALIZER$DIF(I)=ENDING$TOTALIZER(I);
 ODOMETER$DIF(I)=ENDING$ODOMETER(I);
END;
CALL BCD$SUBTRACT(6,6,.GEN$STRING(9),.TOTALIZER$DIF);
CALL BCD$SUBTRACT(6,6,.GEN$STRING(21),.ODOMETER$DIF);
IF SEARCH$CAPSULE$FOR$DATA$MATCH(.GEN$STRING(39),52,.ITEM$NO,10) THEN
DO;
 I=STORE$DATA$STRING$TO$CAPSULE(.ERROR$CODE,49,1,0);
 STATE=1;
 CALL READ$DATA$STRING$FROM$CAPSULE(.GEN$STRING(39),52,2);
 ITEM$NO=0;
END;
I=38*ITEM$NO;
CALL READ$DATA$STRING$FROM$CAPSULE(.BASE$PRICE,
           52+GEN$STRING(48)*4+I,4);
CALL READ$DATA$STRING$FROM$CAPSULE(.BASE$TAX$1,
           76+I,6); /*READ BOTH TAXES TOGETHER*/
CALL READ$DATA$STRING$FROM$CAPSULE(.PRCD00,3696,26);
CALL READ$DATA$STRING$FROM$CAPSULE(.PRCD01,3735,26);
CALL READ$DATA$STRING$FROM$CAPSULE(.PRCD02,3774,26);
CALL READ$DATA$STRING$FROM$CAPSULE(.PRCD03,3813,26);
CALL PRINT$RECON$TICKET;
CALL STATUS$LAMP(PRINT$REPORT$LAMP);
RETURN 0;
END RECONCILIATION$PROCESS;
END RECONCILIATION$MODULE;
PROCEDURE BYTE PUBLIC,
 DECLARE DISPLAY BYTE AT (0A000H),

 CALL CLEAR$ALL,
 CALL STATUS$LAMP(8EH); /*PRINT REPORT ON*/
 IF WAIT$FOR$TICKET THEN
 DO,
  CALL STATUS$LAMP(PRINT$REPORT$LAMP);
  RETURN 1;
 END,

 CALL STATUS$LAMP(0C7H), /*WAIT*/
 IF VOL$TENTHS>4 THEN
  OUTPUT(0B8H)=0FEH; /* UPDATE TOTALIZER */

 CALL INVENTORY$DELIVERED.
 I=STORE$DATA$STRING$TO$CAPSULE( NO$DLVRYS,41,3,0);
 BILLING$ITEM=0;
 DO WHILE BILLING$ITEM<NO$BILLING$ITEMS;
  I=STORE$DATA$STRING$TO$CAPSULE(.BILLING$DATA(BILLING$ITEM).TOTAL$VOL$DLVRD
          ,82+(BILLING$OFFSET =38*BILLING$ITEM),6,0);
  CALL READ$DATA$STRING$FROM$CAPSULE(.BILL$ITEM$BUF,
           52+BILLING$OFFSET,37);
  REV$CHECK$SUM=CHECK$SUM(.BILL$ITEM$BUF,37);
  I=STORE$DATA$STRING$TO$CAPSULE(.REV$CHECK$SUM,
        89+BILLING$OFFSET,1,0);
  BILLING$ITEM=BILLING$ITEM+1,
 END;
```

```
NO$CHEQUES$1=NO$CHEQUES MOD 10, /* CONVERT NO OF CHEQUES, */
NO$CASH$1=NO$CASH MOD 10,       /*  CASH,CHARGES TO BCD */
NO$OF$CHARGES$1=NO$CHARGE MOD 10,
NO$CHEQUES$0=NO$CHEQUES/10;
NO$CASH$0=NO$CASH/10;
NO$OF$CHARGES$0=NO$CHARGE/10,

REC$CHECK$SUM=CHECK$SUM( NO$CHEQUES$0,32),
I=STORE$DATA$STRING$TO$CAPSULE(.NO$CHEQUES$0,4002,33,0);


CALL INVENTORY$LOADED;
I=STORE$DATA$STRING$TO$CAPSULE(.NO$ITEMS,44,2,0);


DO  INVENTORY$ITEM = 0 TO 3;
 IF READ$DATA$CAPSULE(3696+(INVENTORY$OFFSET:=39*INVENTORY$ITEM))
 =0FH THEN /*ITEM IS EMPTY*
 GOTO NEXT;
DO I=0 TO 5,
 INV$ITEM$BUF(INVENTORY$ITEM) FINAL$VOL(I)=
 INV$ITEM$BUF(INVENTORY$ITEM) TOTAL$VOL$LOADED(I);
END;
CALL READ$DATA$STRING$FROM$CAPSULE(.INITIAL$VOLUME,
             3698+INVENTORY$OFFSET,6);
CALL BCD$ADD(6,6,.INITIAL$VOLUME, INV$ITEM$BUF(INVENTORY$ITEM)
             .FINAL$VOL);
CALL BCD$SUBTRACT(6,6,.INV$ITEM$BUF(INVENTORY$ITEM) TOTAL$VOL$DLVRD,
             .INV$ITEM$BUF(INVENTORY$ITEM).FINAL$VOL),
I=STORE$DATA$STRING$TO$CAPSULE( INV$ITEM$BUF(INVENTORY$ITEM),
             3704+INVENTORY$OFFSET,18,0);
CALL READ$DATA$STRING$FROM$CAPSULE(.INV$STRING,
END BCD$ADD;

BCD$SUBTRACT:
PROCEDURE (DIGITS$INCR,DIGITS$TOTAL,ADRS$INCR,ADRS$TOTAL)
          EXTERNAL;
 DECLARE (DIGITS$INCR,DIGITS$TOTAL) BYTE;
 DECLARE (ADRS$INCR,ADRS$TOTAL) ADDRESS;
END BCD$SUBTRACT;


FLEX$DIGIT$ENTRY:
PROCEDURE (DIGITS,ADRS$ARRAY,OPTION,AUTO$DSP) BYTE EXTERNAL;
 DECLARE (DIGITS,OPTION,AUTO$DSP) BYTE;
 DECLARE ADRS$ARRAY ADDRESS;
END FLEX$DIGIT$ENTRY;


PRINT$RECON$TICKET:
PROCEDURE EXTERNAL;
END PRINT$RECON$TICKET;


INVENTORY$DELIVERED:
PROCEDURE EXTERNAL;
END INVENTORY$DELIVERED;


INVENTORY$LOADED:
PROCEDURE EXTERNAL;
END INVENTORY$LOADED;


READ$KEYBOARD: PROCEDURE BYTE EXTERNAL;
END READ$KEYBOARD;


/****************LOCAL PROCEDURES*******************/


WAIT$FOR$TICKET:
PROCEDURE BYTE;
```

```
 CALL STATUS$LAMP(OCDH); /*INSERT TICKET ON*/
 DO WHILE (INPUT(078H) AND 40H)=0;
  KEY=READ$KEYBOARD;
  IF KEY=0E1H /*CLEAR*/ THEN
  DO;
   CALL STATUS$LAMP(INSERT$TICKET$LAMP);
   RETURN 1;
  END;
 END;
 CALL STATUS$LAMP(INSERT$TICKET$LAMP);
 OUTPUT(078H)=80H; /* CLAMP TICKET */
 RETURN 0;
END WAIT$FOR$TICKET;


/****************MAIN ROUTINE*****************/


RECONCILIATION$PROCESS:
          BASE$TAX$2(3) BYTE;
 DECLARE INITIAL$VOLUME(6) BYTE;
 DECLARE ENDING$TOTALIZER(6) BYTE,TOTALIZER$DIF(6) BYTE;
 DECLARE ENDING$ODOMETER(6) BYTE,ODOMETER$DIF(6) BYTE;
 DECLARE INV$STRING(38) BYTE,GEN$STRING(51) BYTE;
 DECLARE DATA$WORD$PRINTER BYTE AT (07800H);
 DECLARE TOTALIZER$DATA$WORD BYTE AT (0B800H);
 DECLARE ERROR$CODE BYTE DATA (0BH);

/****************EXTERNAL PROCEDURES*******************/


CLEAR$DISPLAY: PROCEDURE EXTERNAL;
END CLEAR$DISPLAY;

CLEAR$ALL: PROCEDURE EXTERNAL;
END CLEAR$ALL;

STATUS$LAMP:
PROCEDURE (LAMP$NAME) EXTERNAL;
 DECLARE LAMP$NAME BYTE,
END STATUS$LAMP;


CHECK$SUM:
PROCEDURE (ADRS$DATA,DIGITS) BYTE EXTERNAL;
 DECLARE ADRS$DATA ADDRESS;
 DECLARE DIGITS BYTE;
END CHECK$SUM;


STORE$DATA$STRING$TO$CAPSULE:
PROCEDURE (ADRS$RAM,ADRS$DC,NO$OF$DIGITS,EH$FLAG) BYTE EXTERNAL;
 DECLARE (ADRS$RAM,ADRS$DC) ADDRESS;
 DECLARE (NO$OF$DIGITS,EH$FLAG) BYTE;
END STORE$DATA$STRING$TO$CAPSULE;

READ$DATA$CAPSULE:
PROCEDURE(CAP$ADD) BYTE EXTERNAL;
 DECLARE CAP$ADD ADDRESS;
END READ$DATA$CAPSULE;

READ$DATA$STRING$FROM$CAPSULE:
PROCEDURE (ADRS$RAM,ADRS$DC,DIGITS) EXTERNAL;
 DECLARE (ADRS$RAM,ADRS$DC) ADDRESS;
 DECLARE DIGITS BYTE;
END READ$DATA$STRING$FROM$CAPSULE;

SEARCH$CAPSULE$FOR$DATA$MATCH:
PROCEDURE (RAM$ADRS,CAPSULE$ADRS,ADRS$ITEM$NO,NO$OF$ITEMS)
           BYTE EXTERNAL;
```

```
 DECLARE (RAM$ADRS, CAPSULE$ADRS, ADRS$ITEM$NO) ADDRESS;
 DECLARE NO$OF$ITEMS BYTE;
END SEARCH$CAPSULE$FOR$DATA$MATCH;


BCD$ADD:
PROCEDURE (DIGITS$INCR, DIGITS$TOTAL, ADRS$INCR, ADRS$TOTAL)
           EXTERNAL;
 DECLARE (DIGITS$INCR, DIGITS$TOTAL) BYTE;
 DECLARE (ADRS$INCR, ADRS$TOTAL) ADDRESS;
RECONCILIATION$MODULE:
DO;


/****************EXTERNAL DECLARATIONS*********************/

 DECLARE (NO$CHEQUES$0, NO$CHEQUES$1) BYTE PUBLIC;
 DECLARE CHEQUE$TOTAL(7) BYTE PUBLIC;
 DECLARE (NO$CASH$0, NO$CASH$1) BYTE PUBLIC;
 DECLARE (CASH$TOTAL, CHARGE$TOTAL, SALES$TOTAL) (7) BYTE PUBLIC;
 DECLARE REC$CHECK$SUM BYTE PUBLIC;
 DECLARE BILL$ITEM$BUF(37) BYTE PUBLIC;
 DECLARE BILLING$CODE(2) BYTE PUBLIC AT (.BILL$ITEM$BUF);
 DECLARE BILLING$DATA(10) STRUCTURE (BLG$CODE(2) BYTE, TOTAL$VOL$DLVRD(7)
         BYTE, SALES(7) BYTE) PUBLIC;
 DECLARE INV$ITEM$BUF(4) STRUCTURE (TOTAL$VOL$LOADED(6) BYTE,
           TOTAL$VOL$DLVRD(6) BYTE, FINAL$VOL(6) BYTE) PUBLIC;
 DECLARE (NO$CASH, NO$CHEQUES, NO$CHARGE, NO$BILLING$ITEMS) BYTE PUBLIC;
 DECLARE (NO$OF$CHARGES$0, NO$OF$CHARGES$1) BYTE PUBLIC;  /* TO BE PRINTED */
 DECLARE TOTSLS(7) BYTE PUBLIC AT (.SALES$TOTAL);

 DECLARE PRINT$REPORT$LAMP LITERALLY '0EH';
 DECLARE ERROR$LAMP LITERALLY '57H';
 DECLARE INSERT$TICKET$LAMP LITERALLY '4DH';
 DECLARE TOTALIZER$LAMP LITERALLY '4EH';
 DECLARE ODOMETER$LAMP LITERALLY '1DH';
 DECLARE STATE BYTE EXTERNAL;
 DECLARE NO$ITEMS(2) BYTE EXTERNAL;
 DECLARE NO$DLVRYS(3) BYTE EXTERNAL;
 DECLARE VOL$TENTHS BYTE EXTERNAL;

 DECLARE ODOMET(12) BYTE PUBLIC AT (.GEN$STRING(21));
 DECLARE ODMDIF(6) BYTE PUBLIC AT (.ODOMETER$DIF);
 DECLARE TOTLIT(12) BYTE PUBLIC AT  (.GEN$STRING(9));
 DECLARE TOTDIF(6) BYTE PUBLIC AT (.TOTALIZER$DIF);
 DECLARE RDATE(6) BYTE PUBLIC AT (.GEN$STRING);
 DECLARE DRINMR(3) BYTE PUBLIC AT (.GEN$STRING(6));
 DECLARE FRCNMR(3) BYTE PUBLIC AT (.GEN$STRING(36));
 DECLARE TAX2(3) BYTE PUBLIC AT (.BASE$TAX$2);
 DECLARE TAX1(3) BYTE PUBLIC AT (.BASE$TAX$1);
 DECLARE PRICZB BYTE PUBLIC AT (.GEN$STRING(48));
 DECLARE BILCDB(2) BYTE PUBLIC AT (.GEN$STRING(39));
 DECLARE PRICEB(4) BYTE PUBLIC AT (.BASE$PRICE);
 DECLARE CHEQUE(9) BYTE PUBLIC AT (.NO$CHEQUES$0);
 DECLARE CASH(9) BYTE PUBLIC AT (.NO$CASH$0);
 DECLARE CHARGE(7) BYTE PUBLIC AT (.CHARGE$TOTAL);
 DECLARE PRCD00(26) BYTE PUBLIC;
 DECLARE PRCD01(26) BYTE PUBLIC;
 DECLARE PRCD02(26) BYTE PUBLIC;
 DECLARE PRCD03(26) BYTE PUBLIC;
 DECLARE KEY BYTE;
 DECLARE CARRY$STATUS BYTE EXTERNAL;


/***************LOCAL DECLARATIONS******************/

 DECLARE (BILLING$ITEM, BILLING$OFFSET, INVENTORY$ITEM, INVENTORY$OFFSET,
ITEM$NO, I, SEARCH$ERROR, ERROR$FLAG, REV$CHECK$SUM, DIGIT, RETURN$CODE,
TICKET$INSERTED) BYTE;

 DECLARE BASE$PRICE(4) BYTE, BASE$TAX$1(3) BYTE,
```

```
/* IF INITIALIZED CAPSULE STATUS LOAD TO CAPSULE IS GOOD*/
 ARRAY(0)=0EH;
 ENB$SOL=0; /*DISABLE CAPSULE REMOVAL*/
 IF STORE$DATA$STRING$TO$CAPSULE(.ARRAY,49,1,1) THEN /*WRITE ERROR OCCURED*/
  RETURN 0;
 ELSE RETURN 1;         /*INITIALIZATION COMPLETED*/
END FRC$CAPSULE$INITIALIZATION;
END FRC$INITIALIZATION$MODULE;
/*INPUT-BEGINNING ODOMETER READING, VARIABLE DIGIT(0-6) OPTIONAL ENTRY*/
                                                   /*(DEFAULT=000000D)*/
 DO WHILE FLEX$DIGIT$ENTRY(6, ARRAY,OPTIONAL,1)=CLEAR$CODE;
 END;
 IF STORE$DATA$STRING$TO$CAPSULE(.ARRAY,21,6,1) THEN
  RETURN 0;
 CALL STATUS$LAMP(ODOMETER$LAMP);

/*INPUT-BASE PRODUCT BILLING CODE, FIXED DIGIT(2) OPTIONAL ENTRY(DEFAULT=01)*/
 CALL STATUS$LAMP(09BH); /*BILLING CODE LAMP ON*/
 L1040: CALL READ$DATA$STRING$FROM$CAPSULE (.ARRAY,52,2);
 DO WHILE FIXED$DIGIT$ENTRY(2,.ARRAY,OPTIONAL)=CLEAR$CODE;
 END;
   /*SEARCH DATA CAPSULE FOR INPUT BILLING CODE*/
 IF SEARCH$CAPSULE$FOR$DATA$MATCH(.ARRAY,52,
 BASE$ITEM$NO,10) THEN/*INPUT BILLING CODE NOT FOUND*/
 DO;
  CALL ERROR$PROCESS;
  GO TO L1040;
 END;
 IF STORE$DATA$STRING$TO$CAPSULE(.ARRAY,39,2,1) THEN
  RETURN 0;
 CALL STATUS$LAMP(BILLING$CODE$LAMP);

/*INPUT-BASE ZONE CODE,FIXED DIGIT(1) OPTIONAL ENTRY(DEFAULT=1)*/
 CALL STATUS$LAMP(0BBH); /*ZONE LAMP ON*/
 L1050: ARRAY(0)=1;                 /*SET ZONE CODE DEFAULT VALUE TO 1*/
 DO WHILE FIXED$DIGIT$ENTRY(1,.ARRAY,OPTIONAL)=CLEAR$CODE;
 END;
 IF (ARRAY(0)<1) OR (ARRAY(0)>5) THEN
 DO;
  CALL ERROR$PROCESS;
  GO TO L1050;
 END;
 IF STORE$DATA$STRING$TO$CAPSULE(.ARRAY,48,1,1) THEN
  RETURN 0;
 CALL STATUS$LAMP(ZONE$LAMP);

/*INPUT-INITIAL VOLUME FOR EACH OF THE 4 INVENTORY ITEMS IN THE DATA CAPSULE*/
/*VARIABLE DIGIT(0-6) MANDATORY ENTRY*/
 CALL STATUS$LAMP(08DH); /*VOLUME LAMP ON*/
 DO I=0 TO 3;/*INPUT INITIAL VOLUMES*/
  CALL READ$DATA$STRING$FROM$CAPSULE(.PRODUCT$CODE,3696+39*I,2);
  IF PRCDO<10 THEN
  DO;
   CALL FUEL$VOLUME$ENTRY(.ARRAY,.PRODUCT$CODE,MANDATORY);
   IF STORE$DATA$STRING$TO$CAPSULE(.ARRAY,3698+39*I,6,1) THEN
    RETURN 0;
  END;
 END;
 CALL CLEAR$DISPLAY;
 CALL STATUS$LAMP(VOLUME$LAMP);

/*LOAD FRC NO FROM CALIBRATION MEMORY INTO DATA CAPSULE*/
 CALL READ$CALIBRATION$MEMORY(.FRC$NO,0,3);
 IF STORE$DATA$STRING$TO$CAPSULE(.FRC$NO,36,3,1) THEN
  RETURN 0;

/*SET CAPSULE STATUS TO INITIALIZED STATE*/
/*SET BIT 0 OF OF DIGIT @ CAPSULE ADDRESS-0049D(CAPSULE STATUS) TO LOW*/
END READ$CALIBRATION$MEMORY;
```

```
FUEL$VOLUME$ENTRY:
PROCEDURE(ARRAY$PTR,PRODUCT$CODE$PTR,INPUT$OPTION) EXTERNAL;
 DECLARE (ARRAY$PTR,PRODUCT$CODE$PTR) ADDRESS;
 DECLARE INPUT$OPTION BYTE;
END FUEL$VOLUME$ENTRY;


FRC$CAPSULE$INITIALIZATION: PROCEDURE BYTE PUBLIC;
 DECLARE RETURN$CODE BYTE;
 DECLARE ERROR$FLAG BYTE;
 DECLARE ARRAY(6) BYTE;
 DECLARE CLEAR$CODE LITERALLY '00H', ENTER$CODE LITERALLY '01H';
 DECLARE MANDATORY LITERALLY '00H', OPTIONAL LITERALLY '01H';
 DECLARE OFF LITERALLY '00H', ON LITERALLY '01H';
 DECLARE (I,DIGIT,D) BYTE;
 DECLARE FRC$NO(3) BYTE;
 DECLARE PRODUCT$CODE(2) BYTE;
 DECLARE DATE$LAMP LITERALLY '1EH';
 DECLARE DRIVER$LAMP LITERALLY '2EH';
 DECLARE MECH$METER$LAMP LITERALLY '4EH';
 DECLARE ODOMETER$LAMP LITERALLY '1DH';
 DECLARE BILLING$CODE$LAMP LITERALLY '1BH';
 DECLARE ZONE$LAMP LITERALLY '3BH';
 DECLARE VOLUME$LAMP LITERALLY '0DH';
 DECLARE ERROR$LAMP LITERALLY '57H';
 DECLARE DEFAULT$CODE LITERALLY '0FFH';
 DECLARE DATA$WORD$8279 BYTE AT (0A000H);
 DECLARE (PRCD0,PRCD1) BYTE AT (.PRODUCT$CODE);

/*INPUT-DATE, FIXED 6 DIGIT MANDATORY ENTRY*/
 ENB$SOL=1; /*ENABLE ESCAPE VIA REMOVE CAPSULE*/
 CALL STATUS$LAMP(9EH); /*DATE LAMP ON*/
 CALL CLEAR$DISPLAY;
 DO WHILE FIXED$DIGIT$ENTRY(6,.ARRAY,MANDATORY)=CLEAR$CODE;
 END;
 IF STORE$DATA$STRING$TO$CAPSULE(.ARRAY,0,6,1) THEN
  RETURN 0;
 CALL STATUS$LAMP(DATE$LAMP);

/*INPUT-DRIVER NO., FIXED 3 DIGIT MANDATORY ENTRY*/
 CALL STATUS$LAMP(0AEH); /*DRIVER LAMP ON*/
 DO WHILE FIXED$DIGIT$ENTRY(3,.ARRAY,MANDATORY)=CLEAR$CODE;
 END;
 IF STORE$DATA$STRING$TO$CAPSULE(.ARRAY,6,3,1) THEN
  RETURN 0;
 CALL STATUS$LAMP(DRIVER$LAMP);
 CALL CLEAR$DISPLAY;

/*INPUT-BEGINING TOTALIZER READING, VARIABLE DIGIT (0-6) MANDATORY ENTRY*/
 CALL STATUS$LAMP(0CEH); /*MECH METER LAMP ON*/
 DO WHILE FLEX$DIGIT$ENTRY(6,.ARRAY,MANDATORY,0)=CLEAR$CODE;
 END;
 IF STORE$DATA$STRING$TO$CAPSULE(.ARRAY,9,6,1) THEN
  RETURN 0;
 CALL STATUS$LAMP(MECH$METER$LAMP);
 CALL STATUS$LAMP(09DH); /*ODOMETER LAMP ON*/
 DO I=0 TO 5;/*ZERO WORKING ARRAY*/
  ARRAY(I)=0;
 END;
/* DATA CAPSULE INITIALIZATION PROGRAM */
/* 5/14/80  10:35 AM*/


FRC$INITIALIZATION$MODULE:

DO;
 DECLARE BASE$ITEM$NO BYTE PUBLIC;
 DECLARE ENB$SOL BYTE PUBLIC;

 CLEAR$DISPLAY: PROCEDURE EXTERNAL;
 END CLEAR$DISPLAY;
```

```
ERROR$PROCESS  PROCEDURE EXTERNAL,
END ERROR$PROCESS.

READ$DATA$CAPSULE: PROCEDURE(ABS$CAPSULE$ADDR) BYTE EXTERNAL,
 DECLARE ABS$CAPSULE$ADDR ADDRESS,
END READ$DATA$CAPSULE,

FIXED$DIGIT$ENTRY:
PROCEDURE (ARRAY$SIZE, ARRAY$PTR, INPUT$OPTION) BYTE EXTERNAL;
 DECLARE (ARRAY$SIZE, INPUT$OPTION) BYTE;
 DECLARE ARRAY$PTR ADDRESS;
END FIXED$DIGIT$ENTRY;

FLEX$DIGIT$ENTRY:
PROCEDURE (ARRAY$SIZE, ARRAY$PTR, INPUT$OPTION, AUTO$DSP) BYTE EXTERNAL;
 DECLARE (ARRAY$SIZE, INPUT$OPTION, AUTO$DSP) BYTE;
 DECLARE ARRAY$PTR ADDRESS;
END FLEX$DIGIT$ENTRY;

STORE$DATA$STRING$TO$CAPSULE:
PROCEDURE (ARRAY$PTR, ABS$CAPSULE$ADDR, NO$DIGITS, EHFLAG) BYTE EXTERNAL;
 DECLARE (ARRAY$PTR, ABS$CAPSULE$ADDR) ADDRESS;
 DECLARE (EHFLAG, NO$DIGITS) BYTE;
END STORE$DATA$STRING$TO$CAPSULE;

STATUS$LAMP:
PROCEDURE (LAMP$CODE) EXTERNAL;
 DECLARE LAMP$CODE BYTE;
END STATUS$LAMP;

SEARCH$CAPSULE$FOR$DATA$MATCH:
PROCEDURE (INPUT$DATA$PTR, CAPS$SEARCH$START$ADDR, MATCHED$DATA$ITEM$NO$ADDR,
           NO$DATA$ITEMS) BYTE EXTERNAL ;
 DECLARE (INPUT$DATA$PTR, CAPS$SEARCH$START$ADDR, MATCHED$DATA$ITEM$NO$ADDR)
           ADDRESS;
 DECLARE NO$DATA$ITEMS BYTE;
END SEARCH$CAPSULE$FOR$DATA$MATCH;

READ$DATA$STRING$FROM$CAPSULE:
PROCEDURE (ARRAY$PTR, ABS$CAPSULE$ADDR, NO$DIGITS) EXTERNAL ;
 DECLARE (ARRAY$PTR, ABS$CAPSULE$ADDR) ADDRESS;
 DECLARE NO$DIGITS BYTE;
END READ$DATA$STRING$FROM$CAPSULE;

READ$CALIBRATION$MEMORY:
PROCEDURE(ARRAY$PTR, ABS$CALIB$ADDR, NO$DIGITS) EXTERNAL;
 DECLARE (ARRAY$PTR, ABS$CALIB$ADDR) ADDRESS;
 DECLARE NO$DIGITS BYTE;
         IF (CONTACT$TRANSITION AND 70H)=0 THEN GO TO L1110;
         STATE=0;
         RETURN;
END TRANSITION;

FLOWMETER: PROCEDURE PUBLIC;

CALL DISPLAY$VOL;
RAW$PULSES$LSW, RAW$PULSES$MSW, ERROR, FWD$REV=0;
MAX$ERROR=6;
ADJ$ERROR=12;
CONTACT=0FH;
 DO WHILE 1;
  CALL CONTACT$CHANGE,
  IF (CONTACT$TRANSITION AND 3)>0 THEN
  DO,
   STATE=100,
   CALL TRANSITION;
   RETURN.
  END,
  IF (CONTACT$TRANSITION AND 12)>0 THEN
  DO,
   STATE=101,
```

```
    CALL TRANSITION;
    RETURN;
   END;
   IF (CONTACT$TRANSITION AND 70H)>0 THEN
   DO;
    STATE=0;
    RETURN;
   END;
  END;
 END FLOWMETER;
END FLOWMETER$MODULE;
 END;
         ELSE DO;
  RIGHT$PULSE=1;
  WRONG$PULSE=2;
  ERROR$INC=0FFFFH;
 END;
 REV$FLOW=12;
        CALL NORMAL$FLOW;
        IF STATE<2 THEN RETURN;
        GO TO L1010;
 L1030: PULSE=PULSE+1;
 L1040: CALL CONTACT$CHANGE;
        IF (CONTACT$TRANSITION AND 3)>0 THEN
DO;
         STATE=100;
         GO TO L1010;
END;
        IF (CONTACT$TRANSITION AND 12)>0 THEN
DO;
         STATE=101;
         GO TO L1010;
END;
        IF (CONTACT$TRANSITION AND 70H)=0 THEN GO TO L1040;
        STATE=0;
        RETURN;
 L1020: PULSE=0;
 L1090: IF STATE<>101 THEN GO TO L1000;
        CALL COMPUTE;
IF CONTACT$TRANSITION=12 THEN
 CALL COMPUTE;
        IF PULSE<2 THEN GO TO L1100;
BOTH=0;
        IF CONTACT$TRANSITION<>8 THEN
DO;
 IF CONTACT$TRANSITION=12 THEN
  BOTH=1;
 RIGHT$PULSE=8;
 WRONG$PULSE=4;
 ERROR$INC=1;
END;
        ELSE DO;
 RIGHT$PULSE=4;
 WRONG$PULSE=8;
 ERROR$INC=0FFFFH;
END;
REV$FLOW=3;
        CALL NORMAL$FLOW;
        IF STATE<2 THEN RETURN;
        GO TO L1090;
 L1100: PULSE=PULSE+1;
 L1110: CALL CONTACT$CHANGE;
        IF (CONTACT$TRANSITION AND 3)>0 THEN
DO;
         STATE=100;
         GO TO L1090;
END;
 L1120: IF (CONTACT$TRANSITION AND 12)>0 THEN
DO;
         STATE=101;
         GO TO L1090;
```

```
END;
  STATE=0;
  RETURN;
 END;
 IF (CONTACT$TRANSITION AND WRONG$PULSE)>0 THEN
 DO;
  CALL COMPUTE;
  IF (CONTACT$TRANSITION AND RIGHT$PULSE)>0 THEN
   CALL COMPUTE;
  ELSE DO;
   IF BOTH=0 THEN
    ERROR=ERROR+ERROR$INC;
   BOTH=0,
  END;
 END;
 ELSE DO;
  IF (CONTACT$TRANSITION AND RIGHT$PULSE)>0 THEN
  DO;
   CALL COMPUTE,
   TEMP=RIGHT$PULSE;
   RIGHT$PULSE=WRONG$PULSE;
   WRONG$PULSE=TEMP;
   ERROR$INC=(NOT ERROR$INC)+1;
  END;
  IF (CONTACT$TRANSITION AND REV$FLOW)>0 THEN
  DO;
   STATE=STATE XOR 1;
   IF (CONTACT$TRANSITION AND (REV$FLOW XOR OFH))>0 THEN
   DO;
    FWD$REV=FWD$REV+1;
    IF FWD$REV>=100 THEN
     STATE=1;
   END;
   ELSE FWD$REV=0;
   RETURN;
  END;
 END;
 IF ((ERROR+MAX$ERROR)>ADJ$ERROR) THEN
 DO;
  STATE=1;
  RETURN;
 END;
END;
END NORMAL$FLOW;

TRANSITION: PROCEDURE;
 DECLARE PULSE BYTE;

 L1000: PULSE=0;
 L1010: IF STATE<>100 THEN GO TO L1020;
        CALL COMPUTE;
IF CONTACT$TRANSITION=3 THEN
  CALL COMPUTE;
        IF PULSE<2 THEN GO TO L1030;
BOTH=0;
        IF CONTACT$TRANSITION<>2 THEN
 DO;
  IF CONTACT$TRANSITION=3 THEN
   BOTH=1;
  RIGHT$PULSE=2;
  WRONG$PULSE=1;
  ERROR$INC=1;
/* OLD$TEMP=OLD$TEMP-1; */
/* GO TO L1010; */
/*L1000: IF NEW$TEMP=OLD$TEMP THEN GO TO L1010; */
/* CALL DECREMENT$VOL$PRICE; */
/* OLD$TEMP=OLD$TEMP+1; */
 IF STATE=101 THEN
 DO;
  IF RAW$PULSES$LSW=0 THEN
   RAW$PULSES$MSW=RAW$PULSES$MSW-1;
```

```
RAW$PULSES$LSW=RAW$PULSES$LSW-1,
CALL VOLUME$SUBT;
END,
ELSE DO,
 IF RAW$PULSES$LSW=OFFFFH THEN
  RAW$PULSES$MSW=RAW$PULSES$MSW+1,
 RAW$PULSES$LSW=RAW$PULSES$LSW+1;
 CALL VOLUME$ADD(1),
 IF DELIVERY$MODE THEN CALL VOLUME$RESTRICTOR,
 IF DELIVERY$MODE=2 THEN CALL VOLUME$CUTOFF,
END,
IF (RAW$PULSES$LSW AND 3FFH)=0 THEN
DO,
 MAX$ERROR=MAX$ERROR+1,
 ADJ$ERROR=ADJ$ERROR+2;
END;
CALL DISPLAY$VOL;
RETURN;
END COMPUTE;

CONTACT$CHANGE: PROCEDURE;
 DECLARE (I,J,MASK) BYTE,

 MASK=1FH;
 L1000: DO I=1 TO 100,
  DO J=1 TO 200;
   IF (INPUT(78H) AND 20H)=0 THEN
    OUTPUT(0B0H)=0; /*CLOSE VALVES IF DOOR OPEN IN OPERATE MODE*/
   CONTACT$NEW=CONTACT AND MASK;
   IF (CONTACT$NEW XOR OFH)>0 THEN GO TO L1010;
   IF (INPUT(78H) AND 40H)=0 THEN
   DO;
    IF TICKET$ERROR THEN
     CALL DMI40(12H);
    TICKET$ERROR=1;
   END;
   ELSE TICKET$ERROR=0;
  END;
 END.
 MASK=OFFH;
 GO TO L1000;
 L1010: CONTACT$TRANSITION=(CONTACT AND MASK) XOR OFH.
CONTACT=CONTACT$TRANSITION; /*RESET BITS WHICH WERE SET*/
        RETURN;
END CONTACT$CHANGE;

NORMAL$FLOW: PROCEDURE;

 DO WHILE 1;
  CALL CONTACT$CHANGE;
  IF (CONTACT$TRANSITION AND 70H)>0 THEN
  DO;
/*  END,*/
/*  VINCM4=VINCM4-DVDTM4;*/
/*  IF VINCM5>127 THEN DO;*/
/*   VINCM5=VINCM5+10;*/
/*   VINCM4=VINCM4-1;*/
/*  END;*/
/*  IF VINCM4>127 THEN DO,*/
/*   VINCM4=VINCM4+10;*/
/*   VINCM3=VINCM3-1;*/
/*  END,*/
/*  IF VINCM3>127 THEN DO,*/
/*   VINCM3=VINCM3+10;*/
/*   VINCM2=VINCM2-1;*/
/*  END,*/
/*  PRINCM6=PRINCM6-DPDTM6;*/
/*  PRINCM5=PRINCM5-DPDTM5.*/
/*  IF PRINCM6>127 THEN DO;*/
/*   PRINCM6=PRINCM6+10.*/
/*   PRINCM5=PRINCM5-1,*/
```

```
/*  END; */
/*  PRINCM4=PRINCM4-DPDTM4; */
/*  IF PRINCM5>127 THEN DO; */
/*   PRINCM5=PRINCM5+10; */
/*   PRINCM4=PRINCM4-1; */
/*  END; */
/*  PRINCM3=PRINCM3-DPDTM3; */
/*  IF PRINCM4>127 THEN DO; */
/*   PRINCM4=PRINCM4+10; */
/*   PRINCM3=PRINCM3-1; */
/*  END; */
/*  IF PRINCM3>127 THEN DO; */
/*   PRINCM3=PRINCM3+10; */
/*   PRINCM2=PRINCM2-1; */
/*  END; */
/*  IF PRINCM2>127 THEN DO; */
/*   PRINCM2=PRINCM2+10; */
/*   PRINCM1=PRINCM1-1; */
/*  END; */
/*  RETURN; */
/* END DECREMENT$VOL$PRICE; */

 VOLUME$ADD: PROCEDURE (PULSE) EXTERNAL;
  DECLARE PULSE BYTE;
 END VOLUME$ADD;

 DISPLAY$VOL: PROCEDURE;
  DECLARE DISPLAY BYTE AT (0A000H);
  DECLARE DISP$CMD BYTE AT (0A001H);
  DECLARE I BYTE;
 DISP$CMD=96H-LAST$DISPLAY$DIGIT; /*BEGIN DISPLAY AT LEFT*/
 DO I=0 TO LAST$DISPLAY$DIGIT;
  DISPLAY=SHL(VOLUME(I),4);
 END;
 END DISPLAY$VOL;

 COMPUTE: PROCEDURE;
/*DECLARE TEMP BYTE AT (0A800H);  */

/* NEW$TEMP=TEMP;  */
/* IF NEW$TEMP>=OLD$TEMP THEN GO TO L1000;  */
/* CALL INCREMENT$VOL$PRICE;  */
/*  DECLARE (DPDTM3,DPDTM4,DPDTM5,DPDTM6) BYTE AT (.DPRC$DTEMP); */
/**/
/*  VINCM6=VINCM6+DVDTM6; */
/*  VINCM5=VINCM5+DVDTM5; */
/*  IF VINCM6>9 THEN DO; */
/*   VINCM6=VINCM6-10; */
/*   VINCM5=VINCM5+1; */
/*  END; */
/*  VINCM4=VINCM4+DVDTM4; */
/*  IF VINCM5>9 THEN DO; */
/*   VINCM5=VINCM5-10; */
/*   VINCM4=VINCM4+1; */
/*  END; */
/*  IF VINCM4>9 THEN DO; */
/*   VINCM4=VINCM4-10; */
/*   VINCM3=VINCM3+1; */
/*  END; */
/*  IF VINCM3>9 THEN DO; */
/*   VINCM3=VINCM3-10; */
/*   VINCM2=VINCM2+1; */
/*  END; */
/*  PRINCM6=PRINCM6+DPDTM6; */
/*  PRINCM5=PRINCM5+DPDTM5; */
/*  IF PRINCM6>9 THEN DO; */
/*   PRINCM6=PRINCM6-10; */
/*   PRINCM5=PRINCM5+1; */
/*  END; */
/*  PRINCM4=PRINCM4+DPDTM4; */
/*  IF PRINCM5>9 THEN DO; */
```

```
/*   PRINCM5=PRINCM5-10; */
/*   PRINCM4=PRINCM4+1; */
/*  END; */
/*  PRINCM3=PRINCM3+DPDTM3; */
/*  IF PRINCM4>9 THEN DO; */
/*   PRINCM4=PRINCM4-10; */
/*   PRINCM3=PRINCM3+1; */
/*  END; */
/*  IF PRINCM3>9 THEN DO; */
/*   PRINCM3=PRINCM3-10; */
/*   PRINCM2=PRINCM2+1; */
/*  END; */
/*  IF PRINCM2>9 THEN DO; */
/*   PRINCM2=PRINCM2-10; */
/*   PRINCM1=PRINCM1+1; */
/*  END; */
/*  RETURN; */
/* END INCREMENT$VOL$PRICE; */
/**/
/* DECREMENT$VOL$PRICE: PROCEDURE; */
/*  DECLARE (VINCM2, VINCM3, VINCM4, VINCM5, VINCM6) BYTE AT*/
/*          (.VOL$INCREMENT); */
/*  DECLARE (DVDTM4, DVDTM5, DVDTM6) BYTE AT (.DVOL$DTEMP); */
/*  DECLARE (PRINCM1, PRINCM2, PRINCM3, PRINCM4, PRINCM5, PRINCM6)*/
/*          BYTE AT (.PRICE$INCREMENT); */
/*  DECLARE (DPDTM3, DPDTM4, DPDTM5, DPDTM6) BYTE AT (.DPRC$DTEMP); */
/**/
/*  VINCM6=VINCM6-DVDTM6; */
/*  VINCM5=VINCM5-DVDTM5; */
/*  IF VINCM6>127 THEN DO; */
/*   VINCM6=VINCM6+10; */
/*   VINCM5=VINCM5-1; */
      VOLM1=VOLM1-1;
     END;
     IF VOLM1>127 THEN DO;
      TOTALIZER=0FDH;
      VOLM1=VOLM1+10;
      VOLO=VOLO-1;
     END;
     IF VOLO>127 THEN DO;
      VOLO=VOLO+10;
      VOL1=VOL1-1;
     END;
     IF VOL1>127 THEN DO;
      VOL1=VOL1+10;
      VOL2=VOL2-1;
     END;
     IF VOL2>127 THEN DO;
      VOL2=VOL2+10;
      VOL3=VOL3-1;
     END;
     IF VOL3>127 THEN DO;
      VOL3=VOL3+10;
      VOL4=VOL4-1;
     END;
     RETURN;
    END VOLUME$SUBT;

    VOLUME$CUTOFF: PROCEDURE;
     DECLARE VALVE BYTE AT (0B000H);
     DECLARE INDEX BYTE;

             INDEX=255;
     L1000:  INDEX=INDEX+1;
             IF VOLUME(INDEX)<CUTOFF(INDEX) THEN RETURN;
             IF VOLUME(INDEX)=CUTOFF(INDEX) AND INDEX<5
              THEN GO TO L1000;
             DELIVERY$MODE=0;
             VALVE=0;
             RETURN;
    END VOLUME$CUTOFF;
```

```
VOLUME$RESTRICTOR: PROCEDURE;
 DECLARE VALVE BYTE AT (0B000H);
 DECLARE INDEX BYTE;

IF VOLUME(0)>127 THEN RETURN;
        INDEX=255;
 L1000: INDEX=INDEX+1;
        IF VOLUME(INDEX)<RESTRICTOR(INDEX) THEN RETURN;
        IF VOLUME(INDEX)=RESTRICTOR(INDEX) AND INDEX<5
         THEN GO TO L1000;
        DELIVERY$MODE=2;
        VALVE=1;
        RETURN;
END VOLUME$RESTRICTOR;

/* INCREMENT$VOL$PRICE: PROCEDURE; */
/*  DECLARE (VINCM2,VINCM3,VINCM4,VINCM5,VINCM6) BYTE*/
/*          AT (.VOL$INCREMENT); */
/*  DECLARE (DVDTM4,DVDTM5,DVDTM6) BYTE AT (.DVOL$DTEMP); */
/*  DECLARE (PRINCM1,PRINCM2,PRINCM3,PRINCM4,PRINCM5,PRINCM6) BYTE*/
/*          AT (.PRICE$INCREMENT); */
FLOWMETER$MODULE:
DO;

 DECLARE CONTACT BYTE AT (07000H);
 DECLARE (CONTACT$NEW, CONTACT$OLD) BYTE;
 DECLARE STATE BYTE EXTERNAL;
 DECLARE CONTACT$TRANSITION BYTE EXTERNAL;
 DECLARE PRICE(10) BYTE EXTERNAL;
 DECLARE VOLUME(11) BYTE EXTERNAL;
 DECLARE CUTOFF(6) BYTE EXTERNAL;
 DECLARE RESTRICTOR(6) BYTE EXTERNAL;
 DECLARE VOL$INCREMENT(5) BYTE EXTERNAL;
/* DECLARE DVOL$DTEMP(3) BYTE EXTERNAL; */
 DECLARE PRICE$INCREMENT(7) BYTE EXTERNAL;
/* DECLARE DPRC$DTEMP(4) BYTE EXTERNAL; */
 DECLARE LAST$DISPLAY$DIGIT BYTE PUBLIC;
/* DECLARE OLD$TEMP BYTE EXTERNAL; */
/* DECLARE NEW$TEMP BYTE EXTERNAL; */
 DECLARE DELIVERY$MODE BYTE EXTERNAL;
 DECLARE (RAW$PULSES$MSW,RAW$PULSES$LSW) ADDRESS PUBLIC;
 DECLARE (BOTH, RIGHT$PULSE, WRONG$PULSE, REV$FLOW, TEMP,FWD$REV)
 BYTE;
 DECLARE TICKET$ERROR BYTE EXTERNAL;
 DECLARE (ERROR,ERROR$INC,MAX$ERROR,ADJ$ERROR) ADDRESS;

 CLEAR$DISPLAY: PROCEDURE EXTERNAL;
 END CLEAR$DISPLAY;

 DMI40: PROCEDURE(CHAR) EXTERNAL;
  DECLARE CHAR BYTE;
 END DM140;

 VOLUME$SUBT: PROCEDURE PUBLIC;
  DECLARE (VOL4,VOL3,VOL2,VOL1,VOL0,VOLM1,VOLM2,VOLM3,VOLM4,
VOLM5,VOLM6) BYTE AT (.VOLUME);
  DECLARE (INCM2,INCM3,INCM4,INCM5,INCM6) BYTE AT (.VOL$INCREMENT);
  DECLARE TOTALIZER BYTE AT (0B800H);

  VOLM6=VOLM6-INCM6;
  VOLM5=VOLM5-INCM5;
  IF VOLM6>127 THEN DO;
   VOLM6=VOLM6+10;
   VOLM5=VOLM5-1;
  END;
  VOLM4=VOLM4-INCM4;
  IF VOLM5>127 THEN DO;
   VOLM5=VOLM5+10;
   VOLM4=VOLM4-1;
  END;
  VOLM3=VOLM3-INCM3;
```

```
  IF VOLM4>127 THEN DO;
   VOLM4=VOLM4+10;
   VOLM3=VOLM3-1;
  END;
  VOLM2=VOLM2-INCM2;
  IF VOLM3>127 THEN DO;
   VOLM3=VOLM3+10;
   VOLM2=VOLM2-1;
  END;
  IF VOLM2>127 THEN DO;
   VOLM2=VOLM2+10;
  IF READ$DATA$CAPSULE(49)=0EH THEN /*INITIALIZED,NOT RECONCILED,NO ERROR*/
  DO;
   DELIVERY$ITEM$NO,LOADING$ITEM,STATE,NO$EXC=0;
   DO WHILE READ$DATA$CAPSULE(432+34*DELIVERY$ITEM$NO)<15 AND
DELIVERY$ITEM$NO<92;
    DELIVERY$ITEM$NO=DELIVERY$ITEM$NO+1;
   END;
   DO WHILE READ$DATA$CAPSULE(3852+15*LOADING$ITEM)<15 AND
LOADING$ITEM<10;
    LOADING$ITEM=LOADING$ITEM+1;
   END;
   DO WHILE READ$DATA$CAPSULE(3570+13*NO$EXC)<15 AND NO$EXC<8;
    NO$EXC=NO$EXC+1;
   END;
      L1000: CALL DMI40(MOTOR$OFF);
   OUTPUT(98H)=0FFH;
     CALL TRANSACTION$PROCESS;
   OUTPUT(90H)=0FFH;
     IF RECONCILIATION$PROCESS THEN
      GOTO L1000;
     CALL DMI40(MOTOR$OFF);
   DO I=1 TO 200;
    CALL TIME(250);
   END;
   OUTPUT(98H)=0FFH;
  END;
 END;
 ELSE
 DO;
  OUTPUT(90H)=0FFH;
  CALL CALIBRATION;
  OUTPUT(98H)=0FFH;
  DO WHILE 1;
  END;
 END;
DONE: DO WHILE 1;
  CALL RELEASE$CAPSULE;
  DO WHILE READ$KEYBOARD<>0C4H /*RUNOUT KEY*/;
  END;
 END;
END EXECUTIVE$ROUTINE;
   RETURN;
  I=I+1;
 END;
END;
L1010:
CALL READ$DATA$STRING$FROM$CAPSULE(.STRING,33,3);
CALL READ$DATA$STRING$FROM$CAPSULE(.STRING(3),46,5);
IF STRING(7)<>CHECK$SUM(.STRING,5) THEN
 RETURN,

FLAG=1;
RETURN;
END CHECK$CMIU$DATA;


/************* POWER ON INITIALIZE ******************/
START: CMD$WORD$8279=18H; /* KEYBRD,DISPLAY MODE */
 CMD$WORD$8279=3FH; /* PROGRAM CLOCK  */
 CMD$WORD$8279=0CDH; /* CLEAR 8279 */
```

```
CMD$WORD$8279=0E0H; /* RESET ERROR MODE */
OUTPUT(VALVE)=0F8H;
OUTPUT(CAPSULE)=9CH;
OUTPUT(079H)=0FFH; /*INITIALIZE PRINTER INTERFACE*/
OUTPUT(98H)=0FFH;
CALL TIME(250);
CALL TIME(250);
CALL TIME(250);
CALL TIME(250);
DO WHILE (INPUT(78H) AND 20H)=0;
END;
VOL$TENTHS,FWD$FLOW,REV$FLOW=0;
TAX$NO=10H;
CALL INITIALIZE$VOLUME;


IF (NOT CALIB$STATUS$WORD) THEN /* OPERATE MODE */
DO;
 IF READ$DATA$CAPSULE(49)=0FH THEN   /*READY TO INITIALIZE*/
 DO;
  CALL CHECK$CMIU$DATA;
  IF FLAG THEN
  DO;
   IF FRC$CAPSULE$INITIALIZATION=0 THEN  /* BAD LOAD DURING INITIALIZE */
    GO TO DONE;
  END;
  ELSE DO;
   CALL CLEAR$DISPLAY;
   DATA$WORD$8279=40H; /*CMIU ERROR CODE*/
   CALL ERROR$PROCESS;
   FLAG=STORE$DATA$STRING$TO$CAPSULE(.ERROR$CODE,49,1,0);
  END;
 END;
 ELSE DO;
  CALL READ$DATA$STRING$FROM$CAPSULE(.STRING,39,2);
  IF SEARCH$CAPSULE$FOR$DATA$MATCH(.STRING,52,.BASE$ITEM$NO,10) THEN
  DO;
   CALL CLEAR$DISPLAY;
   DATA$WORD$8279=30H;
   CALL ERROR$PROCESS;
   GO TO DONE; /*TERMINATE IF BAD PRICE TABLE FOUND*/
  END;
  IF PRESSED$KEY=0DCH /*TAX KEY*/ THEN
  DO;
   CALL CLEAR$ALL;
   CALL STATUS$LAMP(087H); /* TAX */
   CALL STATUS$LAMP(0EEH); /* DEC PT */
   CALL CLEAR$DISPLAY;
   DATA$WORD$8279=TAX$NO;
   DATA$WORD$8279=0FFH;
   DATA$WORD$8279=0FFH;
   DATA$WORD$8279=0FFH;
   LAMP=087H; /*TAX LAMP*/
   ADRS=76+BASE$ITEM$NO*38;
   IF TAX$NO=20H THEN
    ADRS=ADRS+3;
   CALL INTERROGATE(3);
   TAX$NO=TAX$NO XOR 30H;
  END;

     IF PRESSED$KEY=LT$KEY THEN
  DO;
   CMD$WORD$8279=0A0H;    /* LIGHT ALL LAMPS,DISPLAY SEGMENTS */
   CMD$WORD$8279=90H;
   DO I=0 TO 15;
    DATA$WORD$8279=80H;
   END;
  END;
  IF PRESSED$KEY=CLEAR$KEY THEN
   CMD$WORD$8279=0DCH; /* CLEAR ALL LAMPS,DISPLAY */
  DO WHILE (INPUT(78H) AND 20H)=0; /*WAIT FOR DC DOOR TO CLOSE*/
```

```
   END;
  END;
  RETURN;
 END TRANSACTION$PROCESS;


 CHECK$CMIU$DATA:
 PROCEDURE;
  DECLARE FWD$CHECK$SUM BYTE;

  FLAG, I=0;
  DO WHILE I<10;
   CALL READ$DATA$STRING$FROM$CAPSULE(.STRING,52+38*I,37);
   IF STRING(0)=0FH THEN
    GOTO L1000;
   ELSE
   DO;
    IF STRING(36)<>CHECK$SUM(.STRING,30) THEN
     RETURN;
    I=I+1;
   END;
  END;

  L1000:  I=0;
  DO WHILE  I<4;
  CALL READ$DATA$STRING$FROM$CAPSULE(.STRING,3696+39*I,38);/*PRDT CODE*/
   IF STRING(0)=0FH THEN
    GOTO L1010;
   ELSE
   DO;
    IF STRING(37)<>CHECK$SUM(.STRING,2) THEN
    RETURN;
   CALL LOAD$PROCESS;
  END;
  IF PRESSED$KEY=PRODUCT$KEY THEN
   CALL INVENTORY;
  IF PRESSED$KEY=VOLUME$KEY THEN
  DO;
   CALL CLEAR$ALL;
   CALL STATUS$LAMP(0EEH);  /*DEC PT ON */
   CALL STATUS$LAMP(08DH);  /*VOLUME ON */
   CALL CLEAR$DISPLAY;
   LAMP=08DH;  /*VOLUME*/
   ADRS=419+34*DELIVERY$ITEM$NO;
   CALL INTERROGATE(6);
  END;
  IF PRESSED$KEY=DATE$KEY THEN
  DO;
   LAMP=9EH;  /*DATE*/
   ADRS=0;
   CALL INTERROGATE(6);
  END;
  IF PRESSED$KEY=ODOM$KEY THEN
  DO;
   LAMP=09DH;  /*ODOMETER*/
   ADRS=21;
   CALL INTERROGATE(6);
  END;
  IF PRESSED$KEY=TOTALIZER$KEY THEN
  DO;
   LAMP=0CEH;  /*MECH METER*/
   ADRS=9;
   CALL INTERROGATE(6);
  END;
  IF PRESSED$KEY=DRIVER$KEY THEN
  DO;
   LAMP=0AEH;  /*DRIVER*/
   ADRS=6;
   CALL INTERROGATE(3);
  END;
  IF PRESSED$KEY=BILLING$CODE$KEY THEN
```

```
DO;
 LAMP=09BH; /*BILLING CODE*/
 ADRS=39;
 CALL INTERROGATE(2);
END;
IF PRESSED$KEY=ZONE$KEY THEN
DO;
 LAMP=0BBH; /*ZONE*/
 ADRS=48;
 CALL INTERROGATE(1);
END;
IF PRESSED$KEY=0ECH /*PRICE KEY*/ THEN
DO;
 STRING(0)=READ$DATA$CAPSULE(48);
 ADRS=52+38*BASE$ITEM$NO+4*STRING(0);
 CALL CLEAR$ALL;
 CALL STATUS$LAMP(0EEH); /*DECIMAL PT*/
 CALL STATUS$LAMP(0A7H); /*PRICE LAMP*/
 CALL CLEAR$DISPLAY;
 LAMP=0A7H; /*PRICE LAMP*/
 CALL INTERROGATE(4);
 TAX$NO=10H;
RETURN;
END INTERROGATE;

INITIALIZE$VOLUME: PROCEDURE PUBLIC;
 DO I=0 TO 10;
  VOLUME(I)=0;
  IF I<6 THEN
   VOL$INCREMENT(I)=FLOWMETER$COEFFICIENT(I);
 END;
 VOL5=5;
END INITIALIZE$VOLUME;

TRANSACTION$PROCESS:
PROCEDURE;
 DECLARE PRINT$REPORT$KEY LITERALLY '0C2H';
 DECLARE CUSTOMER$KEY LITERALLY '0E3H';
 DECLARE LOAD$KEY LITERALLY '0DAH';
 DECLARE ENTER$KEY LITERALLY '0E9H';
 DECLARE PRODUCT$KEY LITERALLY '0CBH';
 DECLARE VOLUME$KEY LITERALLY '0EAH';
 DECLARE DATE$KEY LITERALLY '0CAH';
 DECLARE DRIVER$KEY LITERALLY '0D2H';
 DECLARE BILLING$CODE$KEY LITERALLY '0EBH';
 DECLARE ZONE$KEY LITERALLY '0CCH';
 DECLARE ODOM$KEY LITERALLY '0C3H';
 DECLARE TOTALIZER$KEY LITERALLY '0E2H';
 DECLARE LT$KEY LITERALLY '0CDH';

 PRESSED$KEY=0FFH;
 DO WHILE PRESSED$KEY <> PRINT$REPORT$KEY;
  IF DELIVERY$ITEM$NO>91 THEN
   RETURN;
  IF STATE /*ERROR*/ THEN
   RETURN;
  OUTPUT(CAPSULE)=1CH;

  PRESSED$KEY=READ$KEYBOARD;
  IF PRESSED$KEY<0FFH THEN OUTPUT(CAPSULE)=9CH; /*TURN ON CAPSULE POWER*/
  IF PRESSED$KEY=CUSTOMER$KEY AND ((INPUT(070H) AND 10H)=0) THEN
  DO;
   OUTPUT(90H)=0FFH;  /*IGNITION OVERRIDE ON*/
   I=DELIVERY$PROCESS;
   OUTPUT(98H)=0FFH;  /*IGNITION OVERRIDE OFF*/
   CALL DMI40(MOTOR$OFF);
   CALL CLEAR$DISPLAY;
   IF I THEN
   DO;
    CALL INVENTORY$DELIVERED;
    CALL INVENTORY$LOADED;
```

```
    IF INV$TOTAL(ITEM$NO) THEN
    DO;
     CALL STATUS$LAMP(OBEH) /* LOAD LAMP ON */;
     CALL ERROR$PROCESS;
    END;
   END;
L2000: CALL INITIALIZE$VOLUME;
  END;
  IF PRESSED$KEY=LOAD$KEY THEN
  DO;
   IF LOADING$ITEM>9 THEN  /* LOAD FULL */
END CHECK$SUM;


VOLUME$ADD:
PROCEDURE (PULSE) EXTERNAL;
 DECLARE PULSE BYTE;
END VOLUME$ADD;


VOLUME$SUBT:
PROCEDURE EXTERNAL;
END VOLUME$SUBT;


INV$TOTAL: PROCEDURE(ITEM) BYTE EXTERNAL;
 DECLARE ITEM BYTE;
END INV$TOTAL;

/******************** LOCAL PROCEDURES ************************/

CLEAR$ALL: PROCEDURE PUBLIC;
 CMD$WORD$8279=0CDH;
 DO WHILE CMD$WORD$8279>127;
 END;
 RETURN;
END CLEAR$ALL;

RELEASE$CAPSULE: PROCEDURE PUBLIC;
 DECLARE I ADDRESS;
 DECLARE J BYTE;

 OUTPUT(CAPSULE)=1CH;
 OUTPUT(VALVE)=0FCH;
 CALL STATUS$LAMP(0BDH); /*REMOVE CAPSULE ON*/
 DO I=1 TO 3000;
  CALL TIME(250); /*WAIT A MINUTE*/
 END;
 OUTPUT(VALVE)=0F8H;
 CALL STATUS$LAMP(3DH); /*REMOVE CAPSULE OFF*/
 RETURN;
END RELEASE$CAPSULE;


INTERROGATE:
PROCEDURE(N);
 DECLARE N BYTE;

 CALL READ$DATA$STRING$FROM$CAPSULE(.STRING,ADRS,N);
 IF LAMP<>087H /*TAX LAMP*/ AND LAMP<>0A7H /*PRICE LAMP*/
AND LAMP<>08DH /*VOLUME*/ THEN
 DO;
  CALL CLEAR$ALL;
  CALL STATUS$LAMP(LAMP);
  CALL CLEAR$DISPLAY;
 END;
 DO I=0 TO N-1;
  IF ADRS=419 THEN
  DATA$WORD$8279=0;
  ELSE DATA$WORD$8279=SHL(STRING(I),4);
 END;
```

```
IF LAMP<>087H THEN
LOAD$PROCESS:
PROCEDURE EXTERNAL;
END LOAD$PROCESS;


RECONCILIATION$PROCESS:
PROCEDURE BYTE EXTERNAL;
END RECONCILIATION$PROCESS;


CALIBRATION:
PROCEDURE EXTERNAL;
END CALIBRATION;


INVENTORY:
PROCEDURE EXTERNAL;
END INVENTORY;


CLEAR$DISPLAY:
PROCEDURE EXTERNAL;
END CLEAR$DISPLAY;

STATUS$LAMP:
PROCEDURE (LAMP$NAME) EXTERNAL;
 DECLARE LAMP$NAME BYTE;
END STATUS$LAMP;

DMI40: PROCEDURE(CHAR) EXTERNAL;
 DECLARE CHAR BYTE;
END DMI40;

READ$KEYBOARD:
PROCEDURE BYTE EXTERNAL;
END READ$KEYBOARD;

READ$DATA$CAPSULE: PROCEDURE (CAP$ADD) BYTE EXTERNAL;
 DECLARE CAP$ADD ADDRESS;
END READ$DATA$CAPSULE;

READ$DATA$STRING$FROM$CAPSULE:
PROCEDURE (ADRS$RAM, ADRS$DC, DIGITS) EXTERNAL;
 DECLARE (ADRS$RAM, ADRS$DC) ADDRESS;
 DECLARE DIGITS BYTE;
END READ$DATA$STRING$FROM$CAPSULE;


STORE$DATA$STRING$TO$CAPSULE:
PROCEDURE (ADRS$RAM, ADRS$DC, DIGITS, EH$FLAG) BYTE EXTERNAL;
 DECLARE (ADRS$RAM, ADRS$DC) ADDRESS;
 DECLARE (DIGITS, EH$FLAG) BYTE;
END STORE$DATA$STRING$TO$CAPSULE;


CHECK$SUM:
PROCEDURE (ADRS$RAM, DIGITS) BYTE EXTERNAL;
 DECLARE ADRS$RAM ADDRESS;
 DECLARE DIGITS BYTE;
XECUTIVE$ROUTINE:
;
 
DECLARE BASE$ITEM$NO BYTE EXTERNAL;
DECLARE (STATE, DELIVERY$ITEM$NO, LOADING$ITEM, VOL$TENTHS) BYTE PUBLIC;
DECLARE FLOWMETER$COEFFICIENT(6) BYTE EXTERNAL;
DECLARE CMD$WORD$8279 BYTE AT (0A001H);
DECLARE DATA$WORD$8279 BYTE AT (0A000H);
DECLARE CALIB$STATUS$WORD BYTE AT (8000H);
DECLARE FLOW$METER$DATA$WORD BYTE;
DECLARE TOTALIZER$DATA$WORD BYTE AT (0B800H);
```

```
DECLARE ERROR$LAMP$ON LITERALLY '0D7H';
DECLARE REMOVE$CAPSULE$LAMP LITERALLY '3DH';
DECLARE (LAMP, I, FLAG, FWD$FLOW, REV$FLOW, FWD$FLAG, REV$FLAG) BYTE;
DECLARE STRING(40) BYTE;
DECLARE VOLUME(11) BYTE PUBLIC;
DECLARE VOL$INCREMENT(6) BYTE EXTERNAL;
DECLARE ERROR$CODE BYTE DATA (0BH);
DECLARE (CARRY, ADRS) ADDRESS;
DECLARE TICKET LITERALLY '078H';
DECLARE VALVE LITERALLY '0B0H';
DECLARE CAPSULE LITERALLY '88H';
DECLARE ITEM$NO BYTE EXTERNAL;
DECLARE (PRESSED$KEY, KEY$STATUS) BYTE;
DECLARE CLEAR$KEY LITERALLY '0E1H';
DECLARE (SUBSCR, INV$ITEM$1, INV$ITEM$2) BYTE;
DECLARE INV$ITEM$BUF(1) BYTE EXTERNAL;
DECLARE NO$EXC BYTE EXTERNAL;
DECLARE TAX$NO BYTE;
DECLARE VOL5 BYTE AT (.VOLUME+5);
DECLARE MOTOR$OFF LITERALLY '12H';
DECLARE START LABEL PUBLIC;

/******************** EXTERNAL PROCEDURES *******************/

ERROR$PROCESS: PROCEDURE EXTERNAL;
END ERROR$PROCESS;

INVENTORY$LOADED: PROCEDURE EXTERNAL;
END INVENTORY$LOADED;

INVENTORY$DELIVERED: PROCEDURE EXTERNAL;
END INVENTORY$DELIVERED;

FRC$CAPSULE$INITIALIZATION:
PROCEDURE BYTE EXTERNAL;
END FRC$CAPSULE$INITIALIZATION;

DELIVERY$PROCESS:
PROCEDURE BYTE EXTERNAL;
END DELIVERY$PROCESS;

SEARCH$CAPSULE$FOR$DATA$MATCH:
PROCEDURE (INPUT$PTR, START$ADDR, ITEM$ADDR, NO$ITEMS) BYTE EXTERNAL;
 DECLARE (INPUT$PTR, START$ADDR, ITEM$ADDR) ADDRESS;
 DECLARE NO$ITEMS BYTE;
END SEARCH$CAPSULE$FOR$DATA$MATCH;
```

DIRECTORY OF :F1:IOLPRO.PLM

| NAME .EXT | BLKS | LENGTH | ATTR | NAME .EXT | BLKS | LENGTH | ATTR |
|---|---|---|---|---|---|---|---|
| EXEC .PRO | 89 | 11040 | | FLOMTR.PRO | 90 | 11247 | |
| INITIL.PRO | 51 | 6383 | | RCNCIL.PRO | 76 | 9383 | |
| INVDEL.PRO | 53 | 6534 | | INVENT.PRO | 24 | 2867 | |
| ENSOD .PRO | 3 | 174 | | LOAD .PRO | 22 | 2573 | |
| CALIB .PRO | 83 | 10348 | | PNTRCN.PRO | 44 | 5396 | |
| DISSOD.PRO | 3 | 176 | | PNTDEL.PRO | 32 | 3955 | |
| VOLADD.PRO | 12 | 1400 | | WRTCAP.PRO | 23 | 2808 | |
| DIVIDE.PRO | 15 | 1746 | | FXENT1.PRO | 25 | 2973 | |
| RDKEY .PRO | 6 | 565 | | CLRDSP.PRO | 7 | 658 | |
| LMPSTS.PRO | 13 | 1456 | | RDCAP .PRO | 13 | 1459 | |
| BCDMLT.PRO | 11 | 1268 | | FUELEN.PRO | 18 | 2075 | |
| BCDCPR.PRO | 10 | 1142 | | FLXENT.PRO | 23 | 2816 | |
| SEARCH.PRO | 10 | 1073 | | RDCAPS.PRO | 8 | 869 | |
| BCDSUB.PRO | 9 | 940 | | ERRORP.PRO | 6 | 550 | |
| STOREC.PRO | 15 | 1730 | | BCDADD.PRO | 9 | 898 | |
| DIGKEY.PRO | 4 | 270 | | DLVRY .PRO | 158 | 19791 | |

1188/4004 BLOCKS USED

What is claimed is:

1. A data network for accounting for a number of fluid commodity deliveries, comprising:

a portable two-way memory capsule;

a first data station for entering data and information into, and retrieving information and data from, said portable two-way memory capsule; and a second data station for entering data and information into, and retrieving data and information from said portable two-way memory capsule, said second data station being operatively associated with a fluid commodity delivery means for dispensing plural deliveries of a fluid commodity.

2. The data network of claim 1 wherein said first data station is disposed at a home office location.

3. The data network of claim 1 wherein there are a plurality of said second data stations, each associated with a respective fluid commodity delivery means, and a plurality of memory capsules, at least one memory capsule for each of said second data stations.

4. The data network of claim 3 wherein each of said memory capsules comprise a non-volatile memory.

5. The data network of claim 1 wherein said memory capsule comprises a non-volatile memory.

6. The data network of claim 5 wherein said non-volatile memory of said memory capsule is erasable.

7. The data network of claim 1 wherein said first data station comprises a printing means for printing data and information associated with said memory capsule.

8. The data network of claim 1 wherein said second data station comprises a printing means for printing data and information associated with said memory capsule.

9. The data network of claim 8 wherein said printing means is provided with an interlock device which senses the insertion of a ticket into said printer, and in response thereto allows the delivery of the fluid commodity to proceed.

10. The data network of claim 1 wherein said first data station has a display for displaying data and information associated with said memory capsule.

11. The data network of claim 1 wherein said second data station has a display for displaying data and information associated with said memory capsule.

12. The data network of claim 1 wherein said second data station is electrically connected to a volume measuring device comprised by said delivery means.

13. The data network of claim 1 wherein said second data station is electrically connected to a fluid flow control comprised by said delivery means.

14. The data network of claim 1 wherein said second data station is provided with an interlock device to prevent unauthorized deliveries of fluid commodities.

15. The data network of claim 14 wherein said interlock device comprises a motion sensor for sensing vehicle movement.

16. The data network of claim 14 wherein said interlock device comprises a vehicle power train interlocking means.

17. The data network of claim 14 wherein said interlock device comprises a vehicle braking system interlocking means.

18. The data network of claim 14 wherein said interlock device comprises a vehicle ignition system interlocking means.

19. The data network of claim 14 wherein said interlock device comprises a capsule sensing means for sensing that said capsule is in proper communication with said second data station.

20. The data network of claim 11 wherein said second data station is provided with a keyboard for entering and retrieving data and information associated with said memory capsule.

21. The data network of claim 11 wherein said first data station is provided with a keyboard and capsule reader for respectively entering and retrieving data and information associated with said memory capsule.

22. A method of measurement and calibration of a fluid commodity delivery system comprising the steps of:

(a) loading or unloading a known volumetric quantity of a fluid commodity to or from the system;

(b) electronically measuring said known quantity and providing a first electrical output respective of said known quantity;

(c) determining at least one calibration coefficient for said known quantity in response to said electrical output;

(d) electronically storing said calibration coefficient;

(e) electronically measuring an unknown quantity and providing a second electrical output respective of said unknown quantity;

(f) retrieving said stored calibration coefficient;

(g) electronically calculating a true quantity for said unknown quantity in accordance with said retrieved calibration coefficient and said second electrical output.

23. The method of claim 22, wherein more than one unknown quantity is measured, and wherein steps (e), (f) and (g) are repeated for each subsequent measurement of an unknown quantity.

24. The method of claim 22, further comprising the steps of:

(g) Displaying said measured quantity of said known quantity and if different than a true quantity, then (h) Entering a true quantity for said known quantity into a calculator for determining said calibration coefficients in accordance with step (b).

25. The method of claim 22, further comprising the step of:

(g) displaying the true electronically calibrated quantity for said unknown quantity.

26. A fluid commodity delivery system, comprising:

a calculator means;

a fluid flow sensor for providing electrical signals to said calculator means in response to the fluid flow of a fluid commodity being delivered;

converting means electrically communicating with said fluid flow sensor for receiving and converting said electrical signals to a visual representation of the delivered volume of said fluid commodity; and calibration means connected to said converter means via a plug and socket connection and electrically communicating with said converter means for storing and providing calibration coefficients for said electrical signals to correct said visual representation to a true delivered volume of said fluid commodity, said calibrating means having a switch for operating said calibrating means in one of two modes, a first mode for adjusting said calibration coefficients and a second mode for supplying said calibration coefficients to said calculator means.

27. The fluid commodity delivery system of claim 26, wherein said converting means further comprises a calculator means, a keyboard and a digital display, and wherein said visual representation of said delivered volume is a digital readout upon said display.

28. The fluid commodity delivery system of claim 27, wherein said calibrating means further comprises a non-volatile memory for storing said calibration coefficients, said coefficients being adjustable to a new value through said keyboard of said converting means.

29. The fluid commodity delivery system of claim 28 wherein said calibration means non-volatile memory stores a plurality of calibration coefficients.

30. The fluid commodity delivery system of claim 28 wherein said calibration means non-volatile memory stores a temperature correction factor corresponding to each said fluid commodity.

31. The fluid commodity delivery system of claim 26, wherein said calibrating means has means for preventing unauthorized personnel from having access to said switch.

32. The fluid commodity delivery system of claim 26, wherein said fluid flow sensor comprises a fluid temperature sensing means.

33. The fluid commodity delivery system of claim 26, wherein said fluid flow sensor comprises a rotor having magnetizable material circumferentially disposed about the periphery thereof, and at least one magnetic sensing head disposed adjacent to said rotor for providing electrical signal pulses in response to relative movement of said rotor with respect to said magnetic sensing head.

34. The fluid commodity delivery system of claim 33, wherein there are two magnetic sensing heads in said fluid sensor.

35. The fluid commodity delivery system of claim 34, wherein said two magnetic sensing heads are disposed on opposite sides of said rotor.

36. The fluid commodity delivery system of claim 35, wherein said rotor is connected to an impeller which rotates in response to flow of said fluid commodity, and thus rotates said rotor with respect to said magnetic heads.

37. The fluid commodity delivery system of claim 26, wherein said calibration means is a modular unit.

38. The fluid commodity delivery system of claim 26, further comprising printing means electrical communicating with said calibration means for printing a hard copy of said calibration coefficients.

39. The fluid commodity delivery system of claim 37 wherein said modular calibration means is separate from said calculator means.

40. The fluid commodity delivery system of claim 39 where said separation of the calibrator means and calculator means permits removal of said calculator without recalibration of said sensor means.

* * * * *